US011977804B2

(12) United States Patent
Markeci et al.

(10) Patent No.: US 11,977,804 B2
(45) Date of Patent: May 7, 2024

(54) SYSTEM AND METHOD FOR PROVIDING A DYNAMIC LOOP OF CONTENT FOR DISPLAY

(71) Applicants: Mondi Diamand Markeci, West Jordan, UT (US); David James Van Beekum, Apopka, FL (US); Saba Mario Markeci, Oviedo, FL (US)

(72) Inventors: Mondi Diamand Markeci, West Jordan, UT (US); David James Van Beekum, Apopka, FL (US); Saba Mario Markeci, Oviedo, FL (US)

(73) Assignee: TWEVA.COM INC., Fruitland Park, FL (US)

(*) Notice: Subject to any disclaimer, the term of this patent is extended or adjusted under 35 U.S.C. 154(b) by 0 days.

(21) Appl. No.: 17/523,440

(22) Filed: Nov. 10, 2021

(65) Prior Publication Data

US 2022/0147297 A1    May 12, 2022

Related U.S. Application Data

(60) Provisional application No. 63/111,744, filed on Nov. 10, 2020.

(51) Int. Cl.
*G06F 3/14* (2006.01)
*G06F 3/0484* (2022.01)
*G06Q 30/0251* (2023.01)

(52) U.S. Cl.
CPC .............. *G06F 3/14* (2013.01); *G06F 3/0484* (2013.01); *G06Q 30/0251* (2013.01)

(58) Field of Classification Search
CPC ...... G06F 3/14; G06F 3/0484; G06Q 30/0251
See application file for complete search history.

(56) References Cited

U.S. PATENT DOCUMENTS

| 8,170,914 | B2* | 5/2012 | Mongeau | G06F 16/2477 707/770 |
| 8,666,807 | B1* | 3/2014 | Murray | G06Q 30/0241 705/37 |
| 9,497,500 | B1* | 11/2016 | Robinson | H04N 21/812 |
| 9,639,859 | B2 | 5/2017 | Jung et al. | |
| 10,068,251 | B1* | 9/2018 | Scofield | G06Q 30/0269 |
| 10,546,324 | B2 | 1/2020 | Busch | |
| 10,825,057 | B2* | 11/2020 | Dhar | H04L 63/104 |
| 11,244,350 | B1* | 2/2022 | Soliman | G06Q 30/0246 |
| 2003/0191816 | A1* | 10/2003 | Landress | G06Q 30/02 709/219 |

(Continued)

FOREIGN PATENT DOCUMENTS

JP    2011154248 A    8/2011

*Primary Examiner* — James T Tsai
(74) *Attorney, Agent, or Firm* — John L. Deangelis; WOLTER, VAN DYKE, DAVIS, PLLC

(57) ABSTRACT

A method and apparatus is provided for providing a dynamic loop of content for display. The method includes receiving, on a processor, first data that indicates a characteristic of a loop including a plurality of slots. The method further includes receiving, on the processor, second data that indicates content of a slide for each slot in the loop. The method further includes outputting, on a display, the loop including the content of the slide for each slot in the loop. An apparatus is also provided that it used to perform one or more steps of the method.

19 Claims, 53 Drawing Sheets

(56) References Cited

U.S. PATENT DOCUMENTS

| | | | |
|---|---|---|---|
| 2010/0064007 A1* | 3/2010 | Randall | G06Q 30/02 |
| | | | 709/204 |
| 2011/0178863 A1* | 7/2011 | Daigle | G06Q 30/0248 |
| | | | 705/14.69 |
| 2012/0144347 A1* | 6/2012 | Jo | G06F 3/04817 |
| | | | 345/173 |
| 2012/0271715 A1* | 10/2012 | Morton | G06Q 30/0257 |
| | | | 705/14.53 |
| 2014/0143671 A1* | 5/2014 | Kovalick | H04N 21/4722 |
| | | | 715/723 |
| 2014/0304072 A1* | 10/2014 | Rider | H04W 4/029 |
| | | | 705/14.53 |
| 2016/0029155 A1* | 1/2016 | Kerr | H04W 4/029 |
| | | | 455/456.3 |
| 2016/0212578 A1* | 7/2016 | Tong | H04W 76/12 |
| 2016/0292710 A1* | 10/2016 | Casselle | G06Q 30/0211 |
| 2019/0164198 A1 | 5/2019 | Koningstein | |
| 2020/0349543 A1* | 11/2020 | Gilbert | G06Q 50/26 |

\* cited by examiner

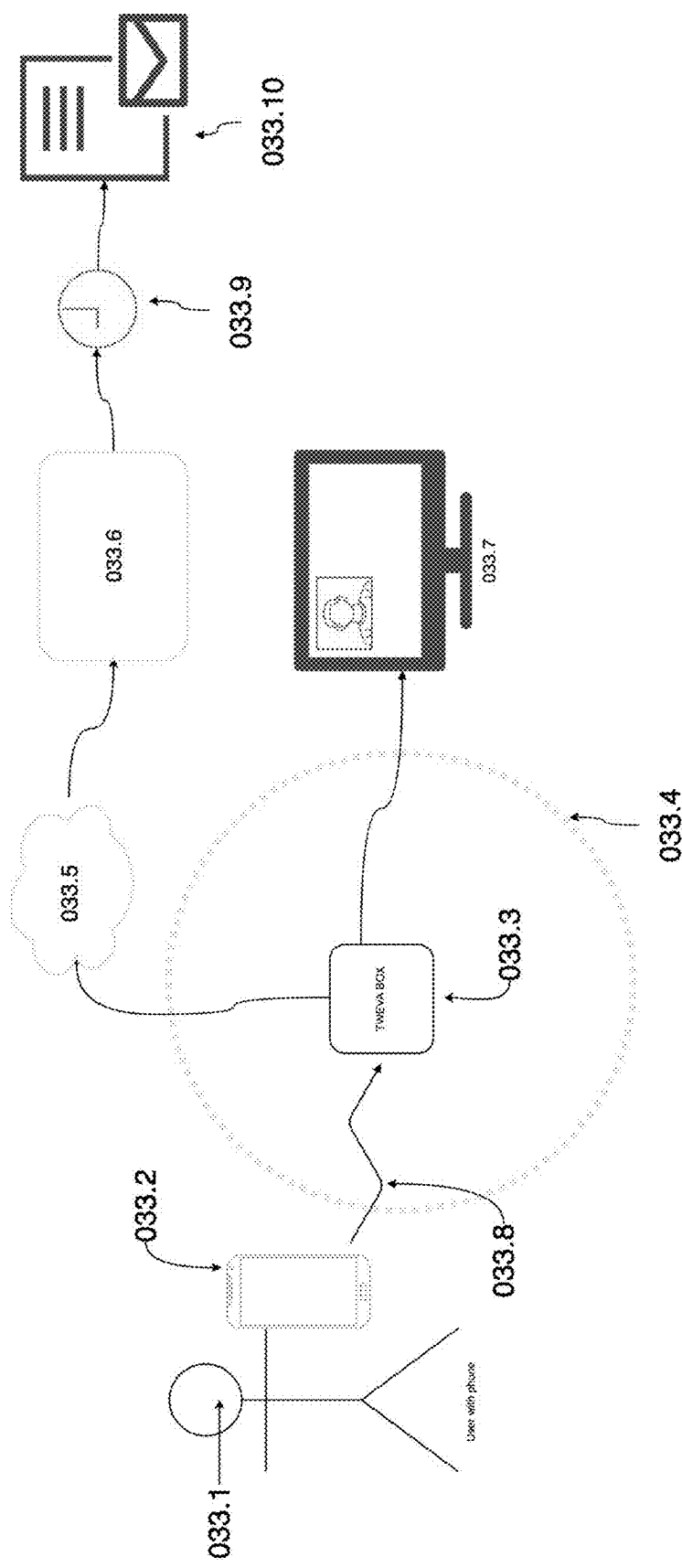
FIG. 002.1

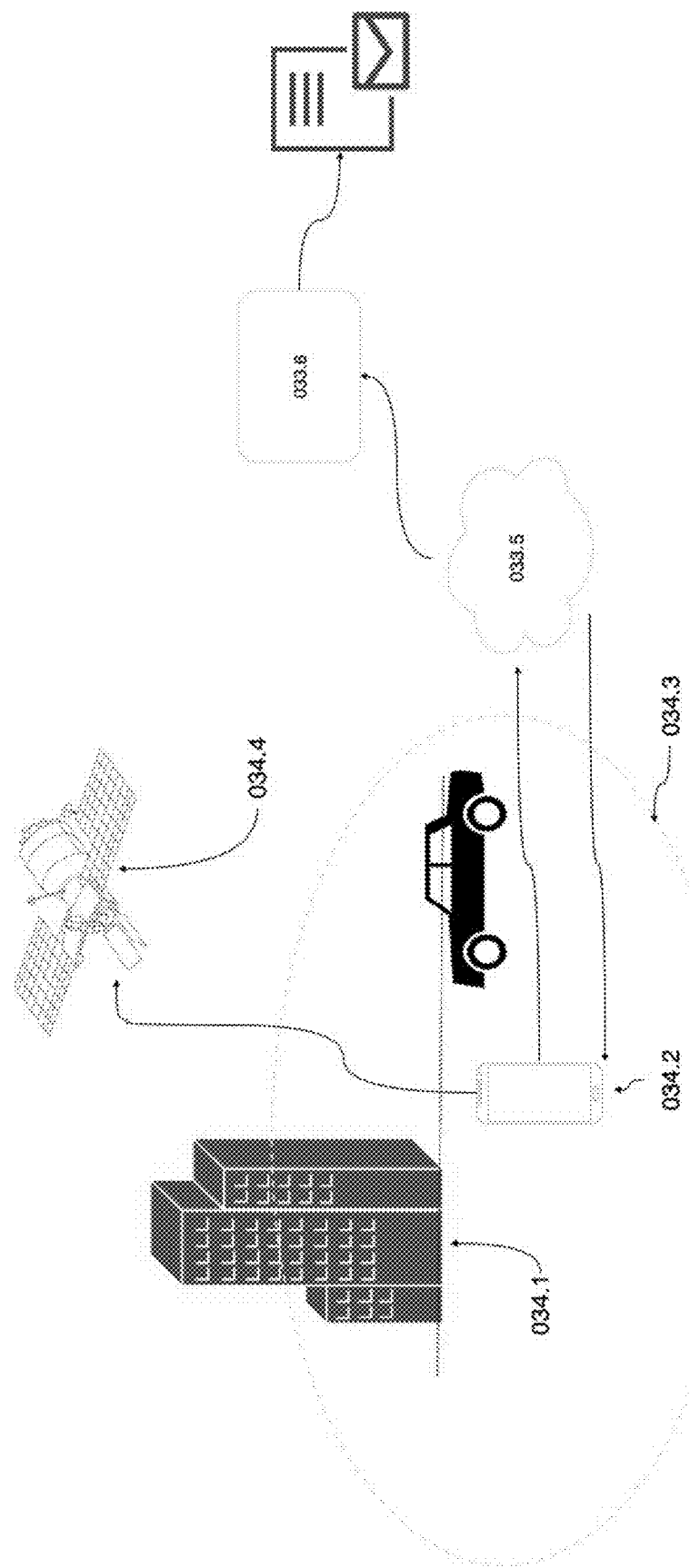
FIG. 002.2
Title: Tracking user proximity via GPS

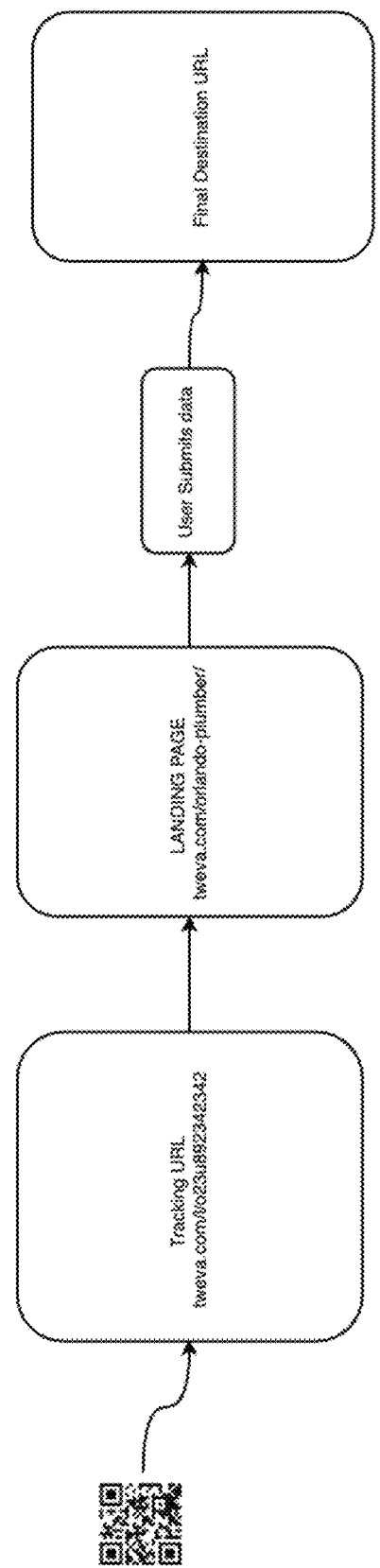
FIG. 002.3
Title: QR Code Scan Map

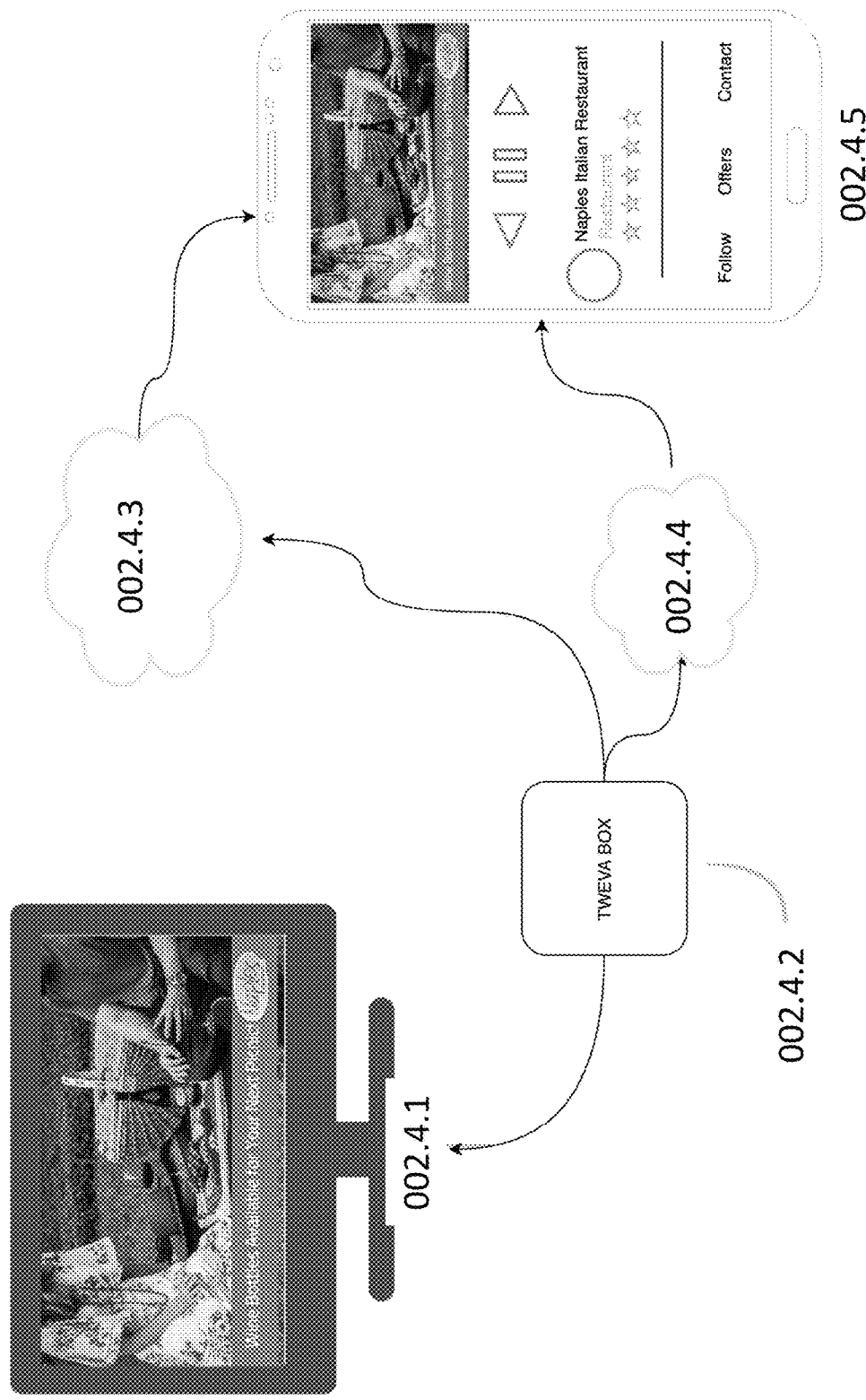
FIG. 002.4

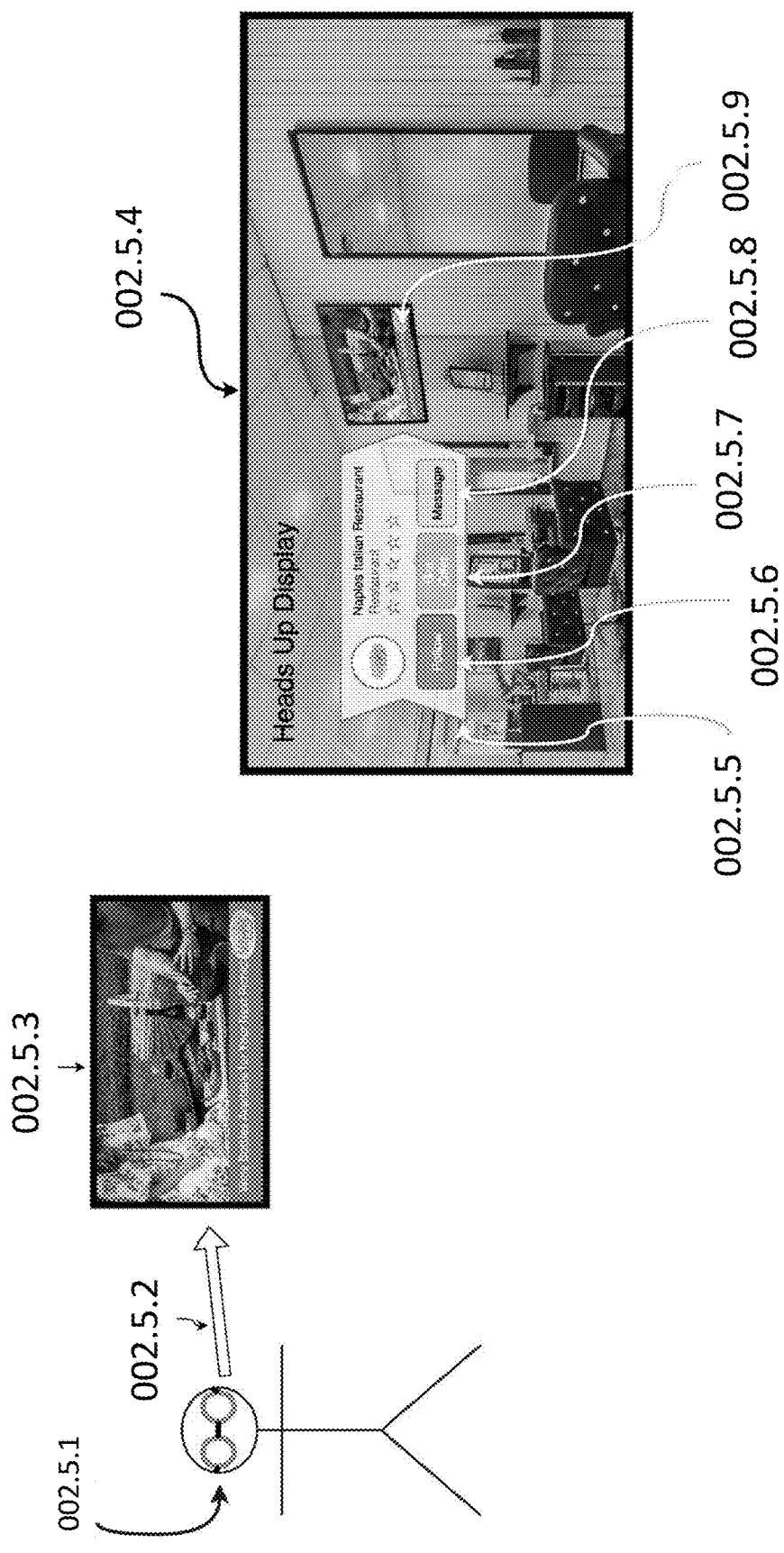
FIG. 002.5

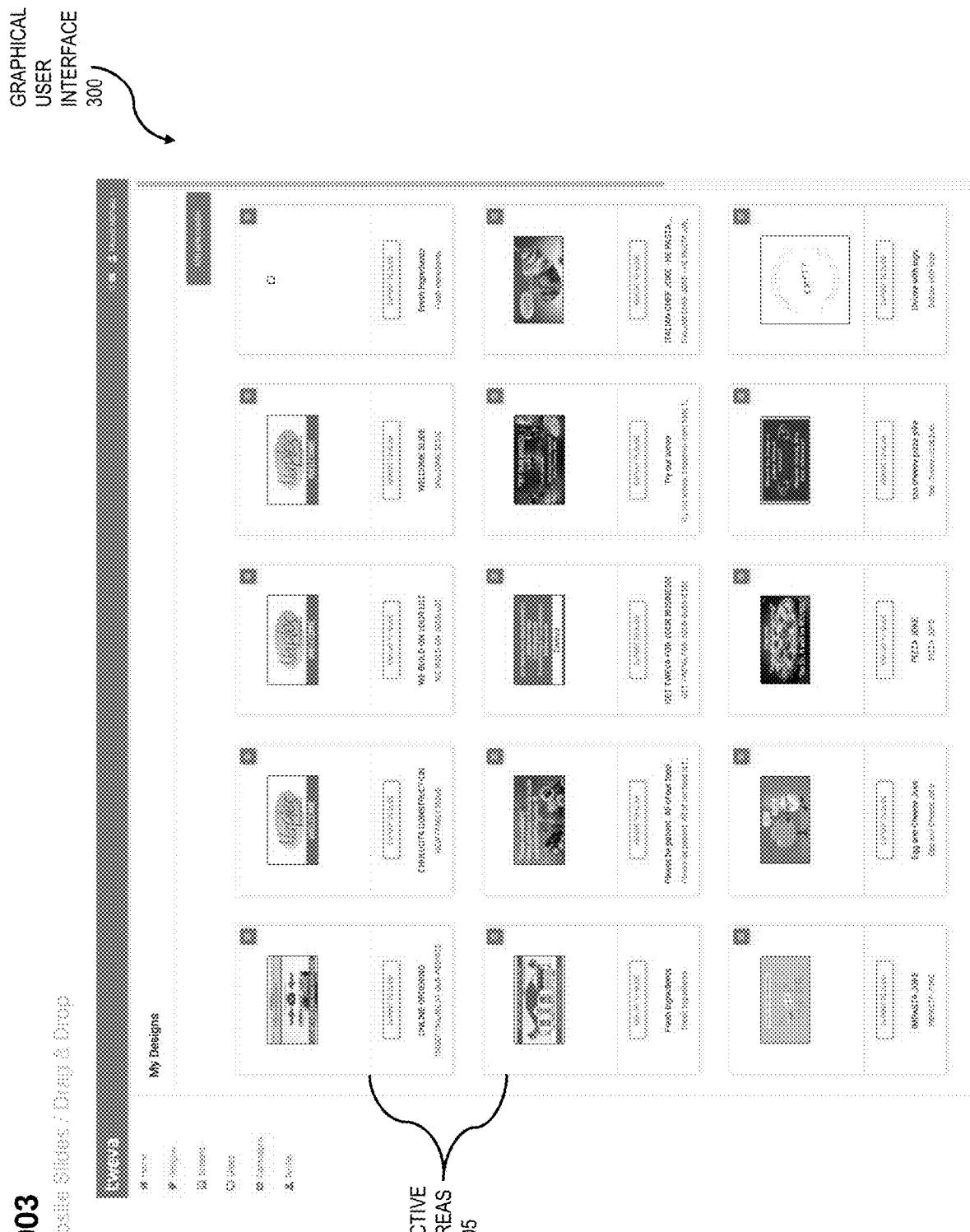

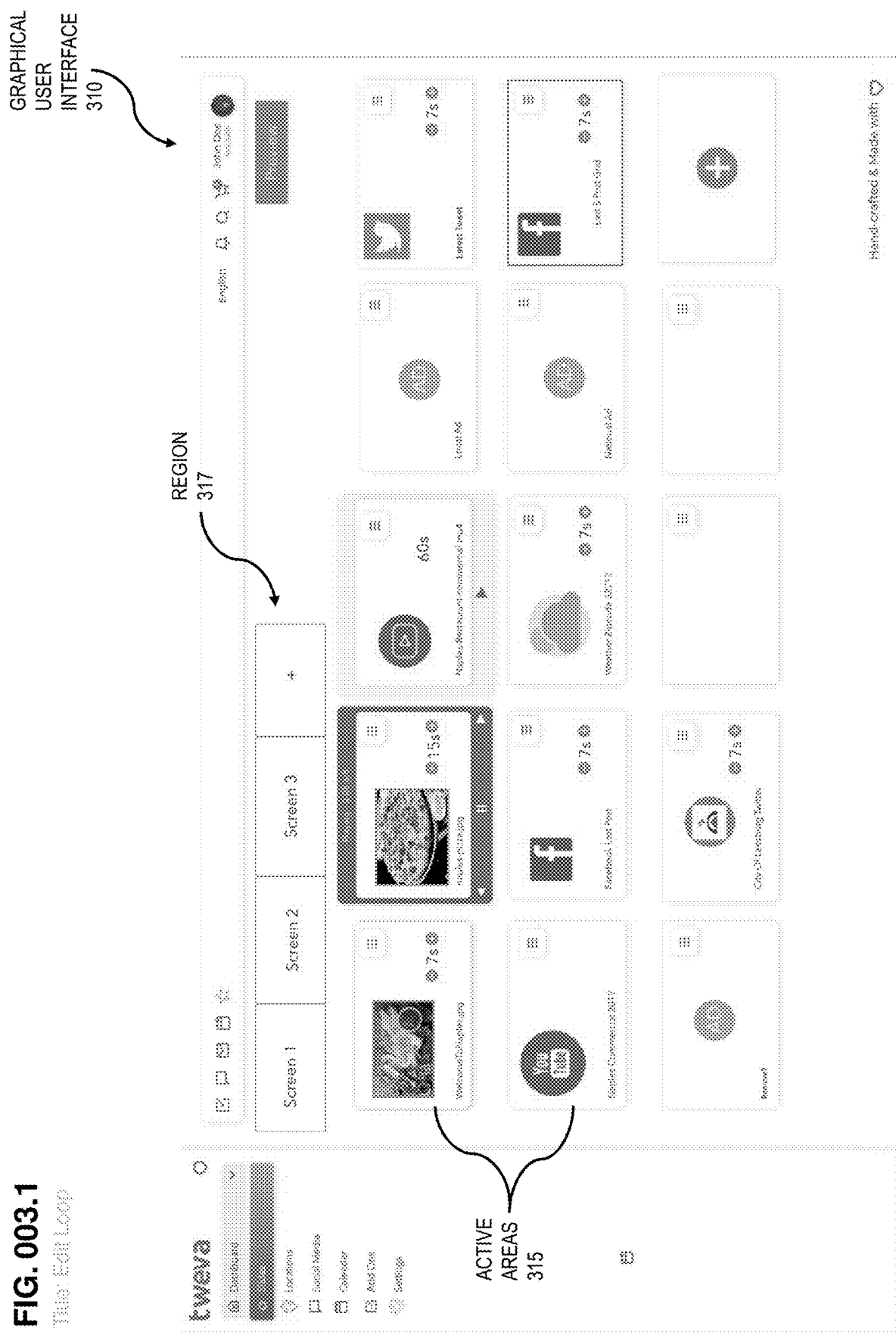
FIG. 003.1

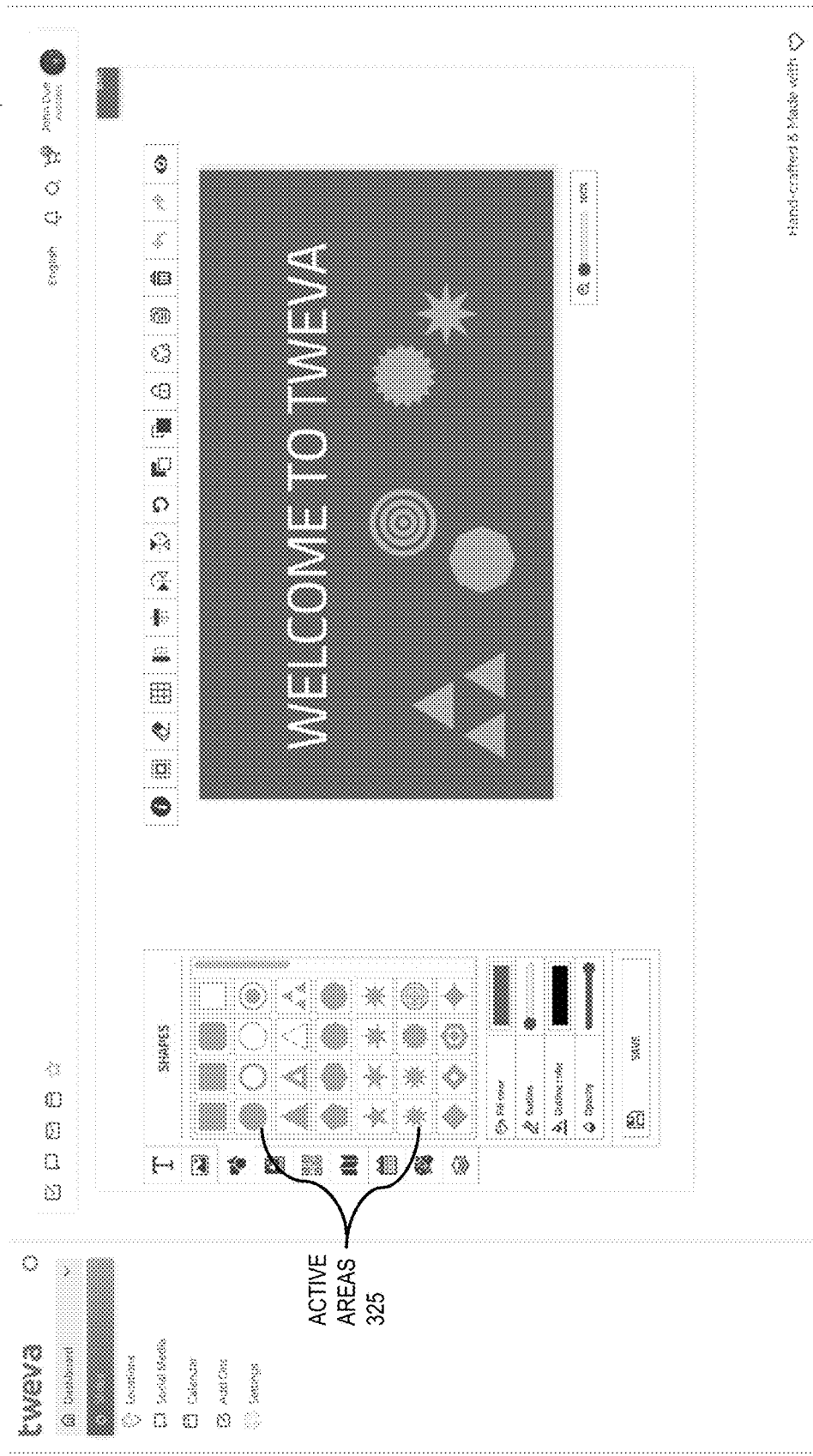
FIG. 003.2

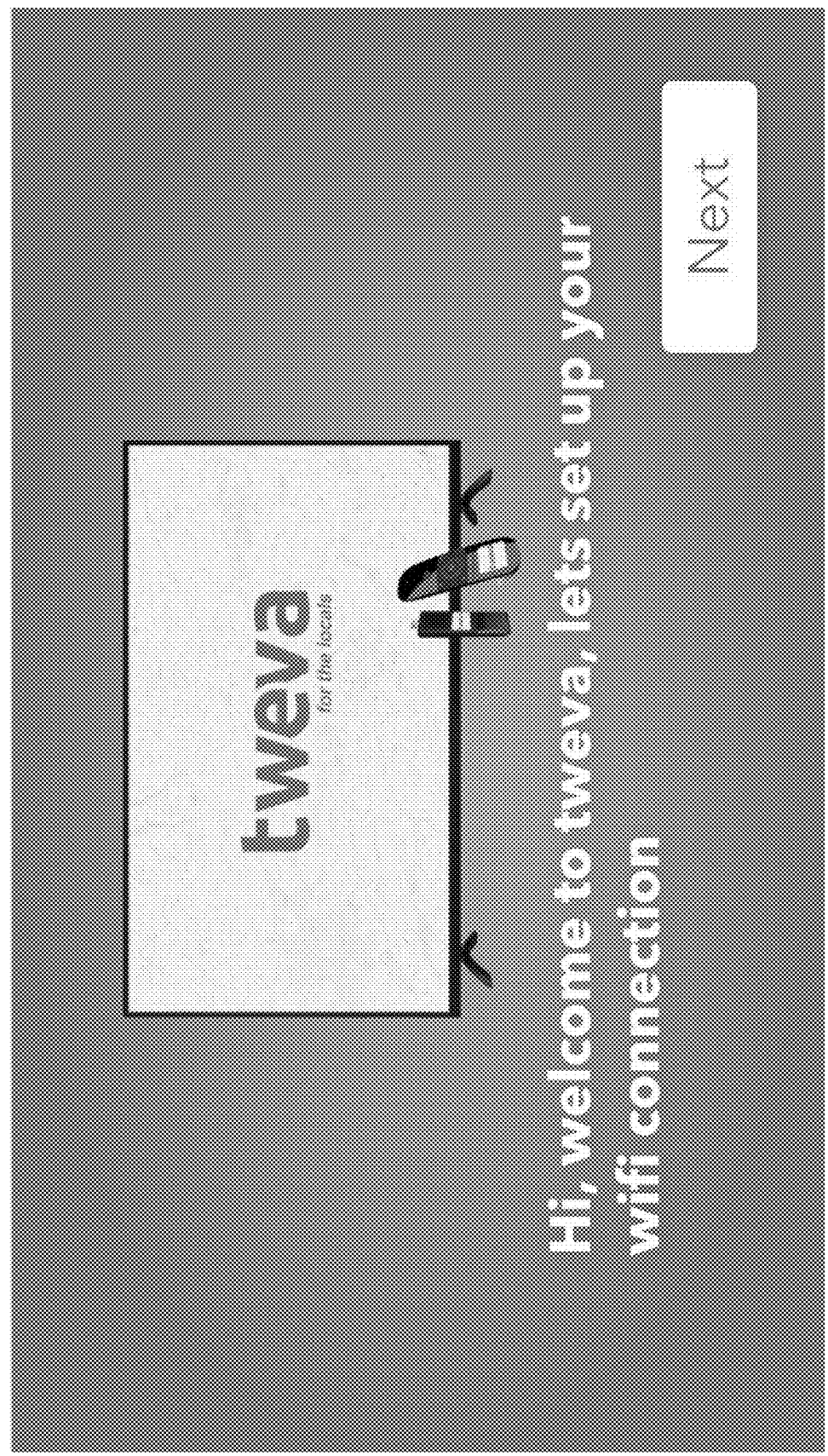
FIG. 010.1
Title: Device - Set up WiFi

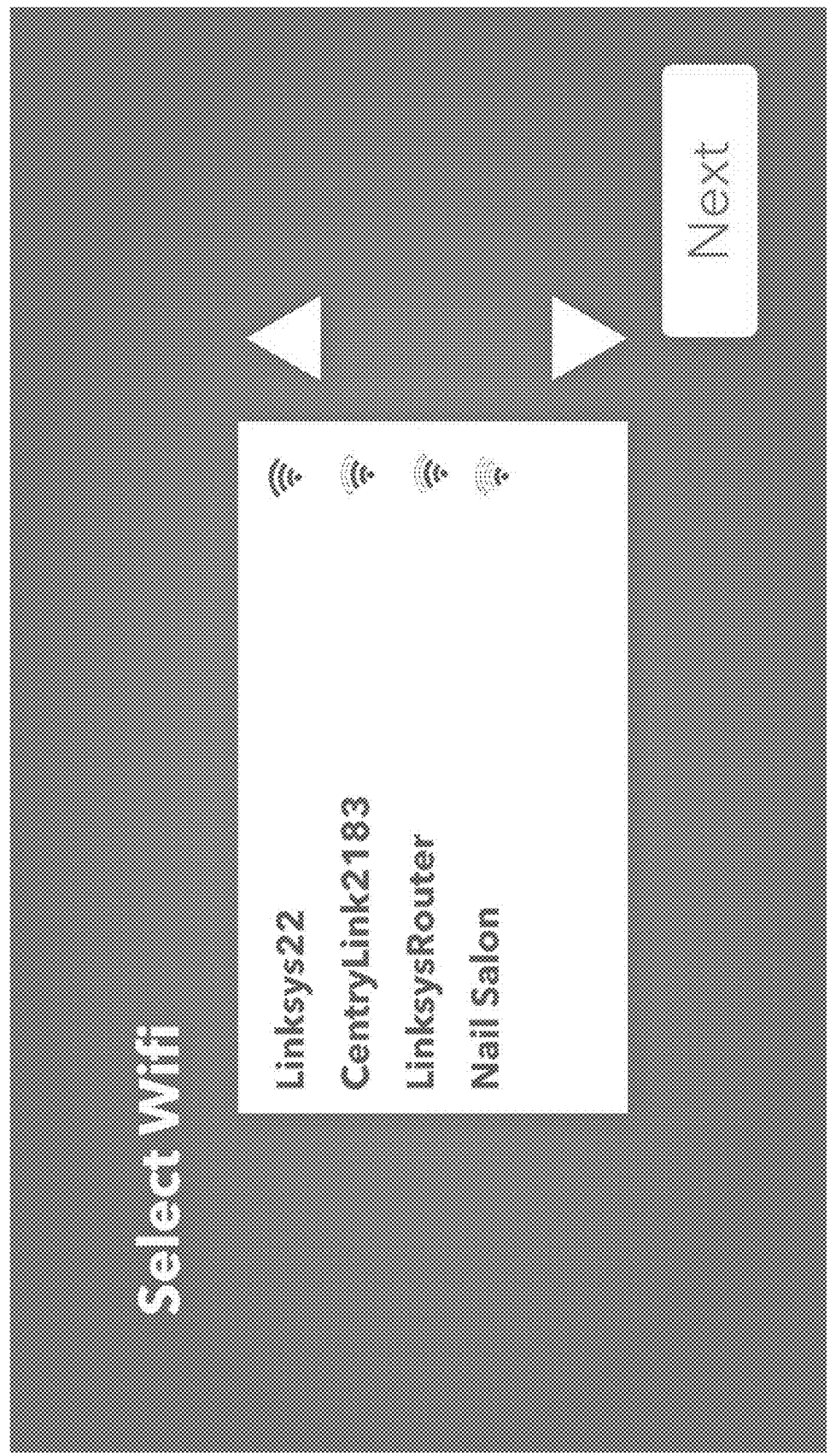
FIG. 010.2

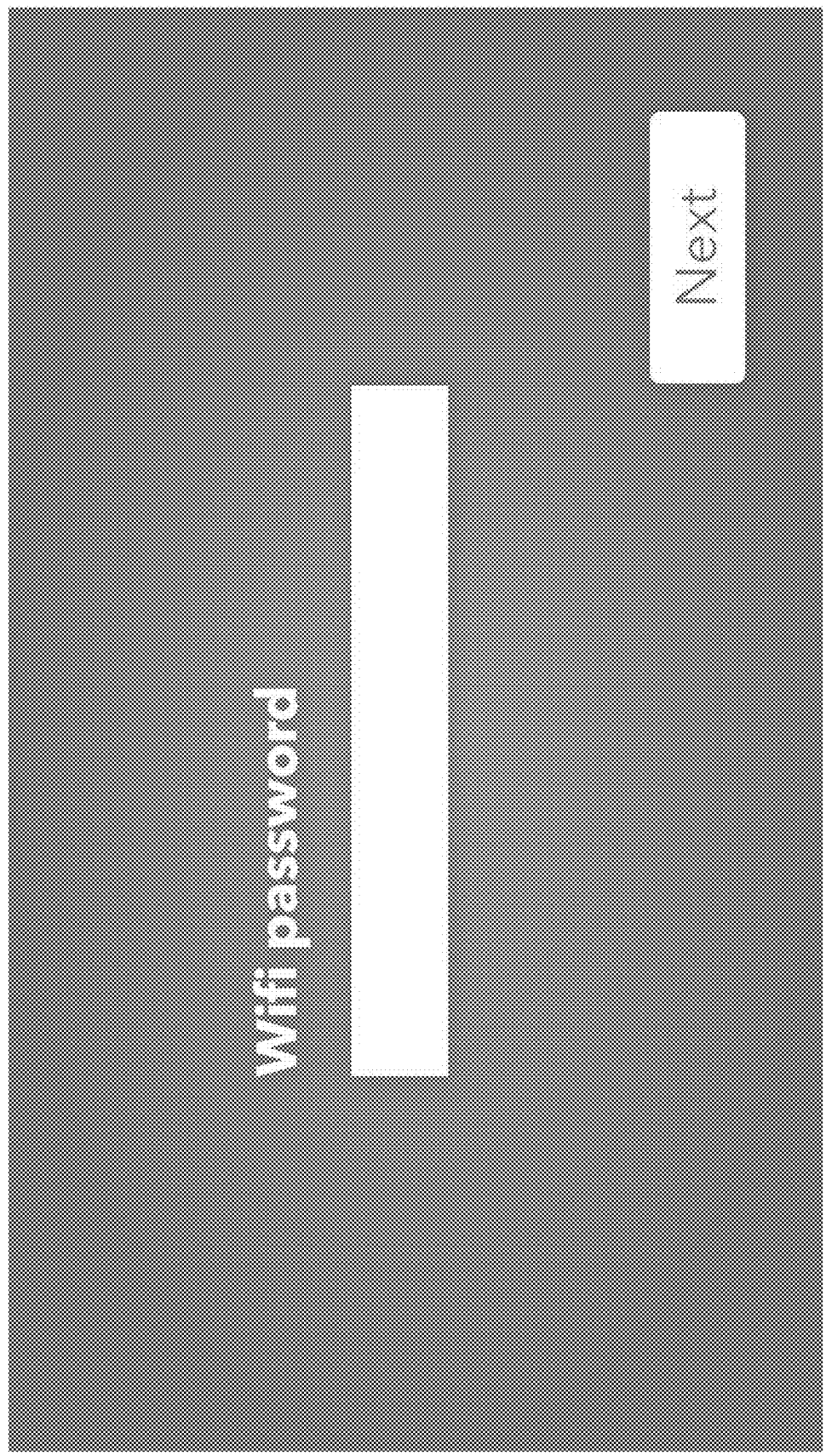
FIG. 010.3

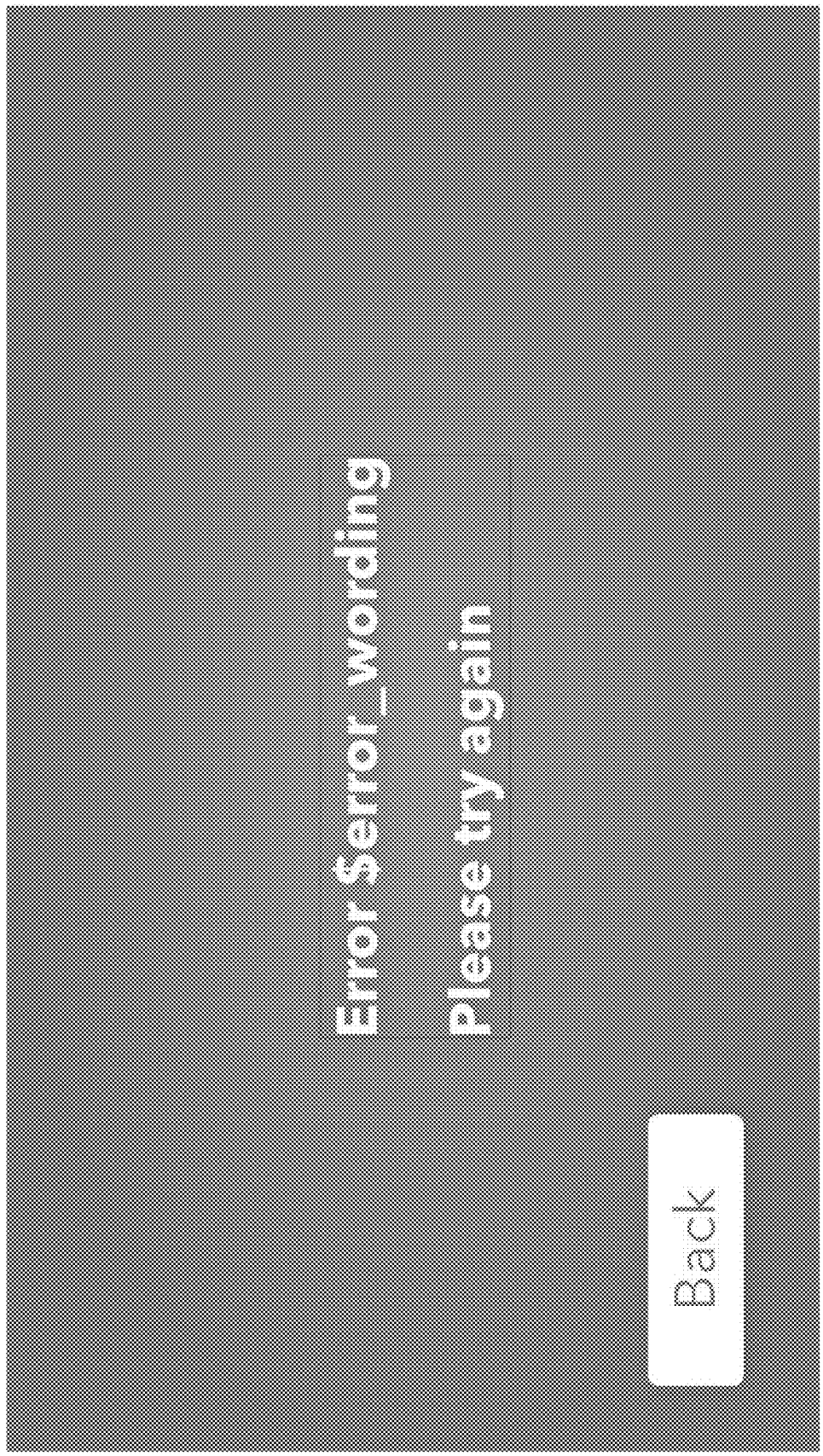
FIG. 010.4

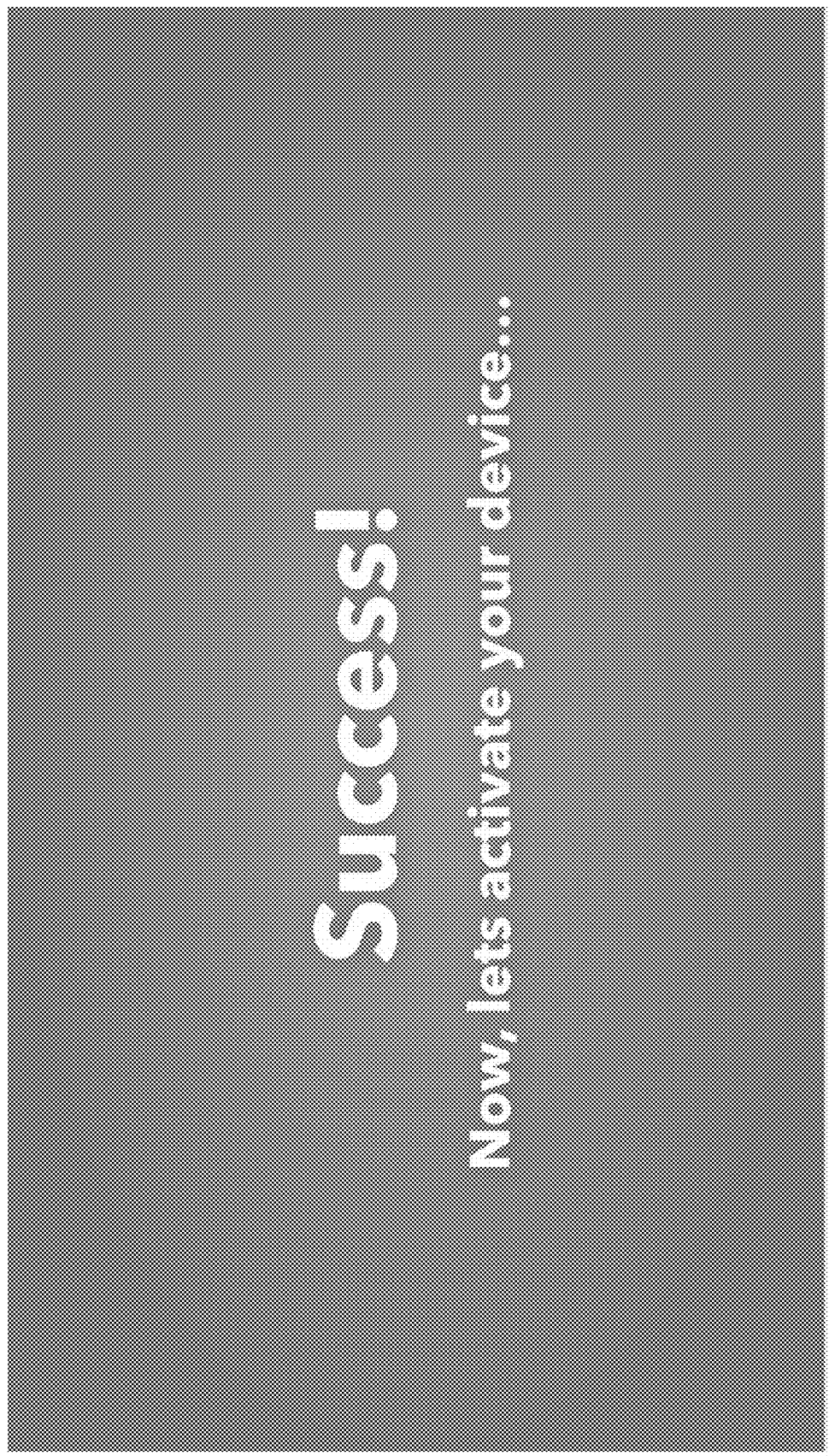
FIG. 010.5

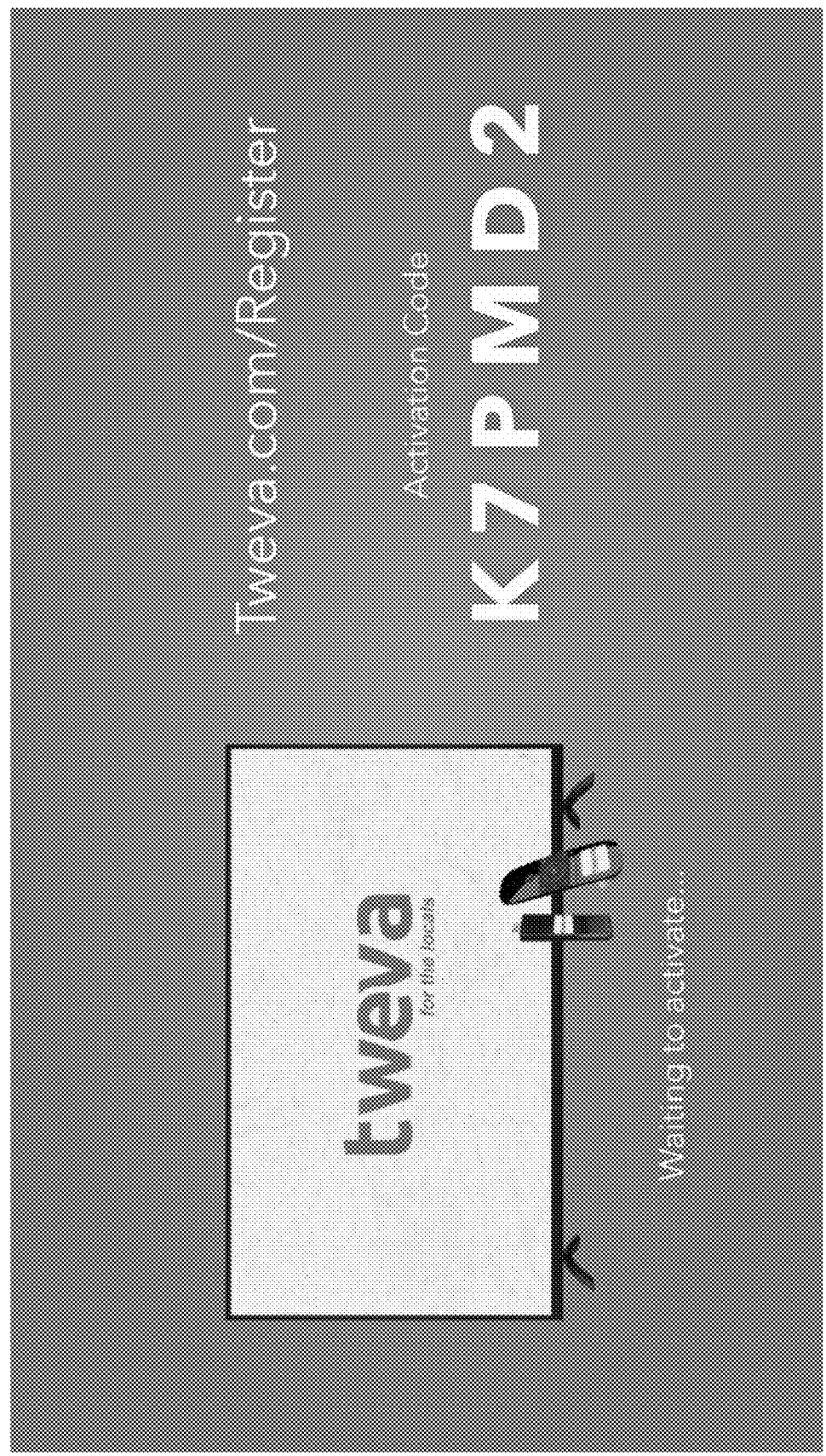
FIG. 010.6

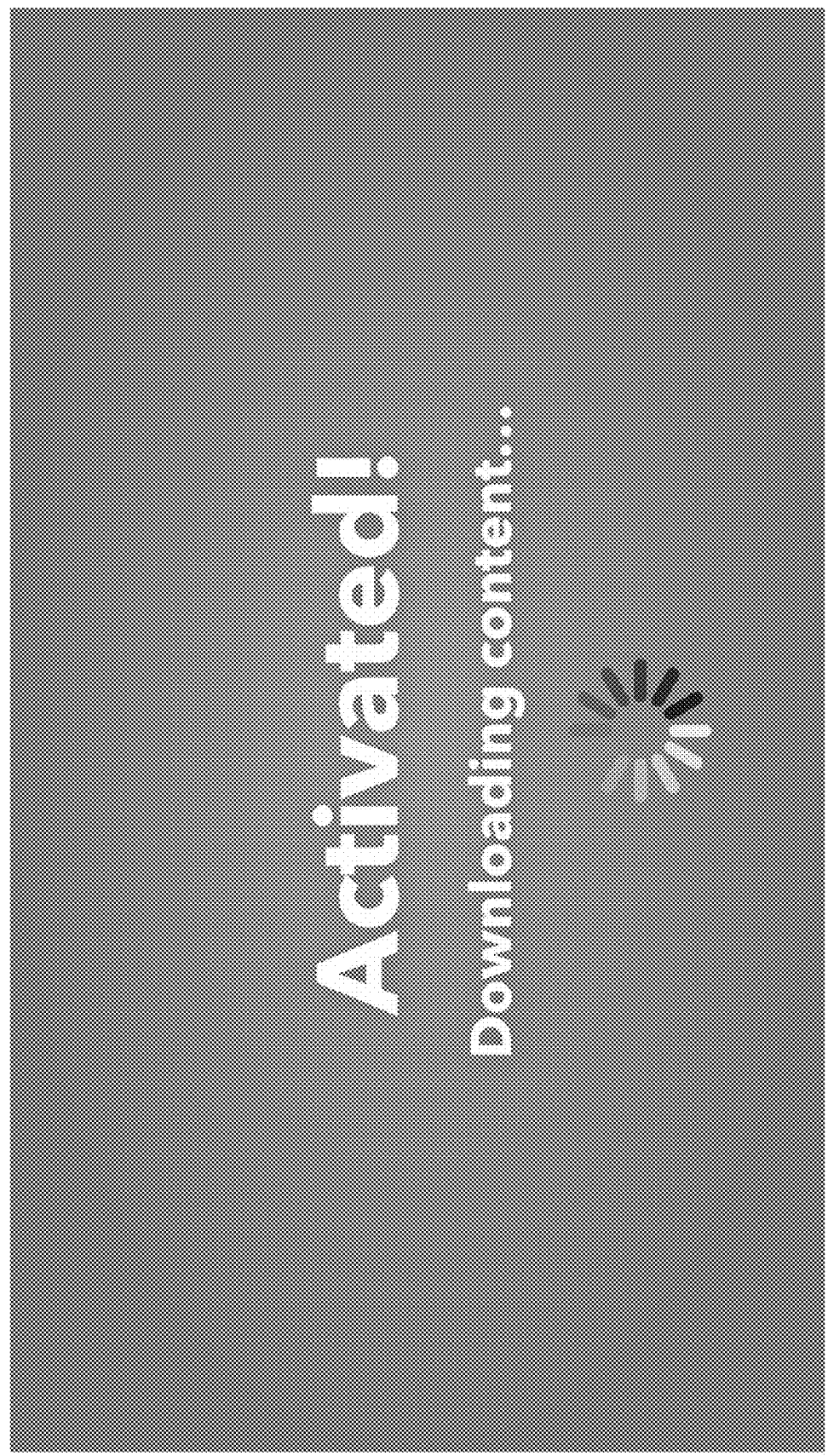
FIG. 010.7

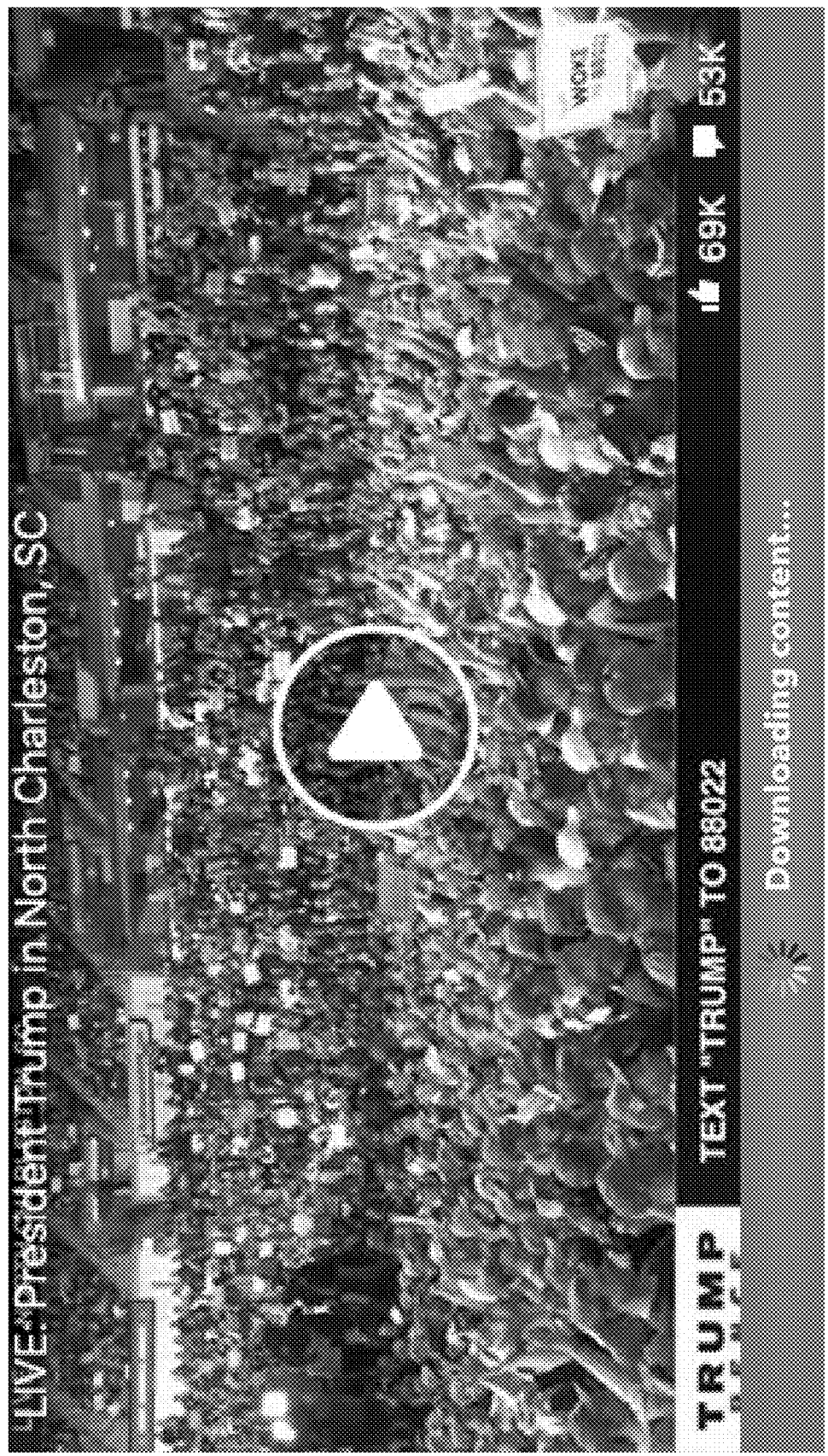
FIG. 010.8

FIG. 012

Title: Device - Discrete Error Screen

Tilt: Scan Display TV with Phone

FIG. 022
"We are happy to see the latest information About the latest customer on here… We are happy to see the latest information About the latest customer on here… We are happy to see the latest"
Frank Smith
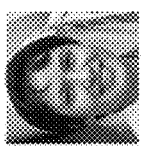
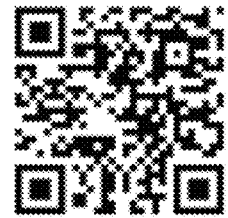

Tile Demo - Slides - Media Examples

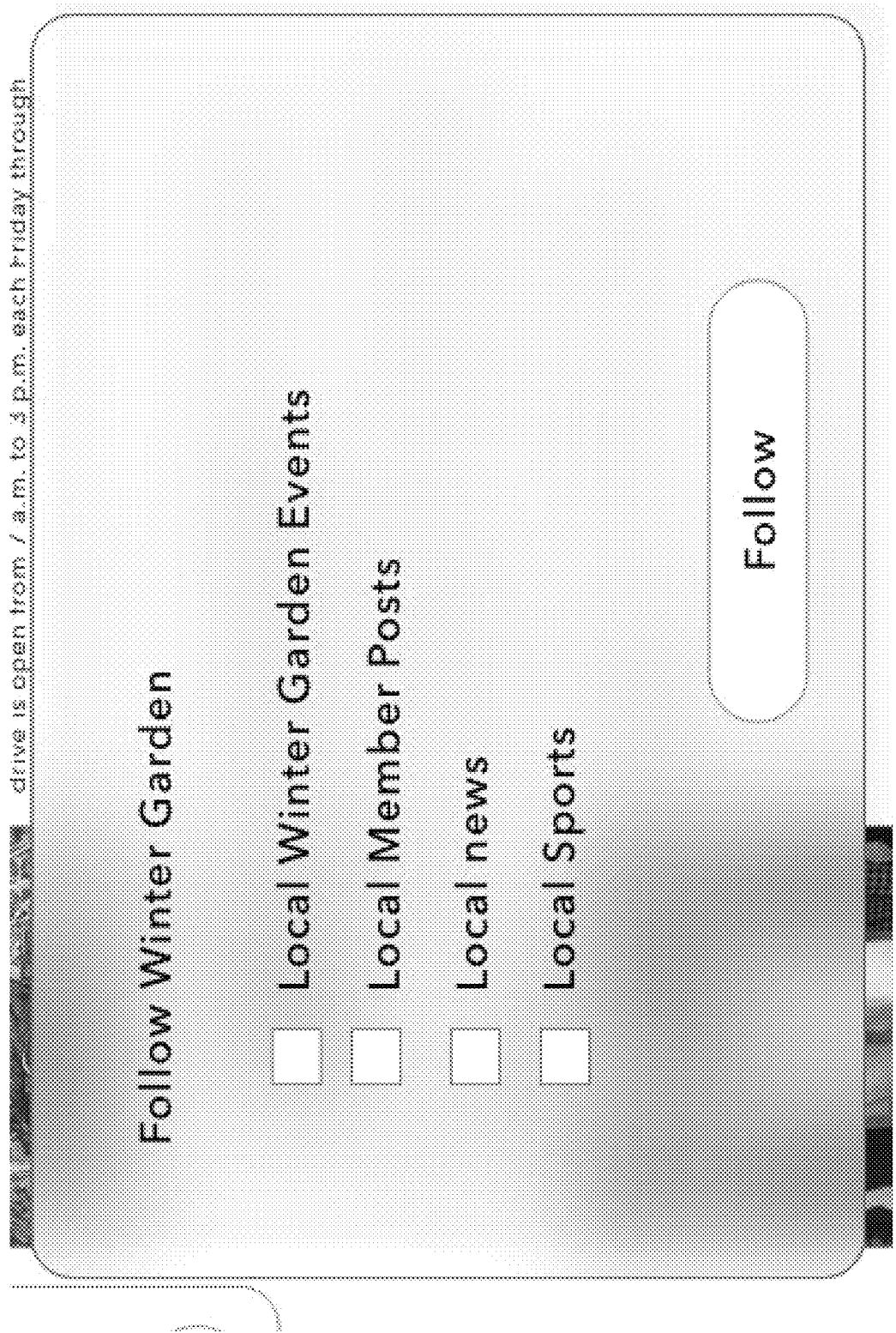
FIG. 027.1

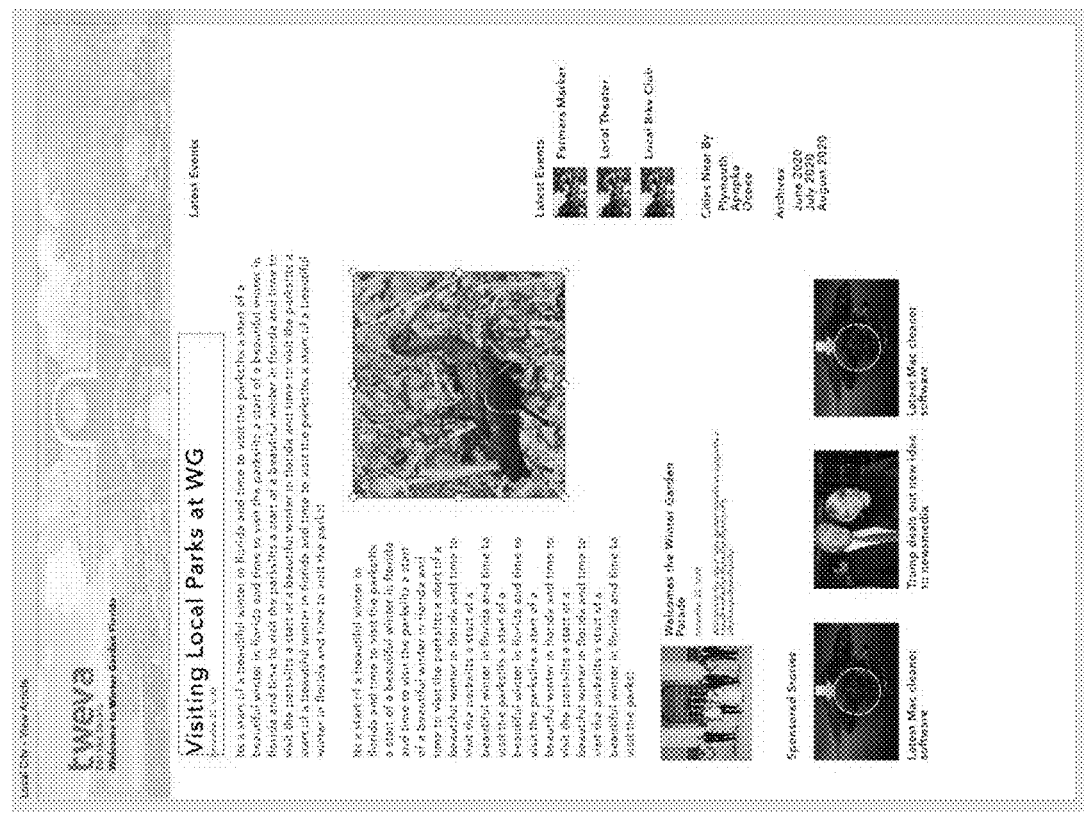
FIG. 027.2
Title Website - Local City page Detail

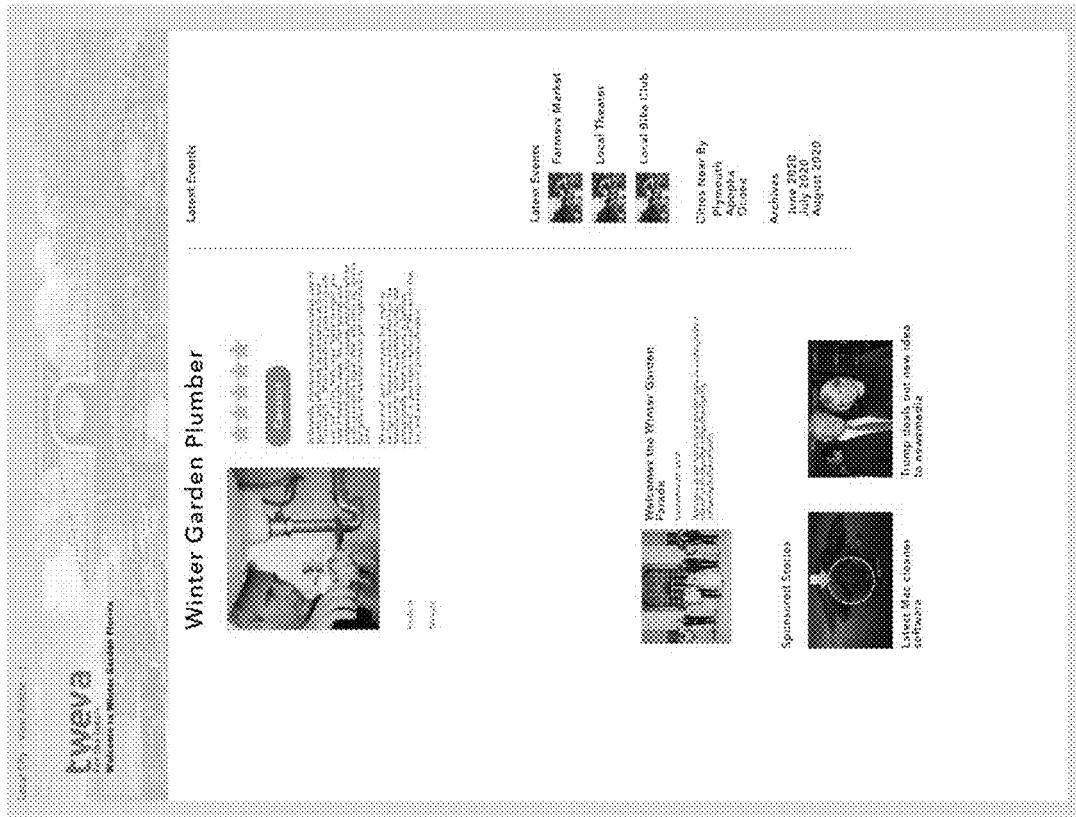
FIG. 027.3

Title: Free Wifi Screen

FIG. 030

SYSTEM AND METHOD FOR PROVIDING A DYNAMIC LOOP OF CONTENT FOR DISPLAY

CROSS-REFERENCE TO RELATED APPLICATIONS

This application is a Non-Provisional application that claims priority to U.S. Provisional Application No. 63/111,744, filed Nov. 10, 2020, the entire contents of which are hereby incorporated by reference as if fully set forth herein, under 35 U.S.C. § 120.

BACKGROUND

Displays are frequently placed in businesses, to show different content. For example, in the waiting area of a business (e.g. doctor office, car repair shop, airport, etc.), a display is frequently placed in the waiting area to output media (e.g. television programs) to entertain clients of the business.

SUMMARY

The inventors of the present invention recognized that although conventional systems are available to provide displays at business locations to output media (e.g. television programs) to clients of that business, these conventional systems have notable drawbacks. For example, the inventors of the present invention realized that the displays of these conventional systems output the media irrespective of the identity of the clients at the business viewing the display. The inventors recognized that this is not an advantageous arrangement, since the clients at the business viewing the display may have no interest in the content being output on the display. Thus, the inventors of the present invention developed an improved method and system where the content output on the displays is contingent on the particular clients at the business viewing the display.

In another example, the inventors of the present invention recognized that the owner of the business has limited control over the content output on the displays. Many conventional systems just involve the business owner selecting a TV channel after which the TV channel outputs whatever content is scheduled for that TV channel. Thus, the inventors of the present invention developed an improved method and system where the owner of the business has control over the content output on the display.

In another example, the inventors of the present invention recognized that the conventional system involves the business owner advertising other businesses (e.g. the commercials broadcast during the TV program) to their clients without compensation. Thus, the inventors developed an improved method and system where the business owner can selectively control which advertisements are output on the display at their business. In one example, the improved method and system permits the user to output advertisements for their business on the display. In another example, the improved method and system permits the user to output advertisements of other businesses whose criteria is selected by the business owner (e.g. non-competing business) and where those advertising business compensate the business owner for the output of the advertisement.

In another example, the inventors of the present invention recognized that the conventional system involves outputting content that is not local to the area of the business (e.g. TV program broadcast to a national audience). Thus, the inventors developed an improved method and system where the content can be controlled by the business owner based on geographic location (e.g., the local area of the business).

In a first embodiment, a method is provided for generating a dynamic loop of content for display. The method includes receiving, on a processor, first data that indicates a characteristic of a loop including a plurality of slots. The method further includes receiving, on the processor, second data that indicates content of a slide for each slot in the loop. The method further includes outputting, on a display, the loop including the content of the slide for each slot in the loop.

In a second embodiment, a graphical user interface is provided to accommodate the method of the first embodiment. The graphical user interface includes a first region with one or more first active areas that respectively indicate one or more displays on which a respective loop is to be output. The graphical user interface further includes a second region comprising a plurality of second active areas that indicate the content of the plurality of slots in the respective loop to be output on the display whose first active area is activated in the first region.

In a third embodiment, a graphical user interface is provided to accommodate the method of the first embodiment. The graphical user interface includes a first region with one or more first active areas that respectively indicate content for a slide to be output in a slot of the loop. The graphical user interface further includes a second region that indicates a first time range over which the loop is being output on the display. One or more second active areas are positioned within the second region such that each second active area corresponds to a second time range within the first range where content of a respective first active area is to be output in the slot of the loop.

In a fourth embodiment, an apparatus is provided to perform one or more steps of the method of the first embodiment.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 002.1 is an image that illustrates an example of a block diagram of a mobile device communicatively coupled with the system of FIG. 002, according to an embodiment;

FIG. 002.2 is an image that illustrates an example of a block diagram of a mobile device communicatively coupled with the system of FIG. 002, according to an embodiment;

FIG. 002.3 is an image that illustrates an example of a block diagram of a flow chart indicating data communicated between the mobile device of FIG. 002.1 and the system of FIG. 002, according to an embodiment;

FIG. 002.4 is an image that illustrates an example of a block diagram of a mobile device communicatively coupled with the system of FIG. 002, according to an embodiment;

FIG. 002.5 is an image that illustrates an example of a block diagram of a user interacting with the system using a headset, according to an embodiment;

FIG. 003 is an image that illustrates an example of a graphical user interface with a plurality of active areas for the respective plurality of slots of the loop of FIG. 001, according to an embodiment;

FIG. 003.1 is an image that illustrates an example of a graphical user interface with a plurality of active areas for the respective plurality of slots of the loop of FIG. 001, according to an embodiment;

FIG. 003.2 is an image that illustrates an example of a graphical user interface with a plurality of active areas to design a slide to be output in one of the slots of the loop of FIG. 001, according to an embodiment;

FIGS. 010.1 through 010.8 are images that illustrate an example of graphical user interfaces output on the display of FIG. 00 during initiation of the apparatus, according to an embodiment;

FIGS. 011 through 014 are images that illustrate an example of content output on the display indicating one or more network metrics, according to an embodiment;

FIG. 022 is an image that illustrates an example of a QR code output on the display and a mobile device configured to scan the QR code in the system of FIG. 002, according to an embodiment;

FIGS. 028 through 030 are images that illustrate an example of graphical user interfaces output on the display of FIG. 00 during initiation of the apparatus, according to an embodiment;

DETAILED DESCRIPTION

A method and apparatus are described for dynamic control of content to be output in a loop of a display. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of dynamically controlling content to be output in a loop on a display. In one embodiment, the embodiments of the invention are described in the context of advertising content on a display located in an entity (e.g. business). In another embodiment, the invention is described in the context of communication of local information (e.g. local information to a business). In yet another embodiment, the invention is described in the context of selectively choosing which content (e.g. media, advertising, local information, etc.) to be output on a display at a location (e.g. business).

1. OVERVIEW

Figure 0:
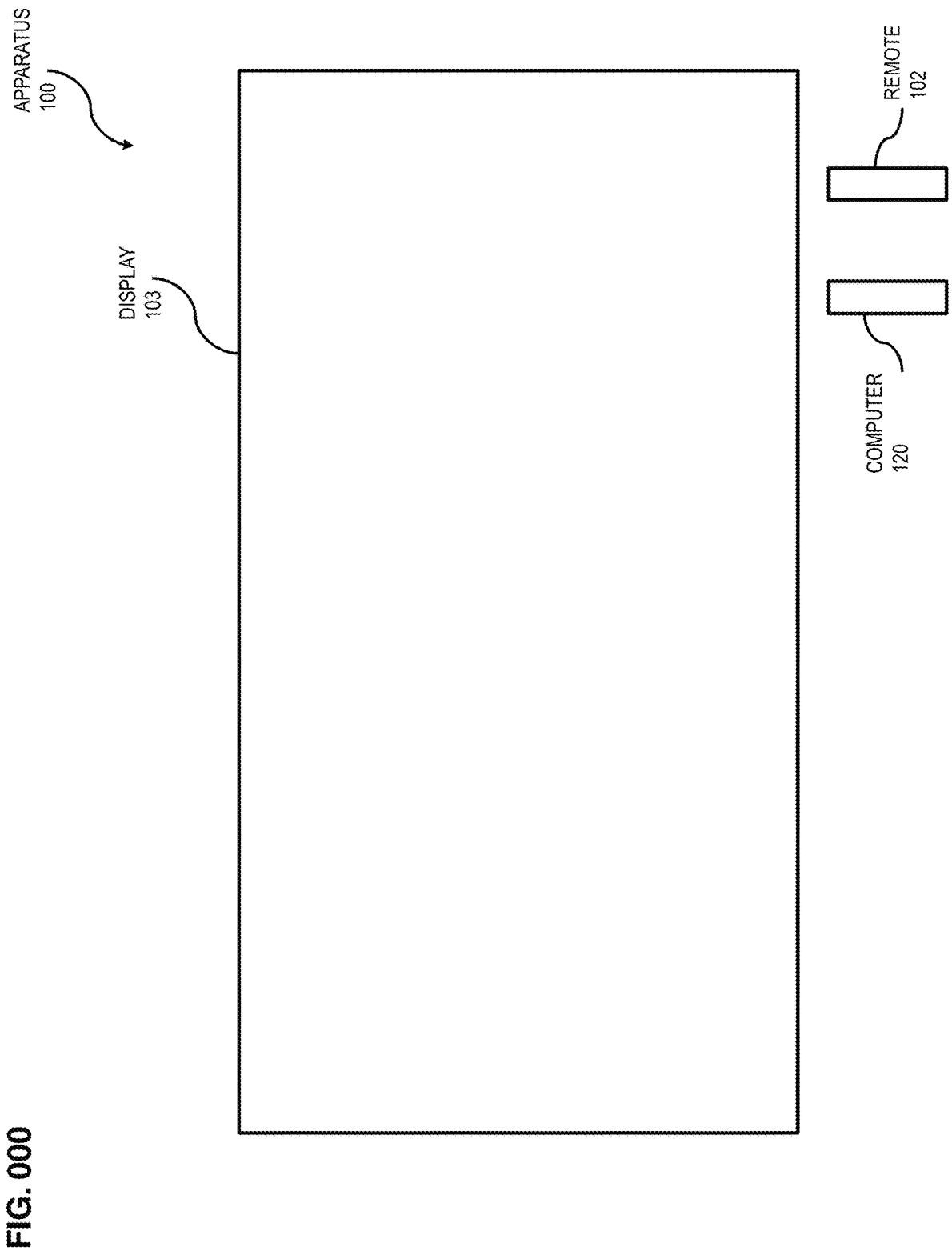
FIG. 000 is an image that illustrates an example of a front view of an apparatus to provide a dynamic loop of content for display, according to an embodiment.

FIG. 000 is an image that illustrates an example of a front view of an apparatus 100 to provide a dynamic loop of content for display, according to an embodiment. In an embodiment, the apparatus includes a display 103, a box or media device 102 that is communicatively coupled to the display (e.g. wired or wireless connection) to transmit data to the display to output one or more slides (e.g. image, video, etc.). In an example embodiment, the data is transmitted to the display to output one or more slides over a respective one or more slots of a loop, as discussed below. In some embodiments, the box is a computer 120 (shown in FIG. 000) which is connected with a port (e.g. USB, HDMI, etc.) of the display 103. In still other embodiments, the display 103 is not part of the apparatus. In one embodiment, the apparatus 100 is positioned at a location of an entity (e.g. business) and the display 103 outputs the content of the one or more slides over the respective one or more slots of the loop. In some embodiments, a plurality of apparatuses 100 are positioned at a location, such at a different positions within the location (e.g. a first apparatus positioned at a bar area of a restaurant, and a second apparatus positioned in a dining area of the restaurant, etc.). For purposes of this description, "apparatus" is one or more of a computer system 3300 (FIG. 33) and/or a chip set 3400 (FIG. 34) and/or a mobile terminal 3500 (FIG. 35). For purposes of this description, a "system" is defined as a plurality of apparatuses that span a plurality of locations (e.g. multiple businesses over multiple geographic locations) and are connected to a central server (e.g. server 3392 of FIG. 33) by one or more network links (e.g. link 3378 of FIG. 33).

Figure 1:
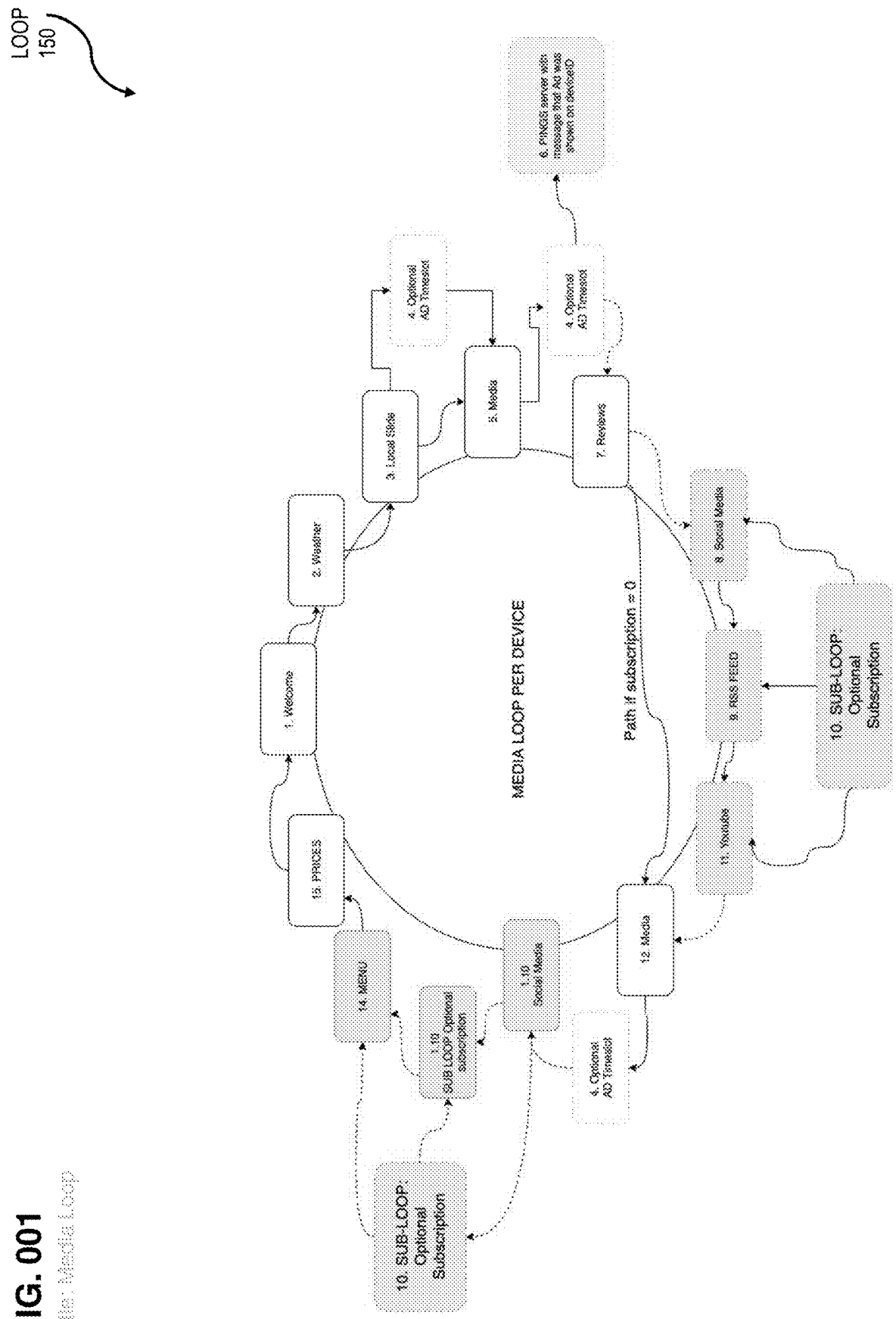
FIG. 001 is an image that illustrates an example of a block diagram indicating a loop of content to be output on a display, according to an embodiment.

FIG. 001 is an image that illustrates an example of a block diagram indicating a loop of content 150 to be output on a display, according to an embodiment. In an embodiment, the block diagram of FIG. 001 includes a plurality of slots where content (e.g. a slide) is placed in each slot of the loop 150. In one embodiment, the loop 150 is output on the display 103 of the apparatus 100 of FIG. 000. In an example embodiment, the loop 150 has a duration (e.g. first time period) and the content in each slot of the loop can change for each iteration of the loop. Although the loop 150 of FIG. 001 depicts a specific number of slots in the loop and specific types of content (e.g. weather, media, etc.) in each slot, this is just one example of a loop 150 and in other embodiments, the number of slots in the loop can be less or more than what is depicted in FIG. 001 and/or the specific type of content in each slot can vary from what is depicted in FIG. 001.

As illustrated in FIG. 001, a slot 1 of the loop 150 includes a welcome slide that outputs an image to initiate the loop. In an example embodiment, the welcome slide includes image data that mentions the apparatus and/or system. A slot 2 of the loop includes a weather slide that outputs data indicating weather in a geographic area (e.g. local area of the business where the apparatus 100 is positioned). A slot 3 includes a slide that indicates local information (e.g. information regarding an upcoming even in the local area of the business). An advertisement slot 4 includes a slide that indicates advertising information of a business. In some embodiments, the advertisement slot 4 outputs a slide that indicates advertising information of a business other than the business where the apparatus is located (e.g. a non-competing business with the owner of the business where the apparatus is located). In other embodiments, the advertisement slot 4 outputs a slide that indicates advertising information of the business where the apparatus is located. In some embodiments, the advertisement slot 4 is optional and thus may be excluded in certain circumstances (e.g. in the event that no data is received by another business to output in the slot corresponding to the advertisement slot 4).

As illustrated in FIG. 001, a slot 5 of the loop includes a media slide that outputs media (e.g. image and/or video) selected by the owner of the business where the apparatus is located. In one embodiment, the media slide is an image or video of goods sold by the business owner (e.g. shows one or more cooked Italian dishes offered by the Italian restaurant where the apparatus is located). In an embodiment, another advertisement slot 4 is provided after the slot 5. However, as with the previous advertisement slot 4, the second advertisement slot 4 is optional and thus may be excluded (e.g. in the event that no business provides data to be output in the advertisement slot 4).

In an embodiment, an advertisement confirmation block 6 is provided where data is transmitted to the apparatus 100 (e.g. to the server of the system) after a slide is output in the advertisement slot 4. In an example embodiment, the advertisement confirmation block 6 is provided to confirm that the advertising content was output on the display in the advertisement slot 4 (e.g. for purposes of the system billing the business who advertised in the advertisement slot 4). In some embodiments, the business who advertised the advertisement slot 4 may obtain credit (or tokens) based on each instance that the confirmation block 6 confirms that the business advertised the advertisement slot 4. In an example embodiment, where business A advertises an advertisement slot 4 for business B, block 6 is used to obtain credits (or token) for business A in the system. In this example embodiment, business A can subsequently use these credits/tokens in order to request that business B output an advertisement slot 4 at the location of business B which advertises business A. Thus, in these embodiments, businesses which participate in the system have allocated tokens/credits which can then be redeemed based on that business having their advertisement slots 4 output at other businesses. In a further example embodiment, the data transmitted by the advertisement confirmation block 6 includes multiple data fields including the specific advertisement content on the slide, the identity of the business that was advertised, an identity of the specific display (e.g. if multiple displays are provided at the location) that output the advertisement in the slot 4 and/or an identity of the business (e.g. where the apparatus is located that output the advertisement). In one embodiment, in the event that the apparatus (e.g. display, media device, etc.) cannot connect to the server to transmit the data indicating that the advertisement was displayed, the apparatus is configured to store the data (e.g. in a memory of the media device) which is subsequently retrieved and transmitted to the server once a connection is established.

As illustrated in FIG. 001, a slot 7 of the loop 150 includes data that indicates a review of the business where the apparatus is located. In an embodiment, the data indicates a review of the business that meets certain criteria set by the owner of the business where the apparatus is located. In an example embodiment, the criteria is a minimum rating (e.g. 5 stars) and/or has received approval to show in the slot 7 (e.g. the owner of the business approved the review prior to showing in the slot 7). In an example embodiment, the review is provided by a social media source (e.g. Facebook®, Yelp®, etc.).

As illustrated in FIG. 001, a slot 8 of the loop includes data from a social media source (e.g. Facebook®). In one embodiment, the data is from a social media page for the business where the apparatus is positioned (e.g. Facebook® page for the restaurant, or from any Facebook® page based on criteria provided by the business owner). In one embodiment, a slot 9 of the loop includes data provided from a selected website (e.g. RSS feed) based on criteria provided by the owner of the business where the apparatus is located. In another embodiment, a slot 10 of the loop includes video data from a source (e.g. YouTube®). In one embodiment, the data is selected from the source based on criteria provided by the business owner where the apparatus is located (e.g. classic car criteria provided by the owner, thus the slot 10 outputs a video from YouTube® of classic cars). In one embodiment, block 10 indicates that slots 8, 9 and 11 are an optional sub-loop within the loop of FIG. 001. In an example embodiment, the block 10 represents a sub-loop that is based on a user subscription to the addition of the slots 8, 9, 11 (e.g. based on payment provided to the operator of the system).

As illustrated in FIG. 001, a slot 12 of the loop includes a media slide that is similar to slot 5. In another embodiment, after the slot 12 another advertisement slot 4 is provided is similar to the first advertisement slot 4. The slots 1.10 and 14 includes a subloop that is similar to the sub-loop 10 previously discussed. In one example embodiment, unlike the first sub-loop 10, the second sub-loop 10 includes a slot 14 that outputs data indicating a menu (e.g. where the business that the apparatus is located at is a restaurant).

As illustrated in FIG. 001, a slot 15 of the loop 150 includes data that indicates prices of the goods and/or services offered by the business where the apparatus is located. In an example embodiment, the slide output at the slot 15 is a menu with a list of items and prices where the business is a food establishment. In another example embodiment, the slide output at the slot 15 is a list of prices for services where the business provides a service (e.g. nail salon, massage, etc.). In an embodiment, after the slot 15 the loop goes back to slot 1 and the loop commences again.

In an embodiment, the loop depicted in FIG. 001 is one example embodiment of a loop 150 and the loop can include less or more slots than the loop depicted in FIG. 001. Additionally, the content of the slides (e.g. content type) of the loop can be different from the type of content or category of slides depicted in FIG. 001. In one embodiment, the loop 150 does not repeat the slides within each slot for each iteration of the loop. In an example embodiment, one or more slides at one or more slots of the loop 150 change for each iteration of the loop. In one example embodiment, if a business is open for 8 hours per day and the loop has a duration of 30 minutes, in one embodiment, the display could output sixteen loops over the business day, where each slot of each loop may be the same or different throughout the day.

Figure 2:
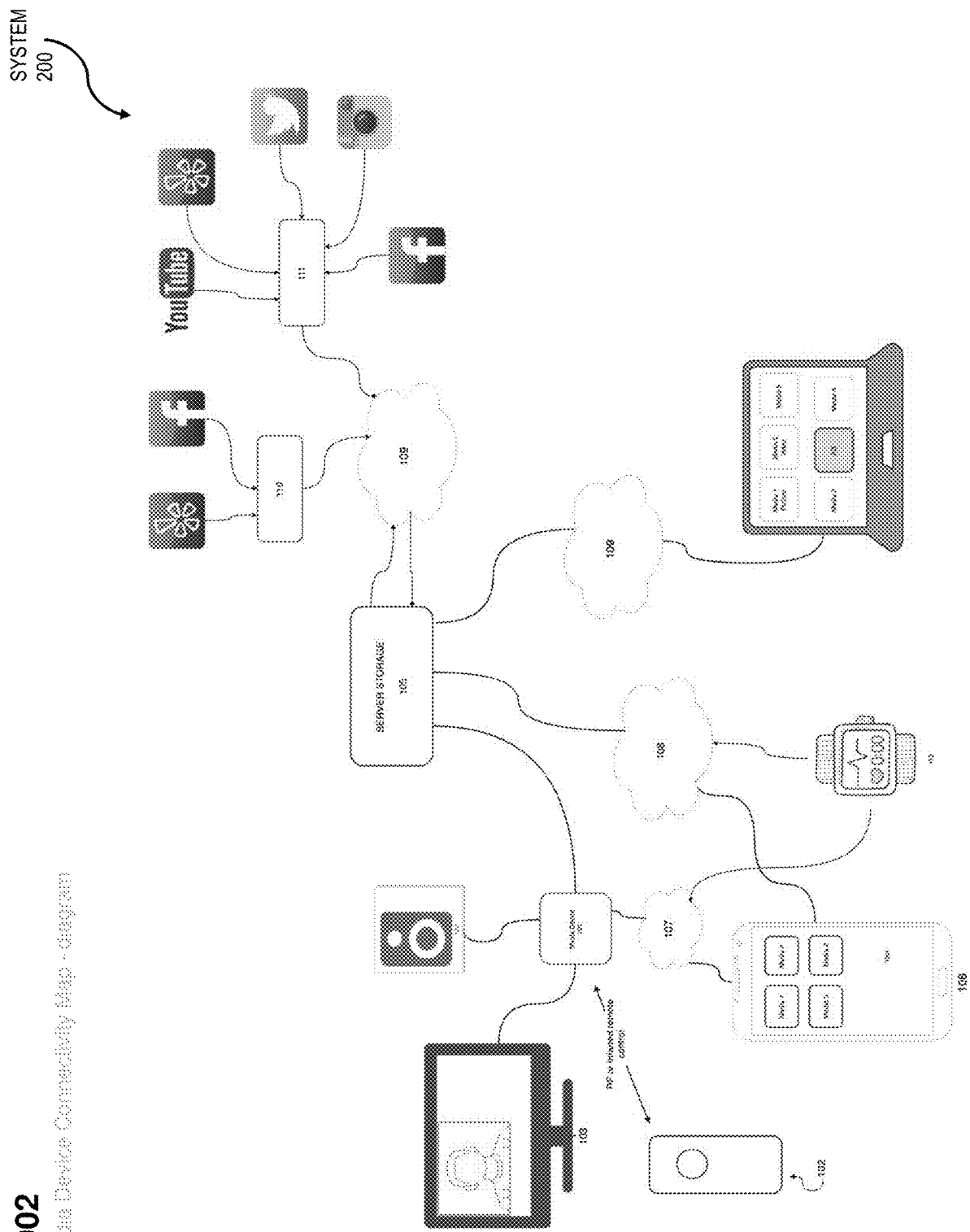
FIG. 002 is an image that illustrates an example of a block diagram of a system for providing a dynamic loop of content for display, according to an embodiment.

FIG. 002 is an image that illustrates an example of a block diagram of a system 200 for providing a dynamic loop of content for display, according to an embodiment. In an embodiment, the system includes the apparatus 100 of FIG. 000 including the box or media device 101, the remote control 102 and the display 103. In one embodiment, the apparatus 100 also includes a sensor (e.g. optical sensor) that is capable of detecting a presence of people in a vicinity of the display 103. In an example embodiment, the sensor is a camera or motion sensor mounted to the display 103. In an example embodiment, data from the sensor (e.g. indicating a presence of individuals in the vicinity of the display 103 and/or a quantity of individuals in a vicinity of the display 103 at a particular time and/or whether individuals in a presence of the display 103 viewed the display 103 at a certain time when a certain slide was displayed, etc.) is transmitted to the media device 101 and/or the server 105 and this data is used to edit the loop 150 of the display 103.

Figure 33:
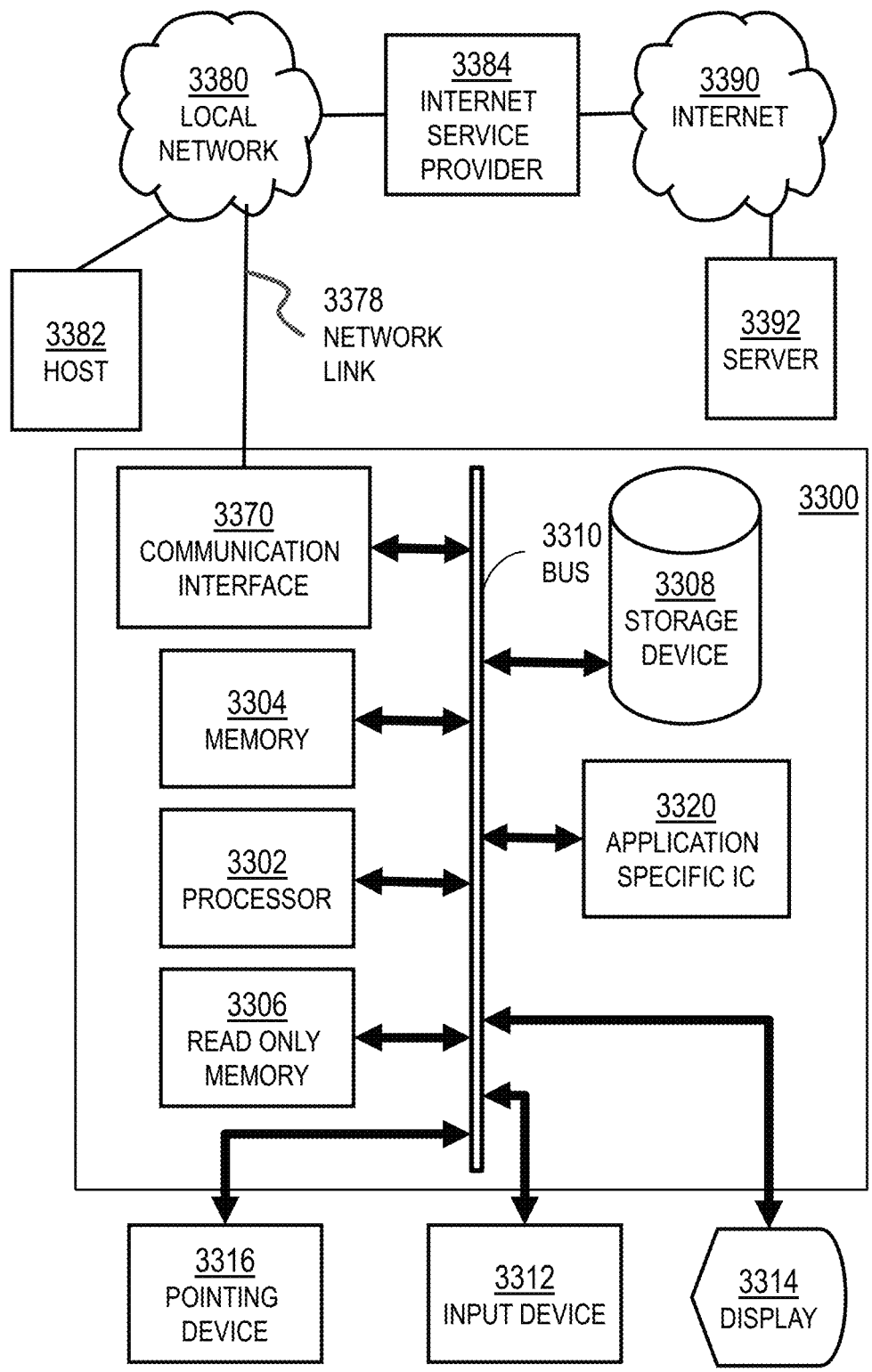
FIG. 33 is a block diagram that illustrates a computer system upon which an embodiment of the invention may be implemented.

One or more apparatuses 100 are connected to a server 105 through a network link. In an example embodiment, the central server 105 provides server storage (e.g. content media storage), such as the content of each slide in the loop. As shown in FIG. 33, each apparatus 3300 includes a display 3314 and pointing device 3316 (e.g. mouse or touchscreen sensor on the display) and/or input device 3312 (e.g. a touch sensor configured to receive input from the user based on touch, such as a touchscreen on the display 3314) and is connected via a network link 3378 to the server 3392. In an embodiment, an audio device 104 is provided such that content (e.g. audio stream) can be output at the audio device 104 (e.g. one or more speakers in a dining room of a restaurant). In some embodiments, the stream of content provided to the audio device 104 is independent of the stream of content provided to the display 103 (e.g. audio device 104 in a dining room of a restaurant, the display 103 in a bar area of the restaurant, etc.).

In one embodiment, a mobile device 106 is provided that is similar to the mobile terminal 3501 of FIG. 35. In one embodiment, the mobile device 106 is a device of the owner of the business where the apparatus 100 is located and is used to control the content of one or more slides output on the display 103. Alternatively, the business owner could use a wearable device 112 (e.g. watch) or a laptop (shown in FIG. 002) to control the content that is output in one or more slots of the loop 150 on the display 103. In an example embodiment, the business owner can use finger touch or voice commands (e.g. to remove the current slide in the loop being output on the display 103, remove the last slide that was just output on the display 103, etc.) with the mobile device 106 (or wearable device) to control the content in one or more slots of the loop 150.

As shown in FIG. 002, the mobile device 106 is connected to the box or media device 101 by a network 107 (e.g. PAN network). In an example embodiment, the PAN network has a minimum range (e.g. 30 to 90 feet) and/or uses a Bluetooth® connection (or similar short range personal network) to connect the mobile device 106 to the media device 101.

As shown in FIG. 002, the mobile device 106 can be connected to the server 105 by a network 108 (e.g. LAN or Local Area Network). In another embodiment, the laptop (e.g. or the mobile device 106 or wearable device 112) can be connected to the central server 105 by a network 109 (e.g. WAN or Wide Area Network).

As shown in FIG. 002, a block 110 is an input block that receives data from one or more external sources. In one embodiment, the block 110 receives data to be output in the slot 7 of FIG. 001 (e.g. review slide). In an example embodiment, the external source is a social media site that provides review data (e.g. Facebook®, Yelp®, etc.) of businesses. In an example embodiment, the review data is provided from the block 110 to the server 105 through the network 109 (e.g. WAN). In an example embodiment, the review data received at the central server 105 is filtered based on criteria provided by the business owner (e.g. minimum rating, such as 5 stars) and/or is filtered by sending the data to the business owner for express approval to output in the slot 7 of FIG. 001. This advantageously permits the business owner to output positive review data in the loop, while at the same time filtering out review data that is either not accurate or favorable to the business owner.

As shown in FIG. 002, a block 111 is an input block that receives data from one or more external sources. In one embodiment, the block 111 receives data to be output in the slot 8, 10 or 1.10 of FIG. 001 (e.g. social media slide). In an example embodiment, the external source is a social media site that provides data (e.g. Facebook®, Yelp®, YouTube®, Instagram®, Twitter®, etc.). In an example embodiment, the data is provided from the block 111 to the server 105 through the network 109 (e.g. WAN). In an example embodiment, the data received at the central server 105 is filtered based on criteria provided by the business owner (e.g. a topic of interest, such as classic cars, etc.) and/or is filtered by sending the data to the business owner for express approval to output in the slot 8, 10 or 10.1 of FIG. 001. This advantageously permits the business owner to output social media data in the loop based on a topic selected by the business owner (e.g. a topic of interest, etc.).

FIG. 002.1 is an image that illustrates an example of a block diagram of a mobile device 33.2 communicatively coupled with the system 200 of FIG. 002, according to an embodiment. In an embodiment, the mobile device 33.2 is similar to the mobile terminal 3501 of FIG. 35 and/or mobile device 106 of FIG. 002. In an embodiment, the user 33.1 in FIG. 002.1 is a customer of the business where the apparatus 100 is located and/or an individual who is not a customer of the business but would like to advertise content on the display 103 located in the business. The box or media device 33.3 is similar to the box or media device 101 of FIG. 002 and the display 33.7 is similar to the display 103 of FIG. 002. In one embodiment, when the user 33.1 is within a defined proximity 33.4 of the media device 33.3, a connection (e.g. Wi-fi connection) is enabled on the mobile device 33.2. The mobile device 33.2 can then connect through the network 33.8 connection (e.g. PAN or WAN connection) to the media device 33.3. Once connected, a connection is established between the mobile device 33.2 and the central server 33.6 through the internet 33.5. This connection indicates to the system 200 that the user 33.1 is present at the location of the apparatus 100 (e.g. the business location where the display 33.7 is located). Based on this connection, the content of the display 33.7 at each slot of the loop 150 can be adjusted. In an example embodiment, the user 33.1 establishes a profile in the sever 33.6 and data from the user profile is then retrieved and used to adjust the content of the slides output in one or more slots of the loop 150. In an example embodiment, where the user profile indicates an interest in plumbing, an advertisement is output in the advertisement slot 4 of a plumbing business in the loop 150. In some embodiments, the advertisement slot 4 is output on the loop 150 of the display 33.7 at the business only during a time period that the user 33.1 is within the defined proximity 33.4 of the media device 33.3 and ceases once the user 33.1 is no longer within the defined proximity 33.4.

In still other embodiments, as shown in FIG. 002.1, a message 33.10 (e.g. email, push notification, text, etc.) is transmitted to the user 33.1 within an immediate or delayed time 33.9 after the user leaves the proximity 33.4 of the business. In some embodiments, the messages begin or start when the user visits the business location where the apparatus 100 is positioned. In other embodiments, if the user 33.1 adjusts their profile in the server 33.6 to not receive messages (e.g. or certain types of messages) then the messages are not transmitted to the user 33.1 after the time criteria 33.9.

In still other embodiments, if the user 33.1 visits a first business at a first time period (e.g. and connects with a short range network 33.8, such as a wi-fi network, at the first business) and then subsequently visits a second business at a second time period, then the slide content in the loop 150 of the display 33.7 at the second business is adjusted to include content related to the first business, since the server 33.6 profile of the user has stored data indicating that the user has an interest in the first business. In one example embodiment, the display 33.7 at the second business outputs advertisement slides (e.g. at slot 4) in the loop 150 of businesses of the same category as the first business (e.g. assuming they are non-competing with the second business). In still other embodiments, the loop 150 of the display 33.7 at the second business may include slide content corresponding to the first business (e.g. YouTube® video that has a similar category as the first business). The inventors of the present invention recognized that this would advantageously customize the slide content of the display 33.7 at each business based on the users who are actually present at the business location and data that indicates known preferences of the user(s) that are present at the business and/or create a unique or dynamic loop (e.g., that may never be created again in the same form based on how many people are in the business at that point in time).

FIG. 002.2 is an image that illustrates an example of a block diagram of a mobile device communicatively coupled with the system 200 of FIG. 002, according to an embodiment. In an embodiment, FIG. 002.2 depicts a vehicle (e.g. car) in which a user is and is within a proximity 034.3 of a business 034.1 where an apparatus 100 is positioned and is connected with the system 200. In one embodiment, a GPS satellite 034.4 tracks the position of the user based on the position of the mobile device 034.2 of the user. In one embodiment, the server 033.6 receives position data from the GPS satellite 034.4 and determines whether or not the user (via the position of the mobile device 034.2) is within the proximity 034.3 of the business 034.1. Upon the server 033.6 determining that the user is within the proximity 034.3 of the business 034.1 and further determining that the user (e.g. via the user profile stored in the server 033.6) has an interest in the type of business 034.1, the server 033.6 transmits a message (e.g. email, text, push notification, etc.) to the mobile device 034.2 of the user to alert them of the nearby business 034.1. In an example embodiment, the user with the mobile device 034.2 may be on vacation in an area where they are not familiar with the different businesses. In this example embodiment, based on the user profile data stored in the server 033.6, the server 033.6 transmits a message to the user when they are within the proximity 034.3 of a business 034.1 that corresponds with profile data (e.g. the business 034.1 is an Italian restaurant and the user profile indicates prior visits to Italian restaurants in different geographical locations). In a further example embodiment, the server 033.6 may transmit the message to the user based on a combination of the business 034.1 and timing data (e.g. if the user previously visits Italian restaurants every Thursday night and the user is on vacation in an area with an Italian restaurant, the message is transmitted to the user on Thursday night).

FIG. 002.3 is an image that illustrates an example of a block diagram of a flow chart indicating data communicated between the mobile device 033.2 of FIG. 002.1 and the system 200 of FIG. 002, according to an embodiment. In an embodiment, the block diagram of FIG. 002.3 indicates transmission of data within the system 200 upon a user scanning a QR code (e.g. with a mobile device 033.2, see FIG. 002.1) and/or an RFID scanner (e.g. phone chip) using network technology. In one embodiment, upon the user scanning the QR code of an advertisement output on the display 103 (e.g. advertisement slot 4, that includes a special offer/discount, etc.), the mobile device 033.2 receives a landing page where the user can input data (e.g. email address, cell phone number, etc.) and then is brought to a destination (e.g. final destination URL) that includes data that can be used by the user to achieve a discount or special (e.g. a coupon code).

FIG. 002.4 is an image that illustrates an example of a block diagram of a mobile device communicatively coupled with the system 200 of FIG. 002, according to an embodiment. In one embodiment, when a user (e.g. retail customer) uses a mobile device 2.4.5 (e.g. with an installed app for the system installed on the app) at a location with an installed apparatus, the mobile device 2.4.5 is configured to connect (e.g. sync) through network 2.4.3 or 2.4.4 so that the loop 150 being shown on the display 2.4.1 is also displayed on the mobile device 2.4.5. In one embodiment, FIG. 002.4 depicts that the mobile device 2.4.5 displays the same slide that is currently being shown on the display 2.4.1. As further shown in FIG. 002.4 the mobile device 2.4.5 also displays one or more active areas (e.g. follow, offers, contact, etc.) that the user can select (e.g. via touchscreen) to receive further content regarding the current slide. In one example embodiment, the mobile device 2.4.5 is connected with the apparatus 100 and displays the loop 150 on the mobile device 2.4.5 if the app associated with the system 200 is open on the mobile device 2.4.5 (e.g. and the user of the mobile device is registered with the app). This advantageously prevents the loop 150 being automatically displayed on the mobile device of every retail customer to the business, who may not want to view the slides on their mobile device and/or to receive further content regarding each slide. In still other embodiments, this arrangement of FIG. 002.4 conveniently permits the user to hear audio associated with a slide (e.g. in the event that the display 2.4.1 is muted). In yet another embodiment, as shown in FIG. 002.4 the mobile device outputs active areas (e.g. forward, reverse, pause) for the user of the mobile device to view previous (e.g. pressing reverse) or subsequent slides (e.g. pressing forward) and/or pause the current slide (e.g., pressing pause). This advantageously gives each retail customer of the business the ability to selectively view different slides of the loop 150 based on their own preferences.

FIG. 002.5 is an image that illustrates an example of a block diagram of a user interacting with the system 200 using a headset, according to an embodiment. In an embodiment, the user is wearing a device 002.5.1 (e.g. smart glasses, virtual reality headset, augmented reality headset, etc.) that is connected to the display 02.5.3 via network 002.5.2. As further shown in FIG. 002.5, an image 002.5.4 is a field of view of the user wearing the device 002.5.1 and viewing the display 002.5.3. In an embodiment, the image 2.5.4 shows multiple icons 2.5.5, 2.5.6, 2.5.7, 2.5.8 that appear in the field of view of the device 2.5.1 and overlay the display 2.5.3. In an example embodiment, the icon 2.5.5 is a pop-up for the slide that is currently being shown on the display 2.5.3. In this example embodiment, the user can select one or more icons 2.5.6, 2.5.7, 2.5.8 associated with this pop up 2.5.5 to obtain further information regarding the content on the slide. In an example embodiment, selection of the icon 2.5.6 will permit the user to follow the business advertised on the slide; selection of the icon 2.5.7 will permit the user to obtain offers/discounts associated with the business advertised on the slide; and selection of the icon 2.5.8 will permit the user to transmit a message to the business advertised on the slide. If the smart glasses have an app (e.g. Tweva app) installed with the object, it will track that the user looked at the display and may advertise using remarketing campaigns based on user location when viewing other similar like items.

FIG. 003 is an image that illustrates an example of a graphical user interface 300 with a plurality of active areas 305 for the respective plurality of slots of the loop 150 of FIG. 001, according to an embodiment. In an embodiment, the graphical user interface 300 of FIG. 003 is output on one of the devices used by the business owner (e.g. mobile device 106, wearing device 112, laptop, etc.) to control the slide content output on the loop 150 of the display 103. In an embodiment, the graphical user interface 300 includes a plurality of active areas 305 where each active area 305 represents a design of a slide to be output in the slot of the loop. In an example embodiment, each active area includes an icon (e.g. "export to slide") that can be activated to move the design to a slot in the loop.

FIG. 003.1 is an image that illustrates an example of a graphical user interface 310 with a plurality of active areas 315 for the respective plurality of slots of the loop 150 of FIG. 001, according to an embodiment. In an embodiment, the graphical user interface 310 depicts an active area 315 for each slot in the loop 150. In one embodiment, the graphical user interface 310 also includes an identifier (e.g. colored perimeter in FIG. 003.1) that identifies the current slide being output in the current slot of the loop 150 in real time. In another embodiment, the graphical user interface 310 further includes icons (e.g. play, pause, previous slide, next slide, rewind, forward, etc.) within the current slide being output, so that the user can actively adjust the playing of the content of the current slide, in real time. In an example embodiment, the back icon will cause the loop to repeat the previous slide in the previous slot of the loop. In another example embodiment, the forward icon will cause the loop to output the next slide in the next slot of the loop 150. In another embodiment, the graphical user interface 310 includes icons that can adjust one or more parameters of the output of each slide (e.g. icons to adjust a duration of each slide, such as with plus and minus signs to adjust the duration of each slide, and an icon that indicates the duration of each slide).

In another embodiment, the graphical user interface 310 includes a region 317 where the name of each display 103 within a business are output (e.g. screen 1, screen 2, screen 3, etc.) and thus the plurality of active areas 315 of each loop slot are based on the selected display 103 in that region 317. If the user selected a different display icon with that region 317 of the graphical user interface 310, a different group of slides would be presented in the active areas 315 that correspond to the selected display. In an example embodiment, the graphical user interface 310 is configured so the user can freely move the active areas 315 so to change the order of each slide within the loop.

FIG. 003.2 is an image that illustrates an example of a graphical user interface 320 with a plurality of active areas 325 to design a slide to be output in one of the slots of the loop 150 of FIG. 001, according to an embodiment. In an embodiment, the graphical user interface 320 of FIG. 003.2 provides icons that can be used to design a slide that is to be output in a slot of the loop 150. In an example embodiment, after the user creates a slide design, the slide design is provided in the graphical user interface 300 of FIG. 003 (e.g. lists the slide designs) and from there can be moved into a slot of the loop (e.g. by the "Export to slide" icon). The slide design will then appear in the graphical user interface 310 of FIG. 003.1 after which the user can move the slide within the graphical user interface 310, to change the order (e.g. slot) that the slide is presented in the loop. In some example embodiments, the user can select a pre-made template for the slide. In another example embodiments, the user can design their own template for the slide (e.g. starting with a blank slide).

Figure 4:
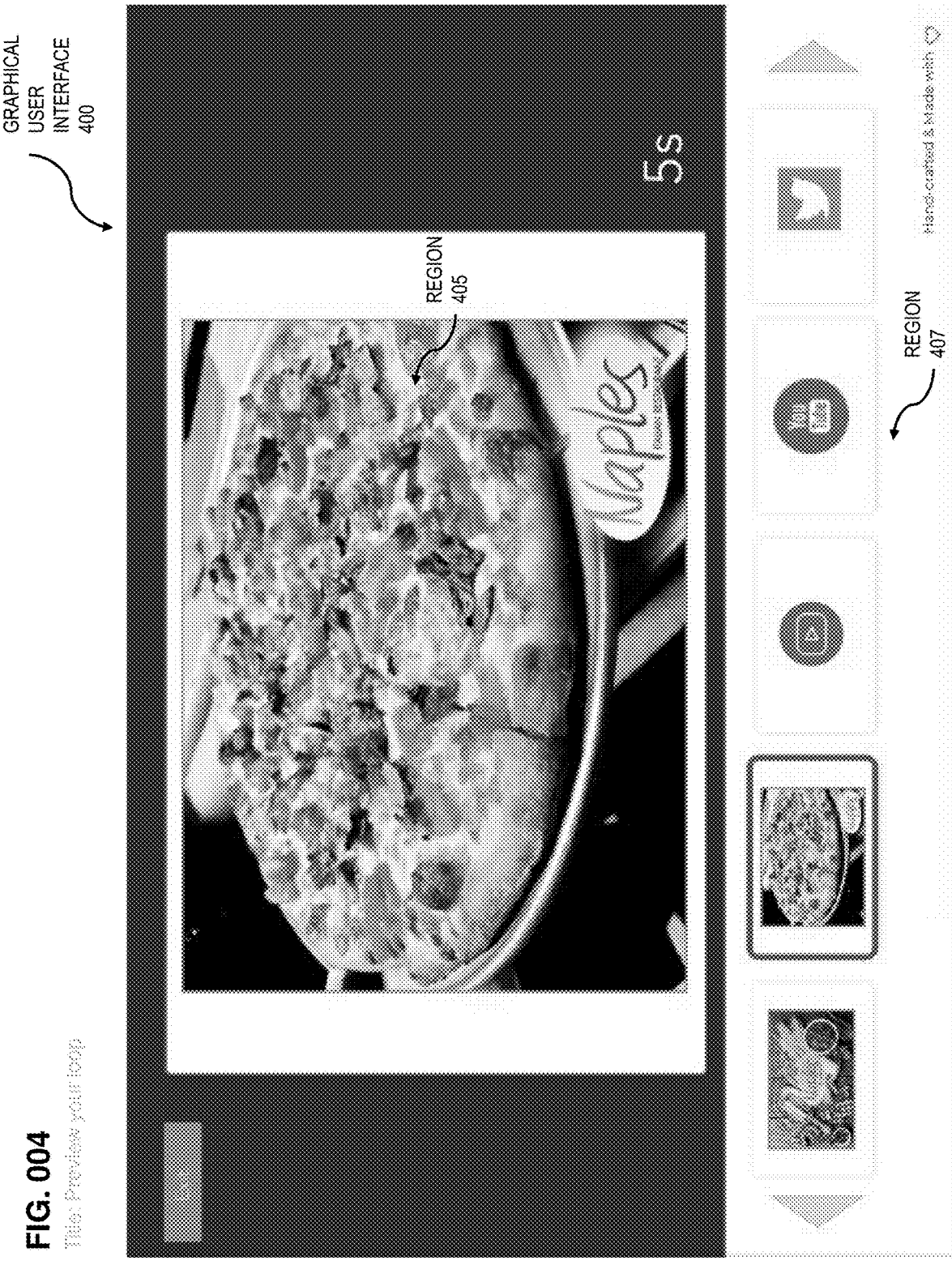
FIG. 004 is an image that illustrates an example of a graphical user interface that includes a plurality of active areas to output a preview of the slides in the plurality of slots of the loop of FIG. 001, according to an embodiment.

FIG. 004 is an image that illustrates an example of a graphical user interface 400 that includes a plurality of active areas to output a preview of the slides in the plurality of slots of the loop of FIG. 001, according to an embodiment. In an embodiment, the graphical user interface of FIG. 004 includes a first region 405 to preview a current slide of the loop 150 (e.g. slide with the green perimeter in FIG. 003.1). The graphical user interface 400 also includes a second region 407 below the first region 405 which shows the order of slides to be output on the display 103. In an example embodiment, the current slide being output on the preview region 405 has an identifier (e.g. colored perimeter) and slides that have already been output in the preview region 405 are to the left of the current slide and slides that have yet to be output in the preview region 405 are to the right of the current slide in the second region 407.

Figure 5:
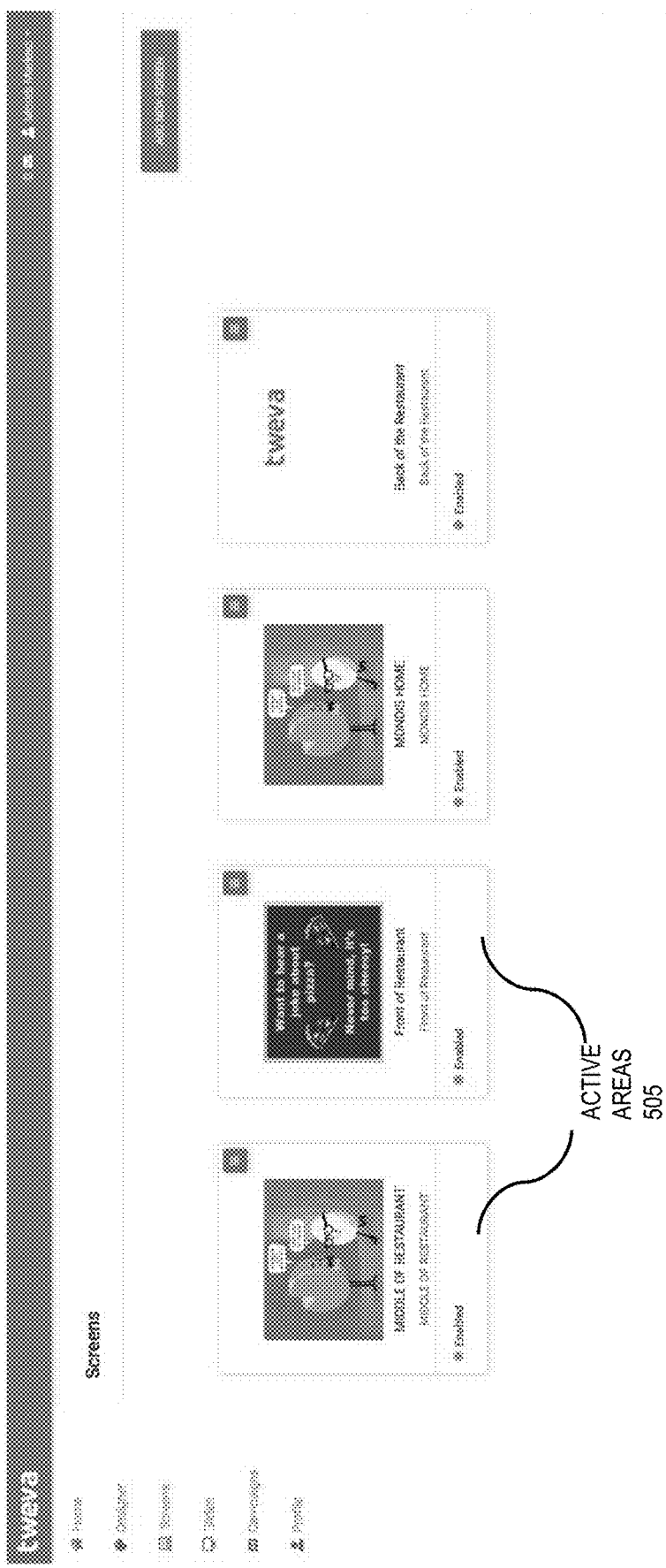
FIG. 005 is an image that illustrates an example of a graphical user interface that includes a plurality of active areas based on a respective plurality of displays in the system of FIG. 002 positioned at a location, according to an embodiment.

FIG. 005 is an image that illustrates an example of a graphical user interface 500 that includes a plurality of active areas 505 based on a respective plurality of displays 103 in the system 200 of FIG. 002 positioned at a location, according to an embodiment. In an embodiment, the graphical user interface 500 of FIG. 005 shows the multiple displays 103 that are positioned at the business location. In an embodiment, the multiple displays shown in FIG. 005 correspond to the icons for each display 103 (e.g. in region 317) in the graphical user interface 310 of FIG. 003.1. In an example embodiment, the active areas 505 for the multiple display icons indicate a region of the display within the business location (e.g. dining room of restaurant, bar of the restaurant, etc.).

Figure 6:
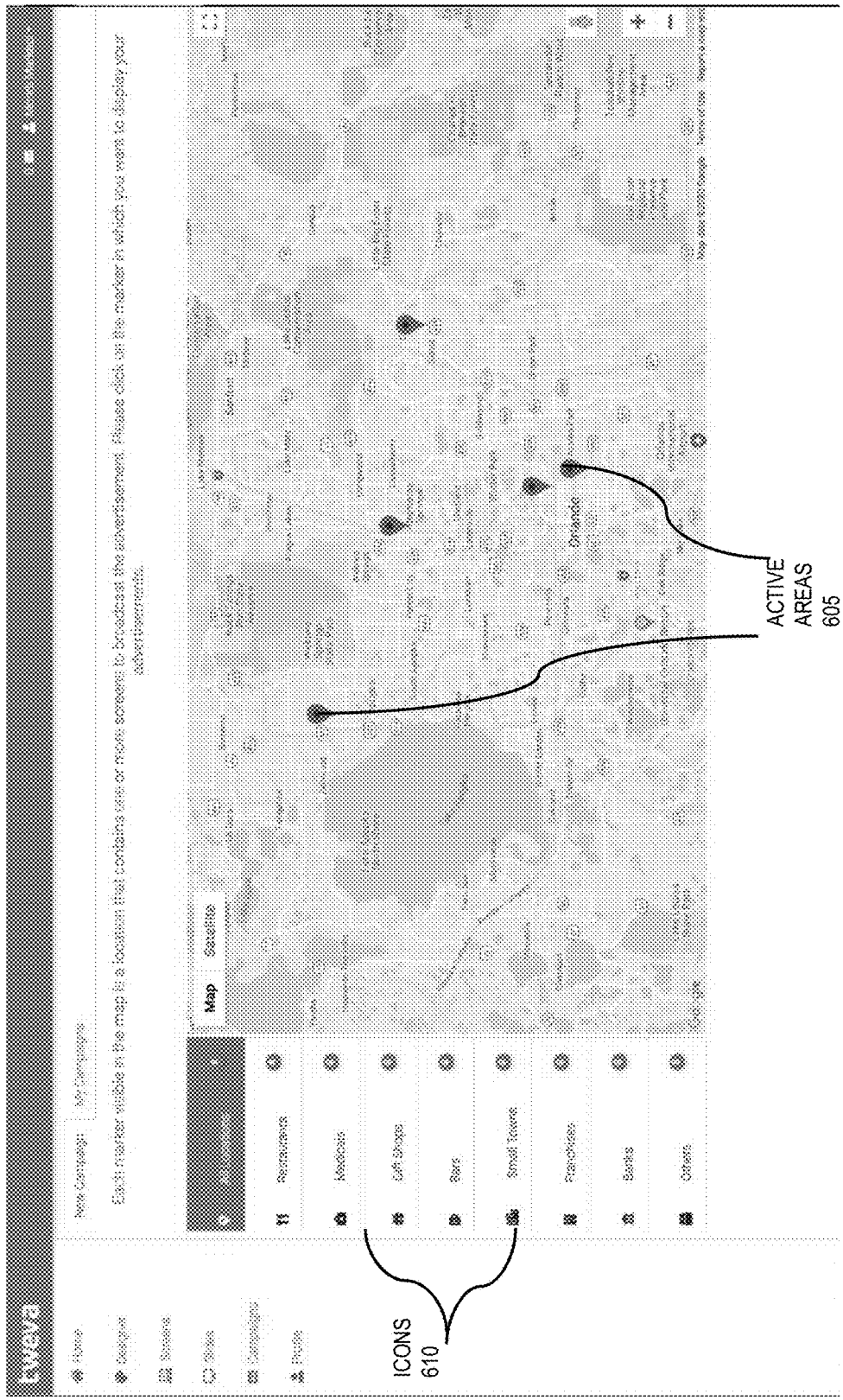
FIG. 006 is an image that illustrates an example of a graphical user interface that includes a plurality of active areas on a geographical map that indicate respective locations where the apparatus of FIG. 000 is positioned, according to an embodiment.

FIG. 006 is an image that illustrates an example of a graphical user interface 600 that includes a plurality of active areas 605 on a geographical map that indicate respective locations where the apparatus 100 of FIG. 000 is positioned, according to an embodiment. In an embodiment, the graphical user interface 600 shows a map of a geographical area with marks or active areas 605 for each business location in that geographical area which have an apparatus 100 that is connected with the system 200 of FIG. 002. In an embodiment, the graphical user interface 600 includes icons 610 that indicate a category (e.g. restaurant, gift shop, etc.) of each business. In an example embodiment, a user can choose one or more marks or active areas 605 on the geographical map of a business where they would like to have a media slide or an advertisement slide presented in a slot of a loop 150 output on the display 103 at that business location. The graphical user interface 600 advantageously permits a user to selectively choose which categories of business where they would like to present an advertisement slide.

Figure 7:
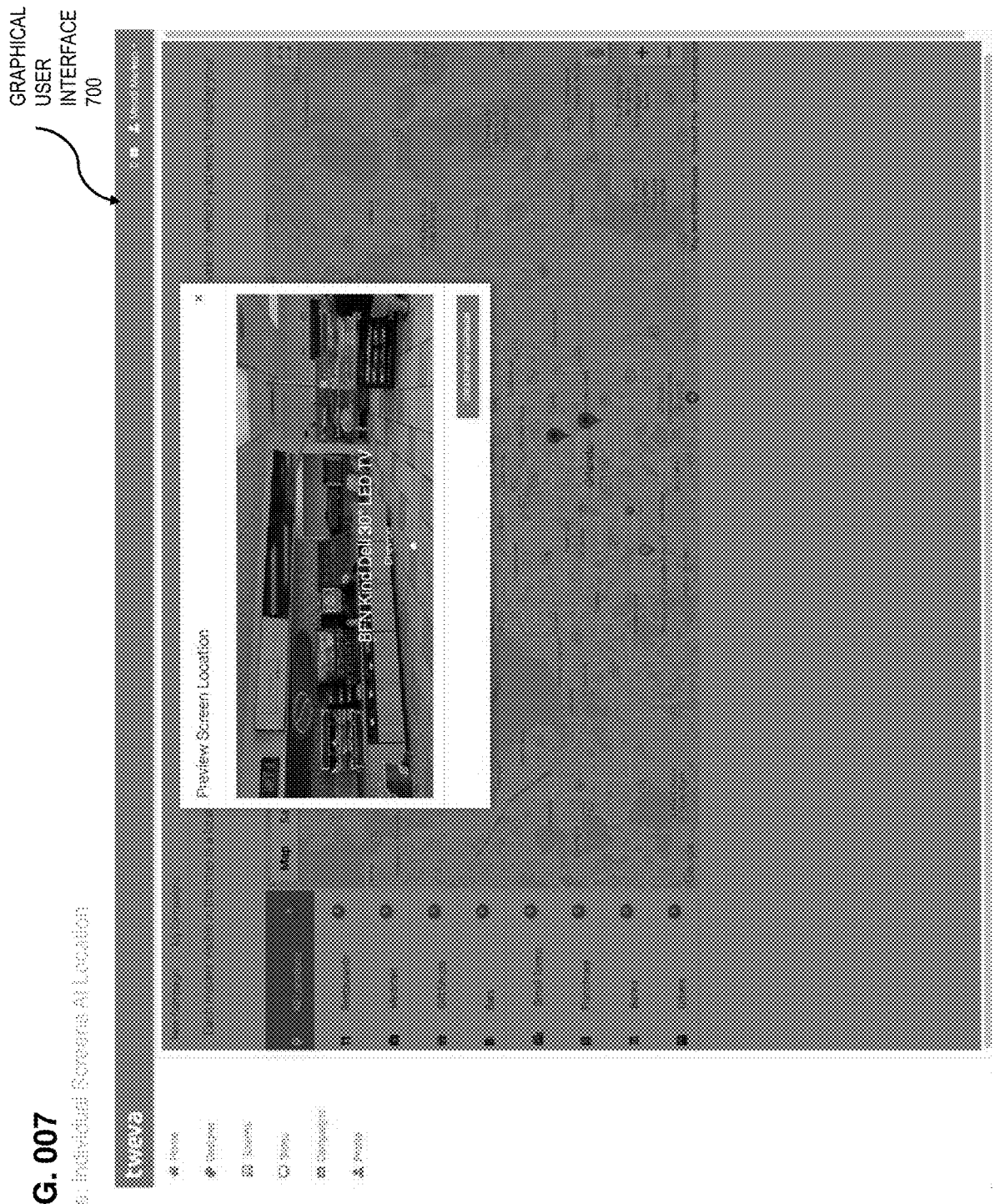
FIG. 007 is an image that illustrates an example of a graphical user interface that includes an image of a position of the apparatus at one of the locations in FIG. 006, according to an embodiment.

FIG. 007 is an image that illustrates an example of a graphical user interface 700 that includes an image of a position of the apparatus 100 at one of the locations in FIG. 006, according to an embodiment. In an embodiment after choosing one of the marks or active areas 605 on the geographical map in FIG. 006, the graphical user interface 700 indicates one or more displays that are located at the business location corresponding to the chosen mark on the map. This graphical user interface 700 advantageously permits a user to select which display or all displays within a business they would like to present an advertisement slide. Thus, in an example embodiment, if a restaurant business includes a display in the dining area and another display in the bar area, the graphical user interface 700 of FIG. 007 advantageously permits a user to select the display in the bar area to present an advertisement slide (e.g. in the event that the user wanted to target customers at the bar area and not the dining area).

Figure 8:
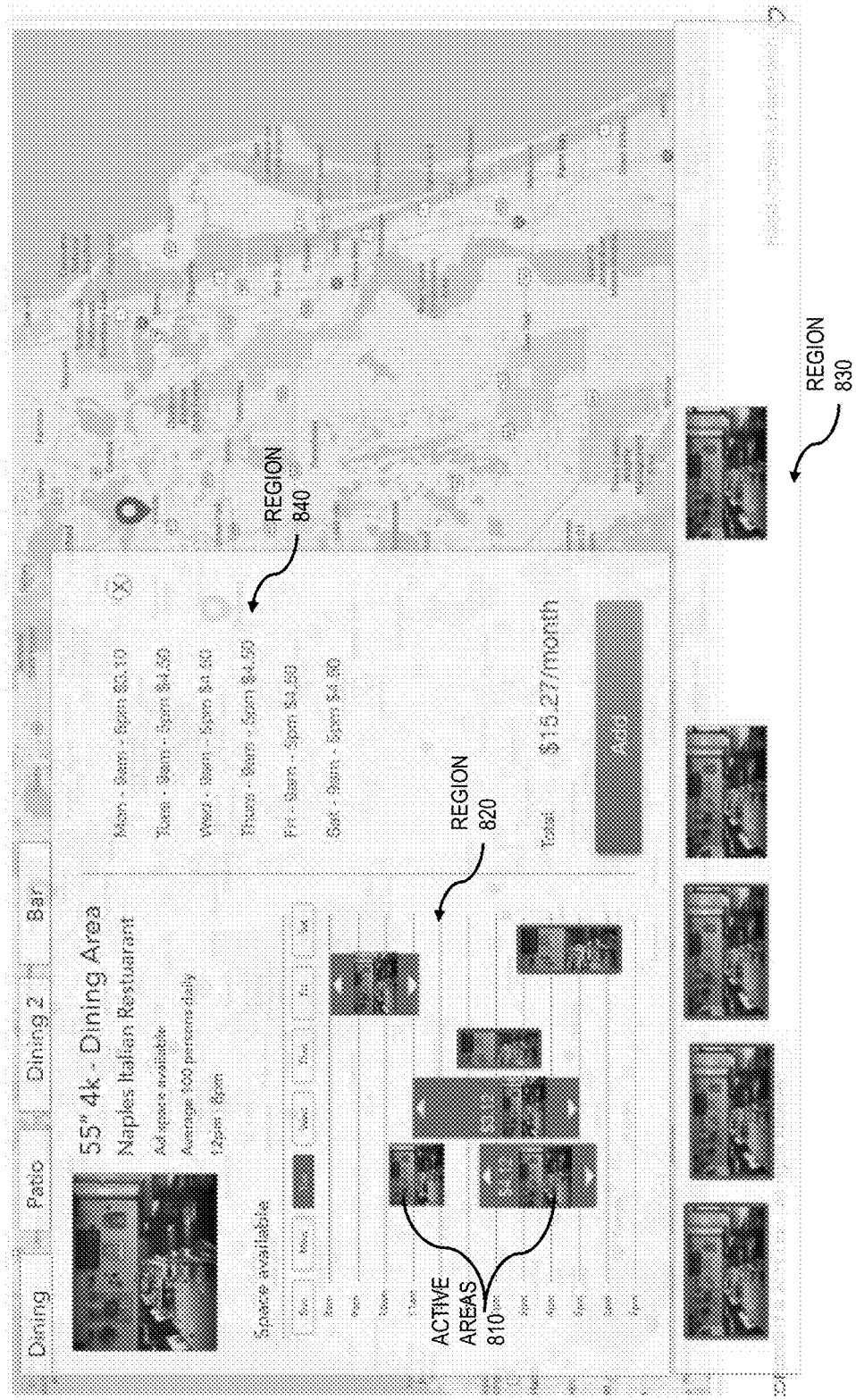
FIG. 008 is an image that illustrates an example of a graphical user interface that includes a plurality of active areas indicating a first time range where content is displayed at the position of FIG. 007 within the location, according to an embodiment.

FIG. 008 is an image that illustrates an example of a graphical user interface 800 that includes a plurality of active areas 810 indicating a first time range where content is displayed at the position of FIG. 007 within the location, according to an embodiment. In an embodiment, after the user selects a specific display at the business location, the graphical user interface 800 of FIG. 008 includes a first region 820 with a plurality of active areas 810 that indicate a first time range where loops 150 are output on the specific display. In an example embodiment, the first time range corresponds to hours of operation of the business. In one embodiment, the graphical user interface 800 of FIG. 008 includes a second region 830 (e.g. bottom region in FIG. 008) where multiple slides are provided, which are those slides which the user would like to advertise on the selected display. In an embodiment, the graphical user interface 800 permits the user to move (e.g. drag) each slide from the second region 830 to the first region 820, and further adjust an area of the slide within the first region 820 so that the slide covers a second time range within the first time range, such that the second time range is the time over which the user would like to present the advertisement slide on the display. In an example embodiment, the slide in the first region 820 includes icons (e.g. up and down arrows) to adjust the extent of the second time range within the first time range. In another example embodiment, the slide in the first region 820 outputs a price (e.g. for the month) for advertising the slide over the second time range and over the designated day of the week. The graphical user interface 800 also includes a third region 840 that lists the price for advertising each slide in the first region 820 and a total price (e.g. per month) that is to be paid. In an embodiment, the graphical user interface 800 of FIG. 008 advantageously permits a user to selectively choose the time region (e.g. day of week, time of the day, etc.) over which the advertisement slide will be output in the loop 150 of the selected display. The inventors of the present invention realized that this conveniently permits a user to selectively target not only where within the business that the advertisement slide is output but when the advertisement slot is output on that selected display. In one embodiment, the user submits a payment into a trust account and funds are deducted from the trust account based on each confirmed output of the slide over the second time range (e.g. based on data received by the server from block 6 in FIG. 001 that is transmitted to server after each confirmed output of a slide at each slot of the loop).

Figure 9:
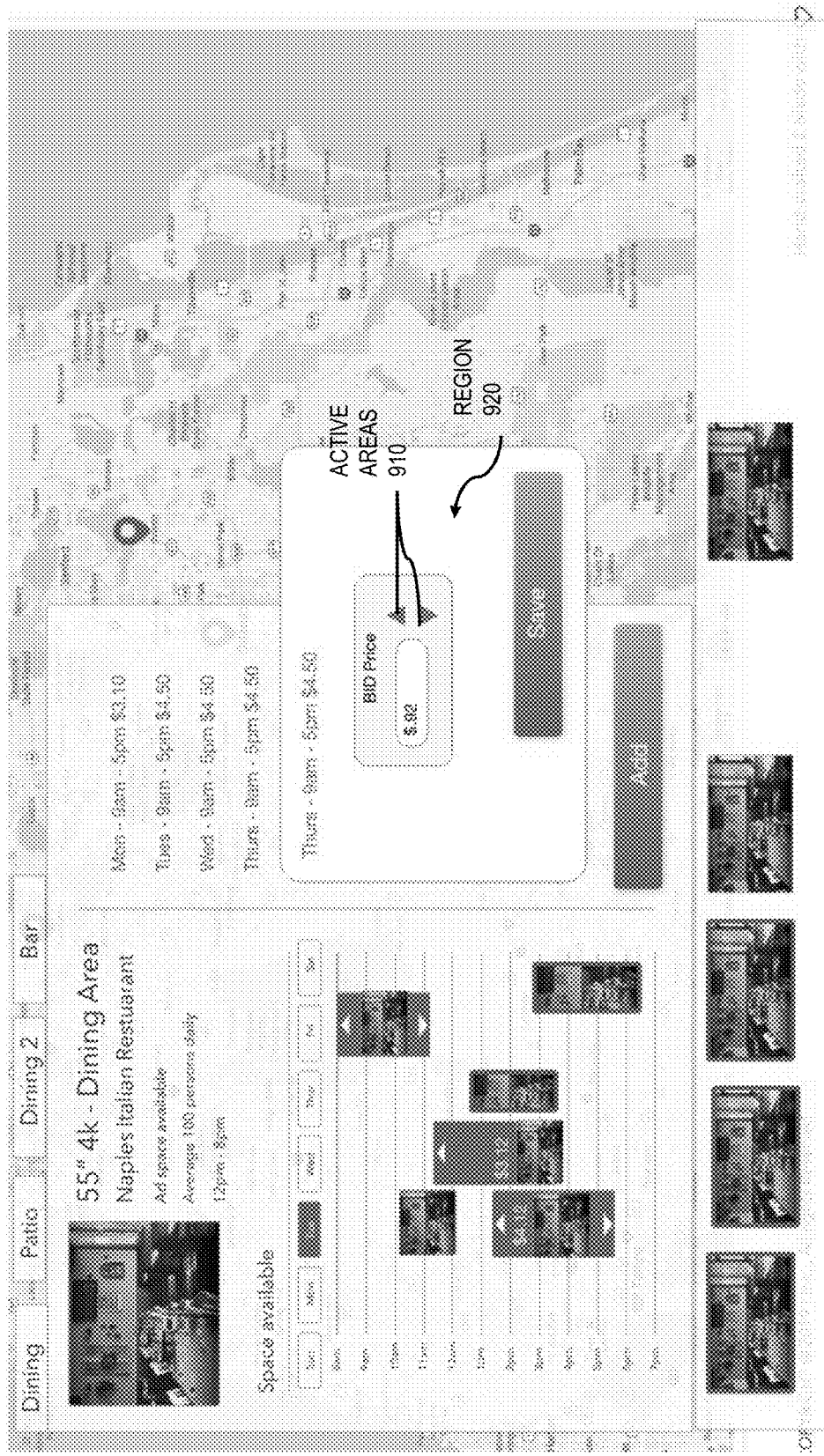
FIG. 009 is an image that illustrates an example of a graphical user interface that includes a plurality of active areas to adjust a bid price of displaying content over a second time range within the first time range of FIG. 008, according to an embodiment.

FIG. 009 is an image that illustrates an example of a graphical user interface 900 that includes a plurality of active areas 910 to adjust a bid price of displaying content over a second time range within the first time range of FIG. 008, according to an embodiment. In an embodiment, the graphical user interface 900 is similar to FIG. 008 except includes a further region 920 where the user can adjust a bid price for outputting the advertisement slide in the second time range. In one example embodiment, the bid price is a maximum price that the user is willing to pay for outputting the advertisement slide in the second time range. In an example embodiment, if no other users outbid this bid price, the advertisement slide is output over the selected time range. In another example embodiment, if another user outbids the users bid, then the advertisement slide is not output over the second time range (e.g. or the user is provided with a message indicating they've been outbid and given a minimum time period to bid further).

FIGS. 010.1 through 010.8 are images that illustrate an example of graphical user interfaces output on the display of FIG. 00 during initiation of the apparatus, according to an embodiment. FIG. 010.6 shows an example of an alphanumeric code that it used to register the display 103 with the account of the user of the system 200.

Figure 11:
Figure 012:
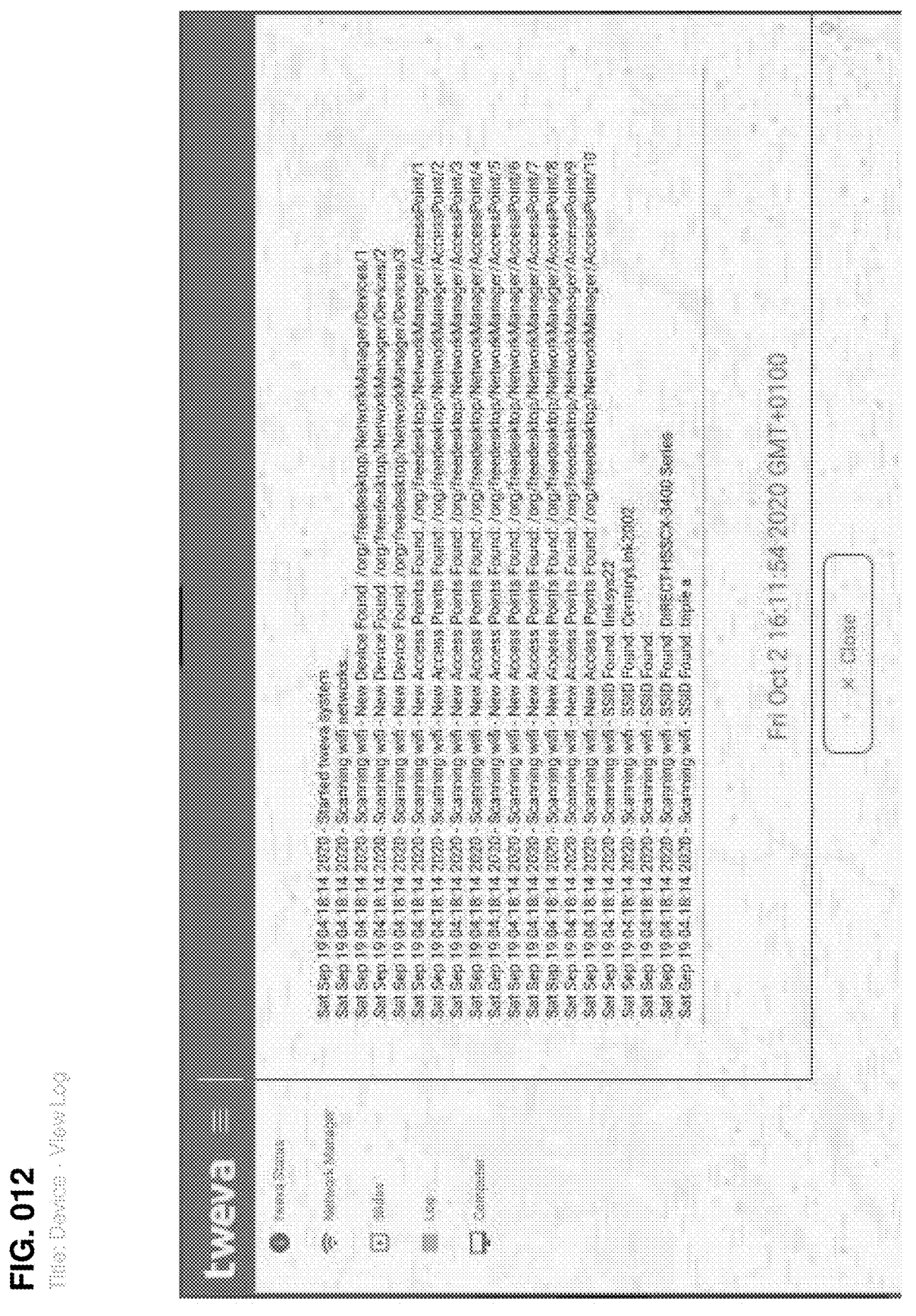
Figure 13:
Figure 14:
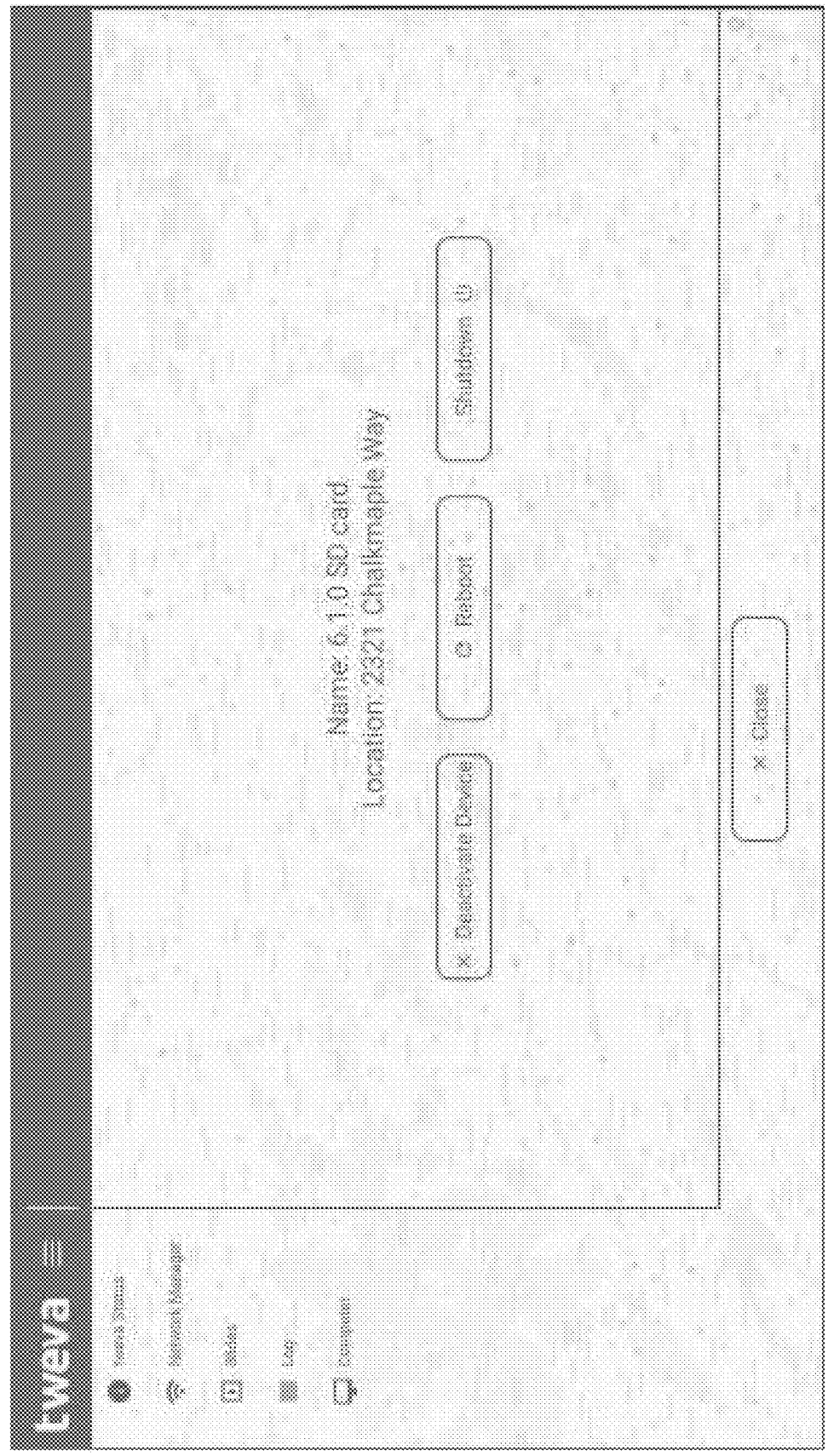
Figure 15:
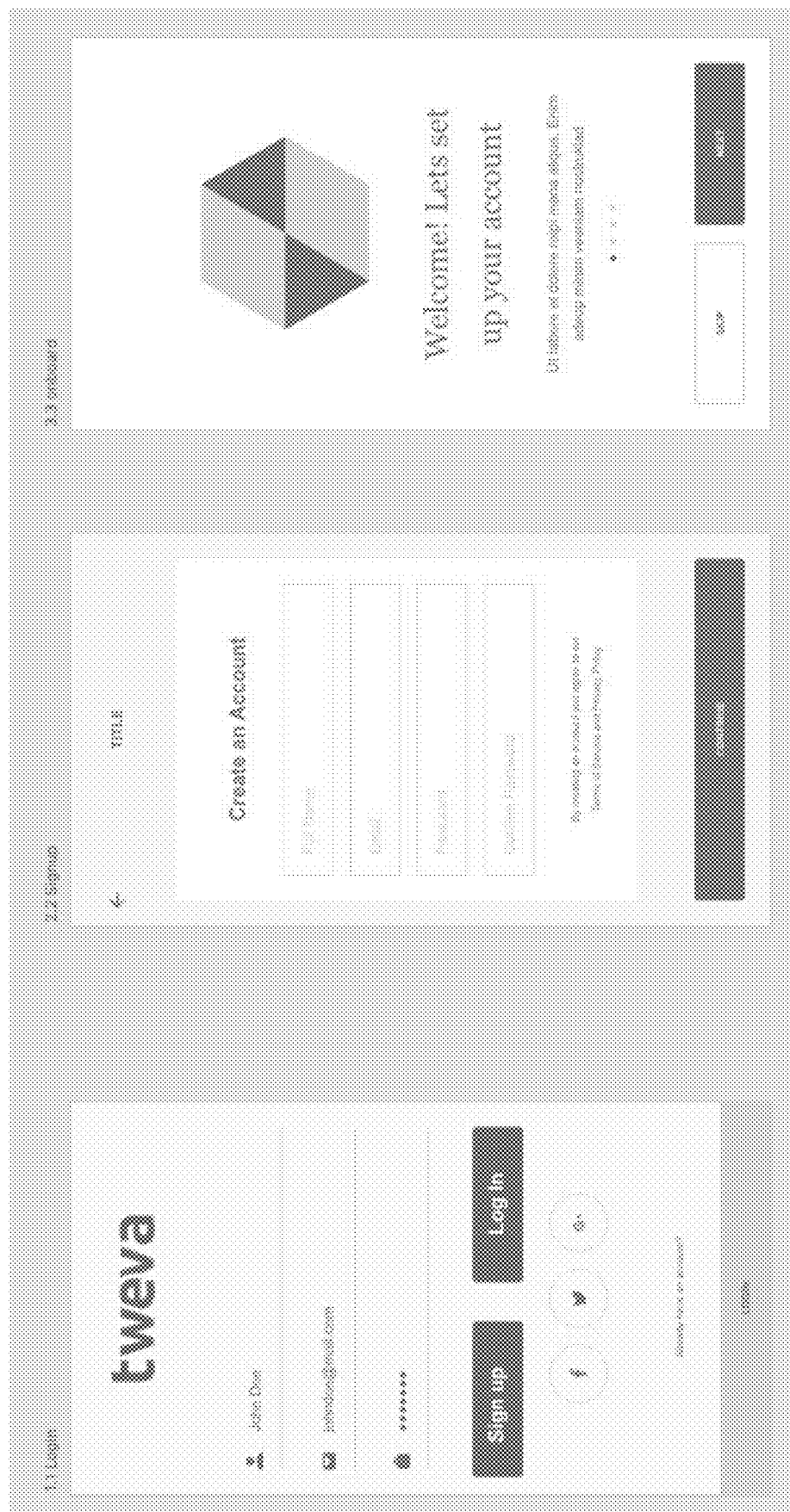
FIGS. 015 through 021 are images that illustrate an example of a graphical user interface for a mobile device in the system of FIG. 002, according to an embodiment.
Figure 16:
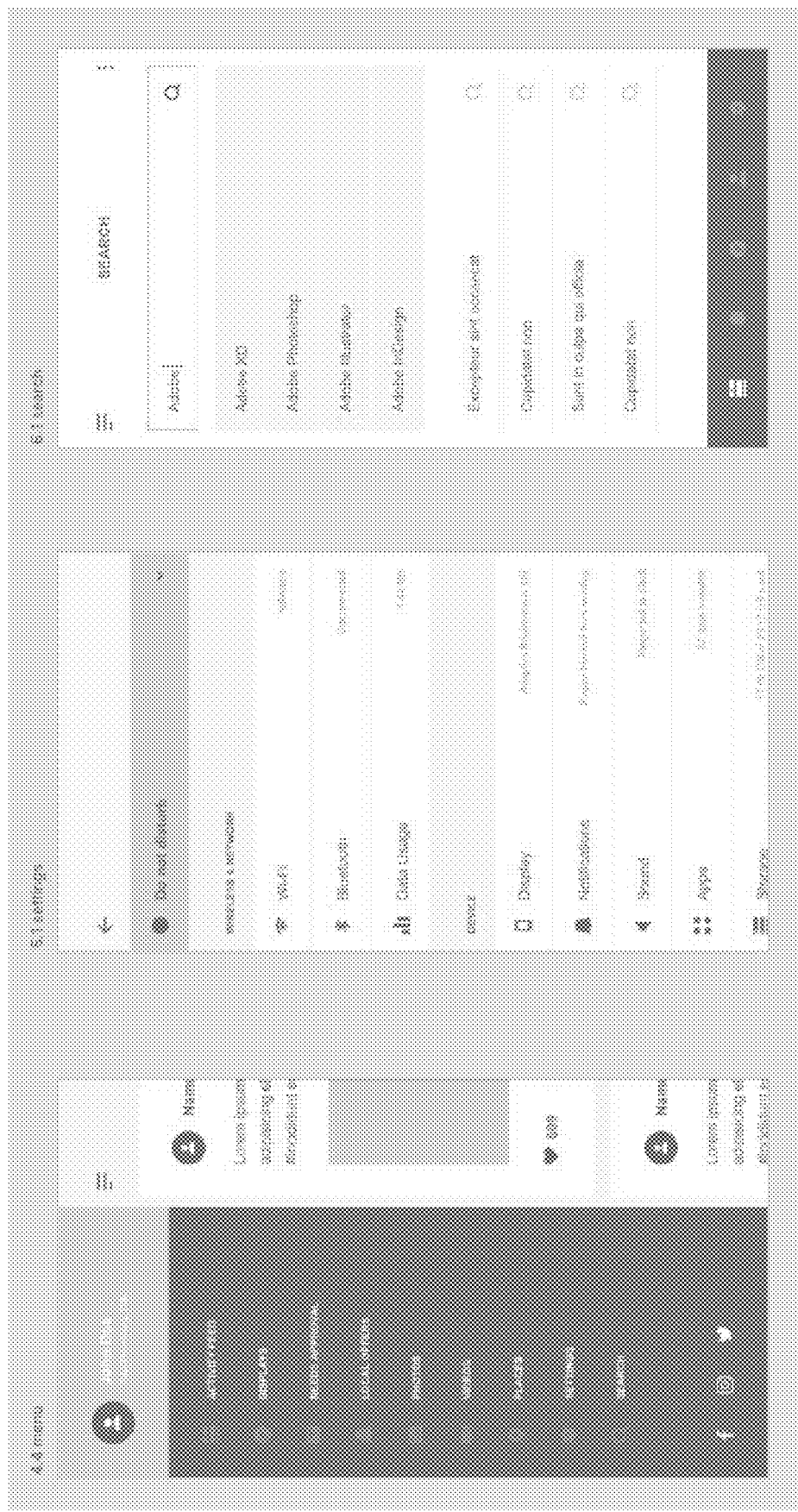

FIGS. 011 through 014 are images that illustrate an example of content output on the display indicating one or more network metrics, according to an embodiment. In an embodiment, FIG. 011 shows a status screen with multiple connection, uptime, CPU Load, free memory etc. In another embodiment, FIG. 012 shows the log for the download slides, Wi-Fi networks and more. In another embodiment, FIG. 013 shows a discrete error slide. In another embodiment, FIG. 014 shows that, using the remote 102, the user can deactivate the device, for use at a new location; can reboot the apparatus or can shutdown the apparatus.

FIGS. 015 through 020 are images that illustrate an example of a graphical user interface for a mobile device in the system 200 of FIG. 002, according to an embodiment. In an embodiment, the graphical user interfaces of FIGS. 015 through 020 are provided on a user of the mobile device 033.2 (FIG. 002.1) and/or a user of the mobile device 106 (FIG. 002).

Figure 17:
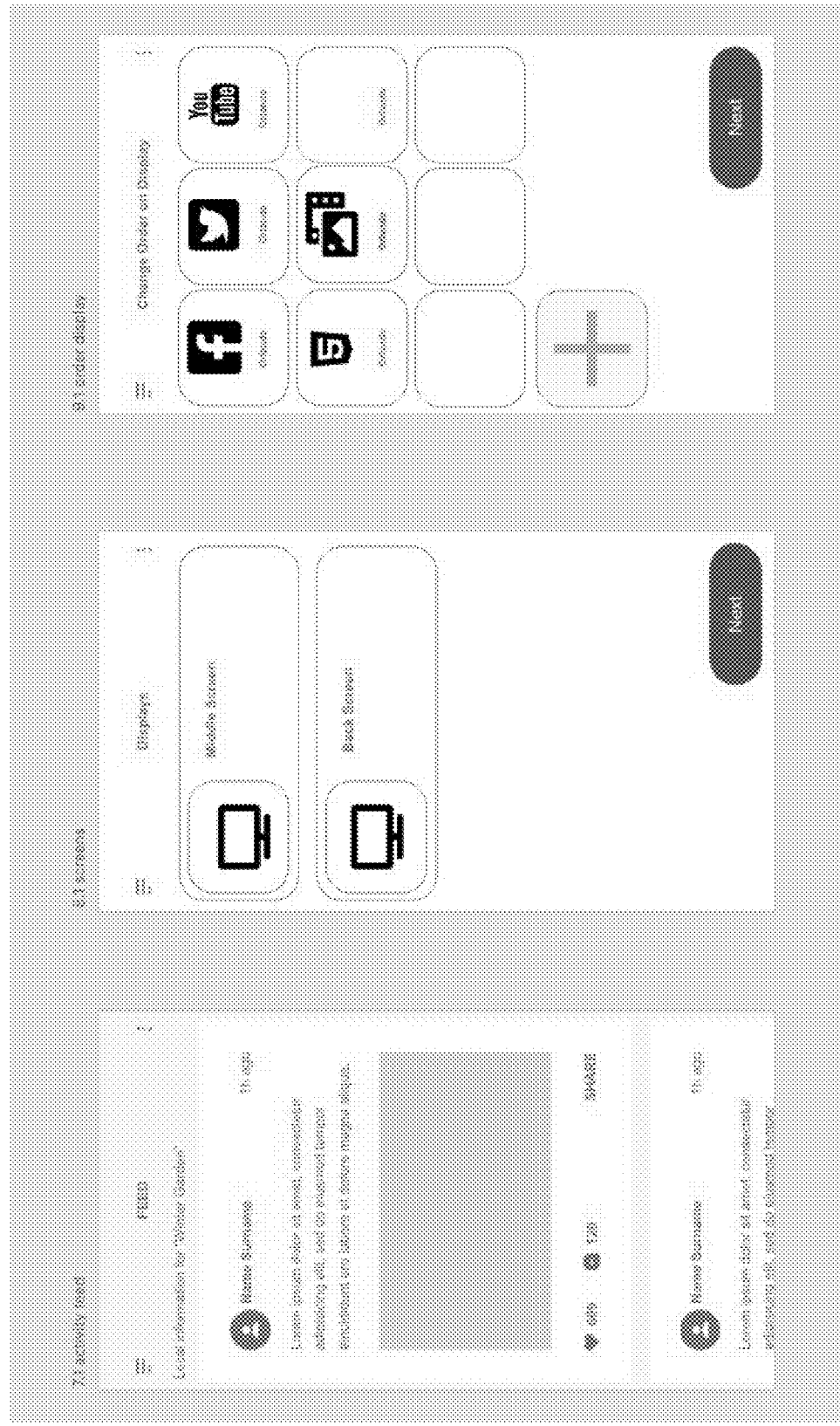

In an embodiment, the activity feed 7.1 of the graphical user interface 1700 of FIG. 017 indicates local information posted by users of the system 200, based on a geographical area. In one embodiment, the local information includes reviews of businesses in the geographical area (e.g. businesses that have an apparatus and are registered with the system), local events (e.g. date and time of upcoming events, such as a parade), and/or posts by users of the system in the local area (e.g. a user who uploads a photo taken of a sunset). In an embodiment, local information submitted by users to the activity feed 7.1 is reviewed by a moderator of the system and is only posted to the activity feed 7.1 if it is approved by a moderator. In some embodiments, information from the local activity feed 7.1 is submitted to displays 103 of businesses in the geographical area and are output as slides in slots of the loop 150 based on certain criteria (e.g. the owner of the business approves of the slide, etc.). In an embodiment, the activity feed 7.1 is specific for a geographical area (e.g. a specific city, county, etc.). The inventors of the present invention recognized that one advantage of the local activity feed 7.1 is that if a user is traveling in a geographical area that is unfamiliar to them, they can view the activity feed 7.1 to determine local events, positive reviews of local businesses, etc. In an example embodiment, if a user is on vacation in a geographical area and wants to visit an Italian restaurant in the area, they can view the local activity feed 7.1 for that geographical area and view positive reviews of Italian restaurants in that geographical area that are registered with the system and/or with a local apparatus (e.g. mobile device 106) installed with the system and/or with businesses without the mobile device 106 (e.g. tour guide).

In an embodiment, the screen 8.1 of the graphical user interface 1700 of FIG. 017 identifies the different displays present at a location. As appreciated by one skilled in the art, each of the activity feed 7.1, screens 8.1 or order display 9.1 can each serve as the graphical user interface 1700 (e.g., each of the activity feed 7.1, screens 8.1 and order display 9.1 can fit the display of the mobile device 106). In an embodiment, the user can select the active area corresponding to one of the displays in the screen 8.1 to pull up the loop that is being output on that selected display. The order display 9.1 outputs active areas that correspond to the loop slots of the selected display in the screen 8.1. The user can conveniently use the order display 9.1 to adjust the order (e.g. drag the slides around the display 9.1) of the slide content presented in the loop. In another embodiment, the order display 9.1 includes an icon (e.g. plus sign) to add a slide to the loop.

Figure 18:
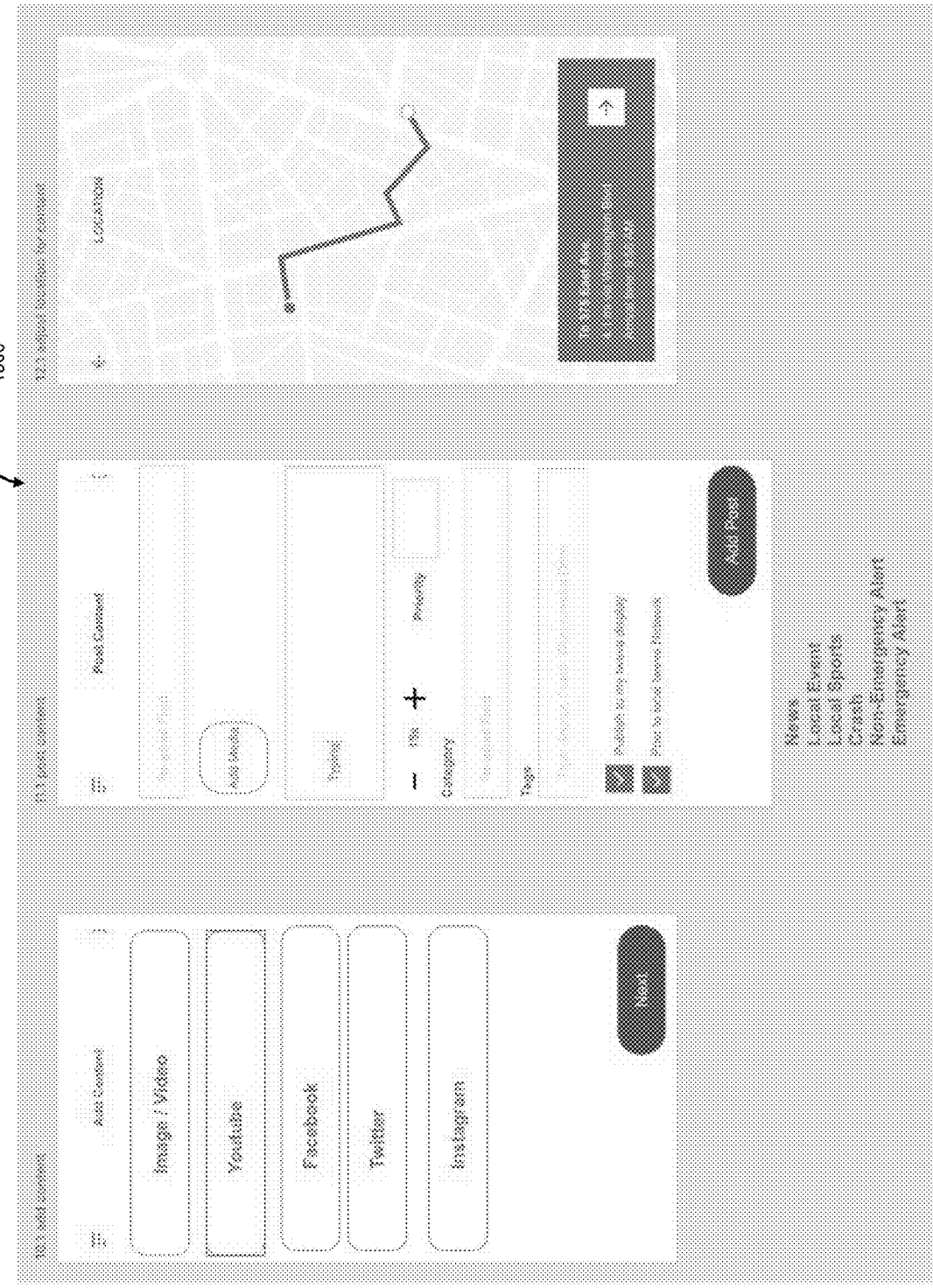

In an embodiment, the add content 10.1 of the graphical user interface 1800 of FIG. 018 provides one or more icons that correspond to different external sources (e.g. Image/video to retrieve stored image/video in the mobile device, YouTube®, Facebook®, etc.) from which the post content to the local activity feed 7.1. As appreciated by one skilled in the art, each of the add content 10.1, post content 11.1 or adjust location 12.1 can each serve as the graphical user interface 1700 (e.g., each of the add content 10.1, post content 11.1 or adjust location 12.1 can fit the display of the mobile device 106). In an embodiment, the post content 11.1 screen permits the user to include data fields (e.g. title of the content, description of the content, etc.). In another embodiment, the post content 11.1 screen further includes boxes to check whether the user wants to have the content output in the loop of the display in the business of the owner (e.g. "publish to my display") and/or whether the user wants to post the content to the local activity feed 7.1 (e.g. "Post to local network"). In an example embodiment, the post content 11.1 further permits the user to adjust the display time of the slot in the loop where the content will be output (e.g. plus and minus sign). In yet another embodiment, a screen 12.1 permits the user to designate the location where the content was captured (e.g. select the beach area where a sunset was captured, etc.).

Figure 19:
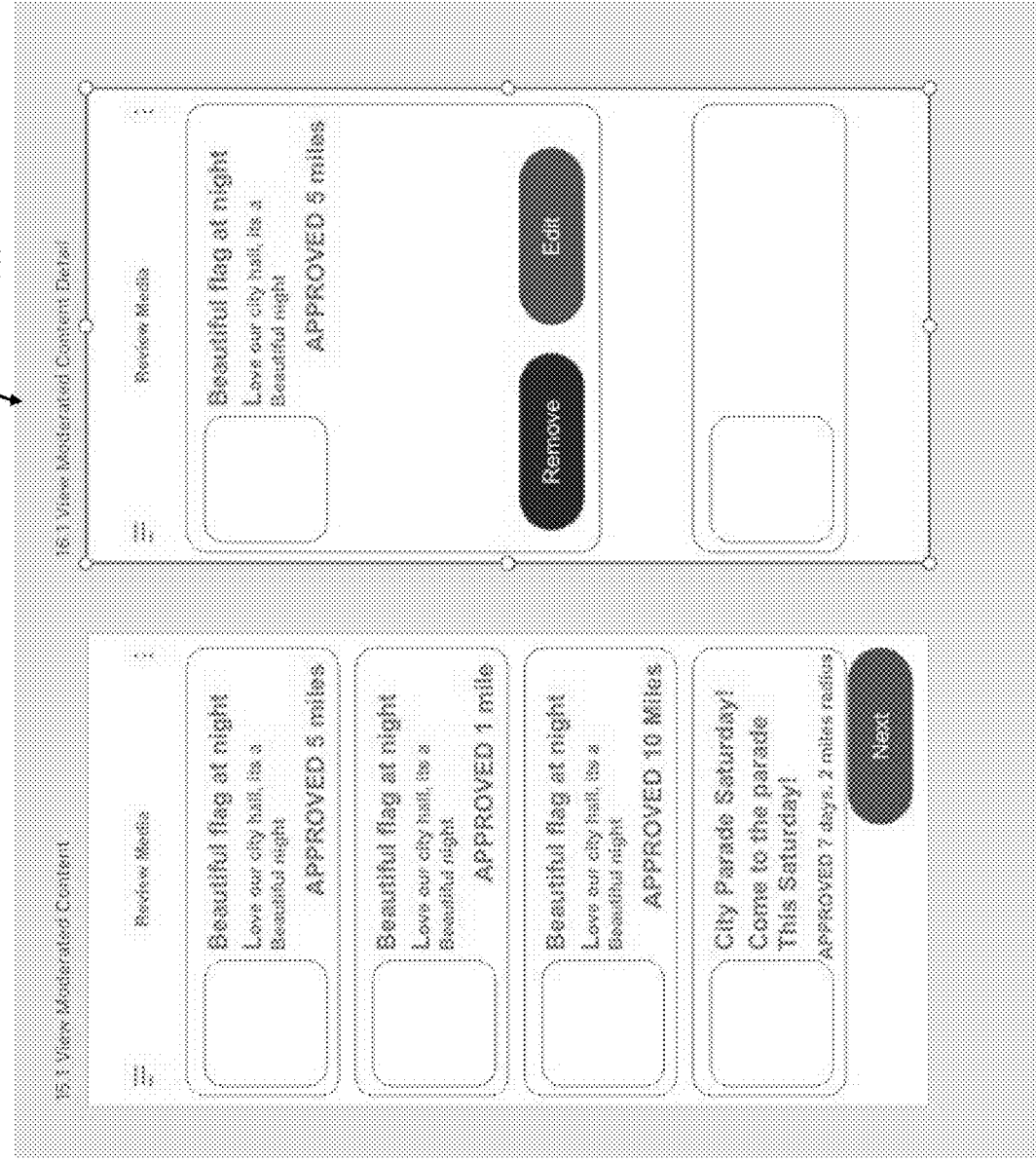
Figure 20:
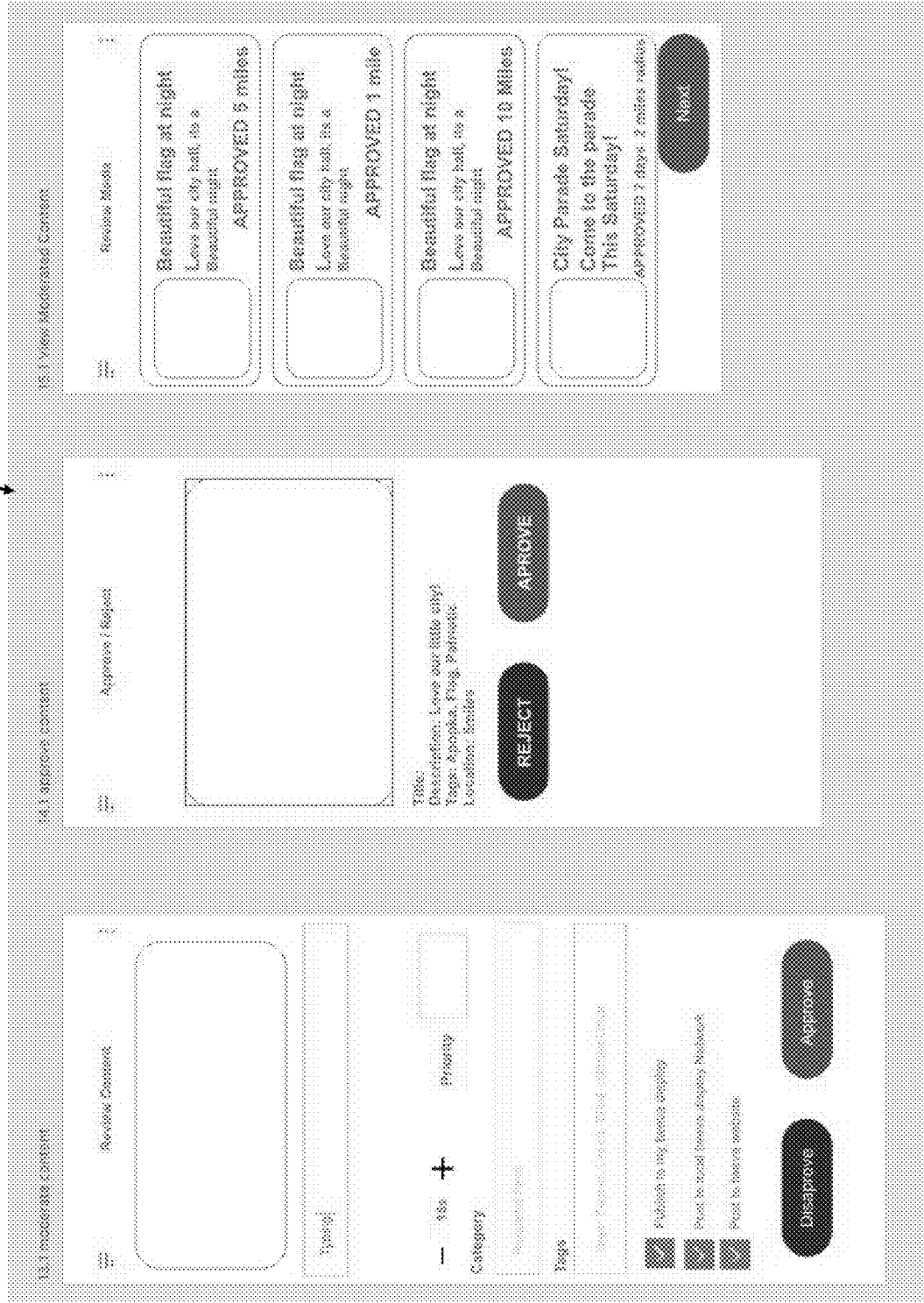

In an embodiment, the screen 15.1 of the graphical user interface 1900 of FIG. 019 and screens 13.1 and 14.1 of the graphical user interface 2000 of FIG. 020 indicates the submitted content to the activity feed 7.1 which needs to be reviewed (e.g. by a moderator). In an embodiment, the screen 16.1 of the graphical user interface 1900 of FIG. 019 and screens 13.1, 14.1 of the graphical user interface 2000 of FIG. 020 shows one of the items in screen 15.1 that is being reviewed by a moderator and includes icons to approve the item (and reject the item). In an embodiment, upon the moderator approving the submitted content, it is output in the activity feed 7.1.

Figure 21:
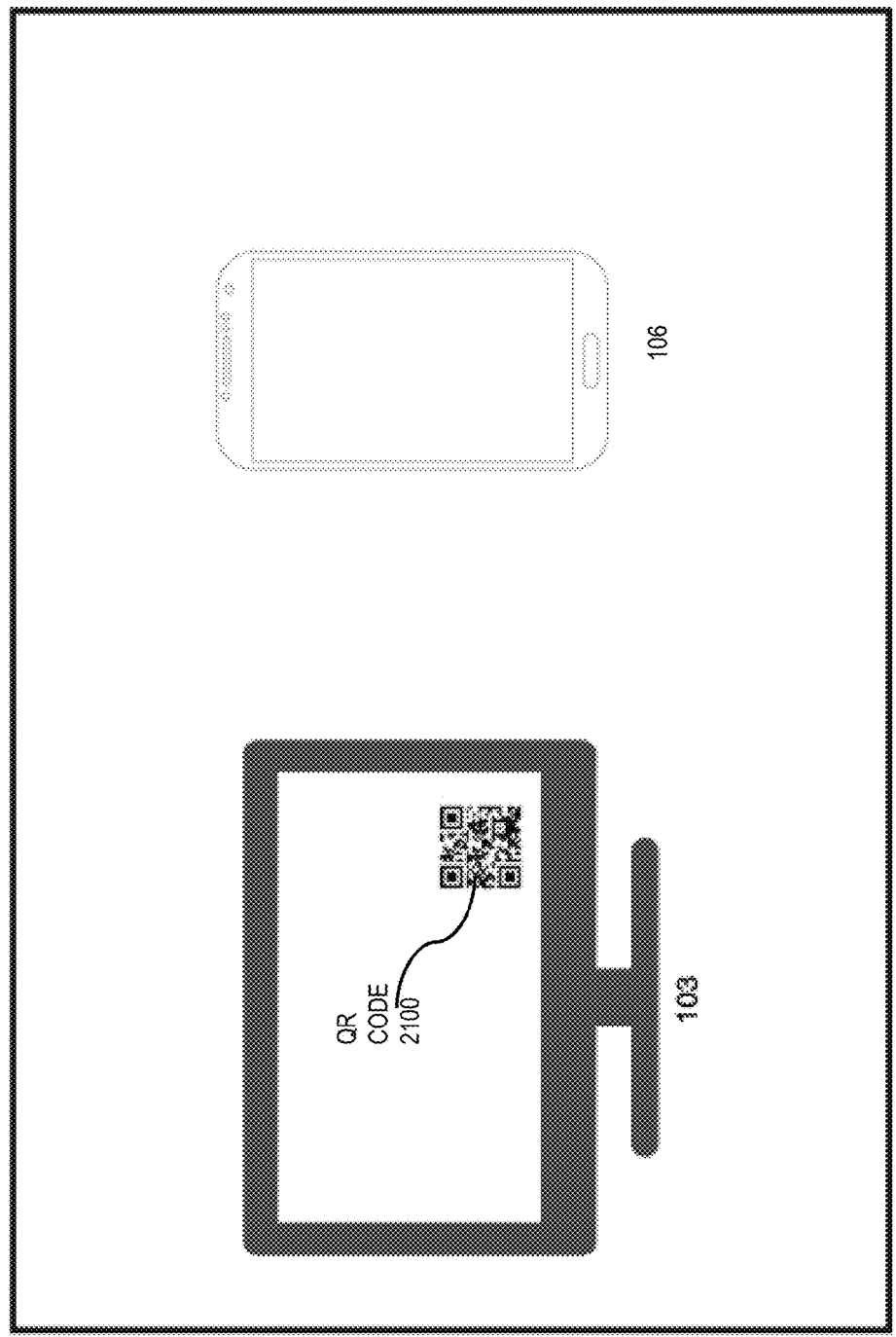

FIG. 021 is an image that illustrates an example of a QR code 2100 output on the display 103 and a mobile device 106 configured to scan the QR code in the system 200 of FIG. 002, according to an embodiment. In one embodiment, the mobile device 106 is owned by a user (e.g. customer who is visiting the business) and uses the mobile device 106 to scan the QR code 2100 on a slide of interest that is output in the loop 150 (e.g. an advertisement slide with a special discount offer). FIG. 002.3 provided a flowchart of the flow of data when the mobile device 106 scans the QR code 2100. Upon the user scanning the QR code 2100 with the mobile device 106, data is transmitted to the server (e.g. an identifier of the mobile device, an identifier of the slide that was scanned, a time/date, etc.). In an embodiment, a tracking link will query the browser of the mobile device. In an embodiment, a unique ID is associated with each QR code that is scanned by each mobile device on each slide. In an embodiment the system uses the data that identifies the specific QR code/slide being scanned by the specific mobile device. As discussed in FIG. 002.3, the system sends the mobile device of the user an internal tracking URL and then sends the user to the destination URL (e.g. to obtain a coupon code associated with the slide). In some embodiments, a sensor (e.g. video camera) is mounted on the display 103 and is configured to capture data (e.g. image data) of the user scanning the QR code 2100. In one example embodiment, the sensor would be used to actually capture how many users (e.g. capture how many faces and/or eyes) are in the area while the slide (e.g. advertisement) is displayed. FIG. 022 is an image that illustrates an example of slide content output on the display with the QR code 2100 of FIG. 021, according to an embodiment.

Figure 23:
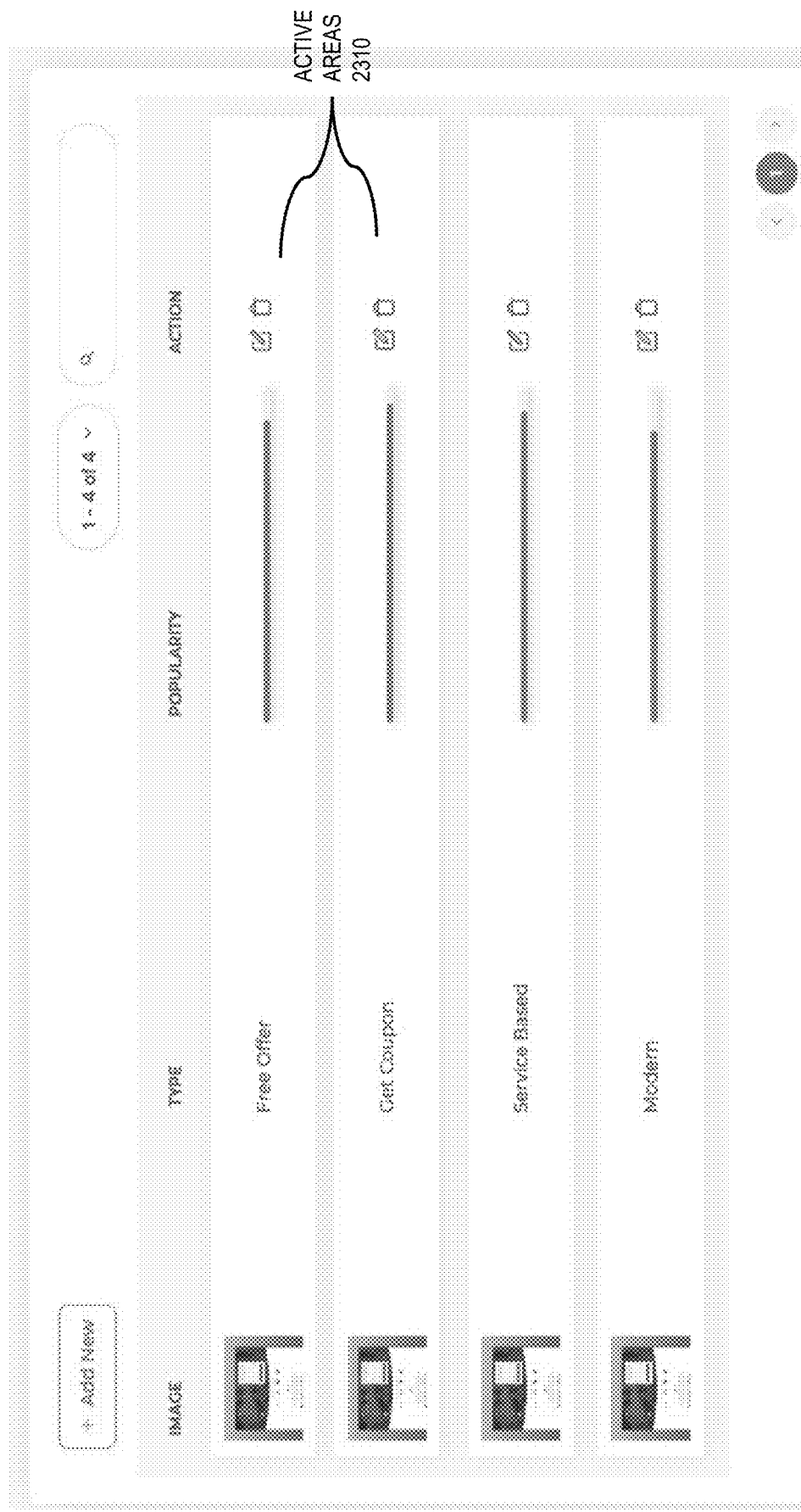
FIG. 023 is an image that illustrates an example of a graphical user interface with a plurality of active areas for a respective plurality of landing pages corresponding to a respective plurality of QR codes, according to an embodiment.

FIG. 023 is an image that illustrates an example of a graphical user interface 2300 with a plurality of active areas 2310 for a respective plurality of landing pages corresponding to a respective plurality of QR codes, according to an embodiment. In an embodiment, each active area 2310 in FIG. 023 is associated with a respective QR code that is provided on one or more slides of the loop 150. In an example embodiment, the "type" field in the graphical user interface indicates a category of the QR code, e.g. coupon, free offer, etc. In an example embodiment, if a user wants to track their advertising, they can create a landing page that is hosted on the network of the system 200. Scanned QR codes and email marketing campaigns would be sent to the landing page so conversion rates can be tracked. In some embodiments, there could be many landing pages, with different colors, etc. In these example embodiments, upon submitting data, the customer can select if it says thank you or forwards use to their website. In some embodiments, conversion rates can be tracked internally and information can be collected from user to use emails names for other non-competitive businesses.

Figure 24:
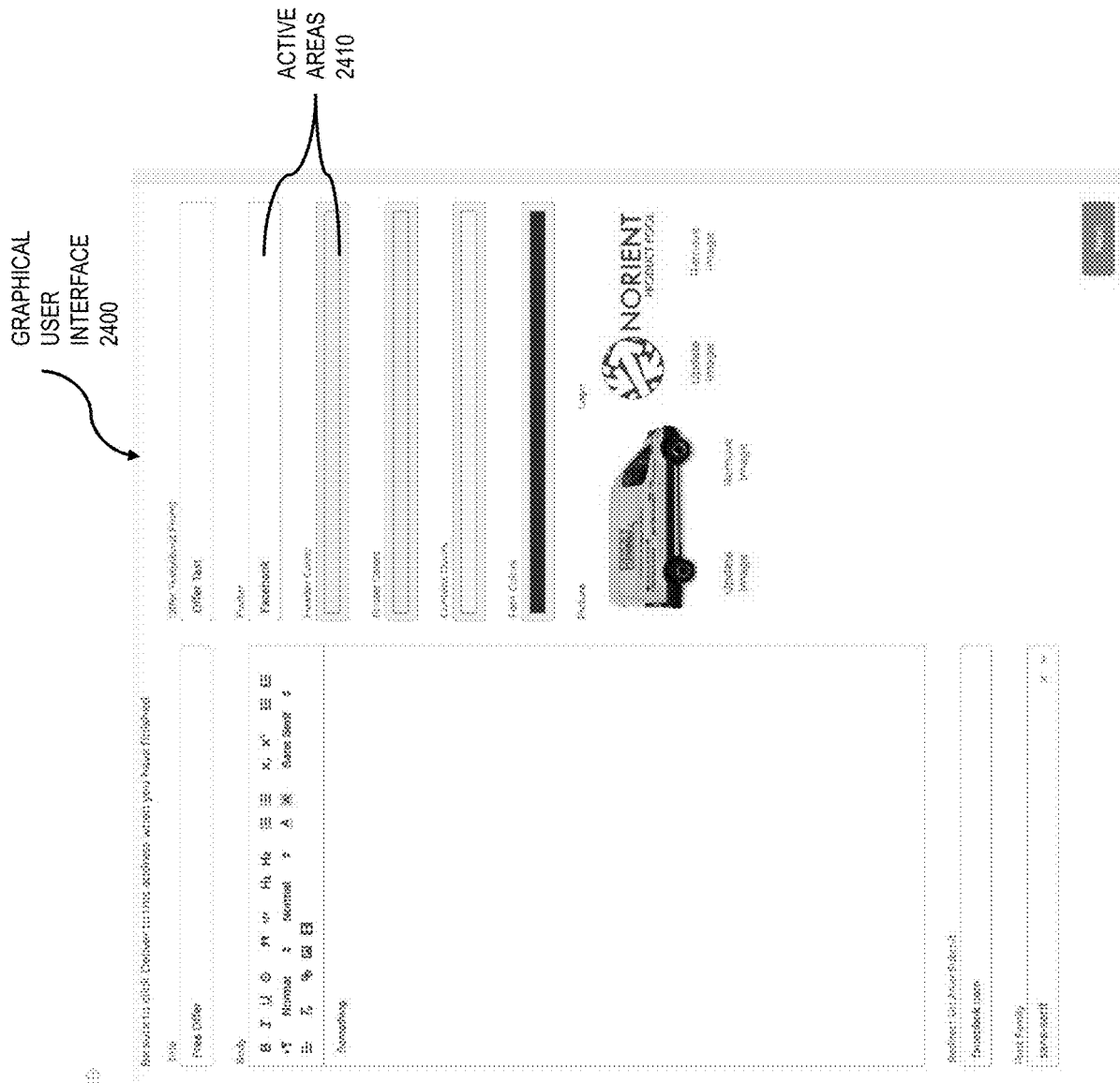
FIG. 024 is an image that illustrates an example of a graphical user interface with a plurality of active areas to design one of the landing pages for a respective QR code, according to an embodiment.

FIG. 024 is an image that illustrates an example of a graphical user interface 2400 with a plurality of active areas 2410 to design one of the landing pages for a respective QR code, according to an embodiment. In an embodiment, the graphical user interface 2400 is provided so that a user (e.g. business owner) can design a landing page that is associated with a respective QR code. When the user decides to advertise in a slide on a loop 150 to be shown on a display 103 (e.g. in the business of the user or in the business of another user/entity, etc.) when a user scans the QR code it will bring them to a website with the design formed using the graphical user interface of FIG. 024. In an example embodiment, scanning the QR code will tell the device, slide id, time and date of the scan. In another example embodiment, a tracking link will query the Browser, IP and mobile computer type of the mobile device that scanned the QR code. In another example embodiment, a unique ID for each QR code is provided per mobile device, and per slide. In still another example embodiment, the scans from each display are tracked. In still other example embodiments, an internal tracking URL is first sent to the user followed by the send to destination URL.

Figure 25:
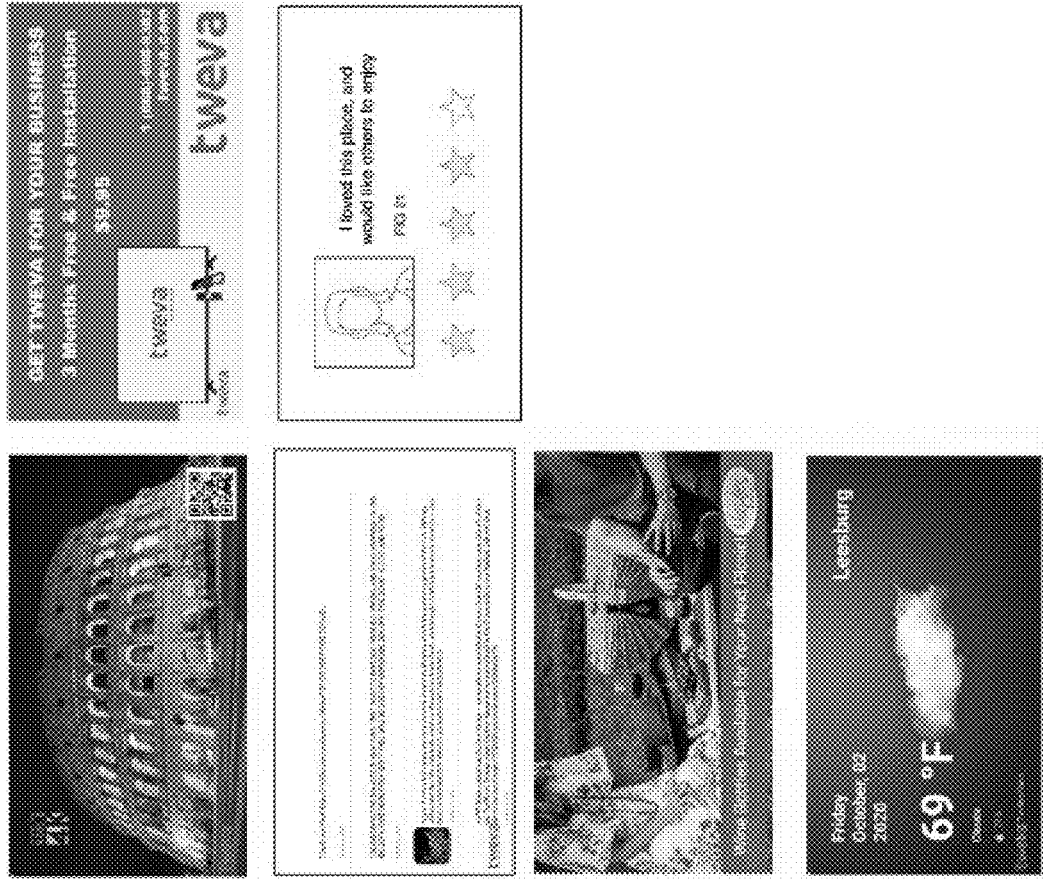
FIG. 025 is an image that illustrates an example of slide content output on the loop of FIG. 001, according to an embodiment.

FIG. 025 is an image that illustrates an example of slide content output on the loop of FIG. 001, according to an embodiment.

Figure 26:
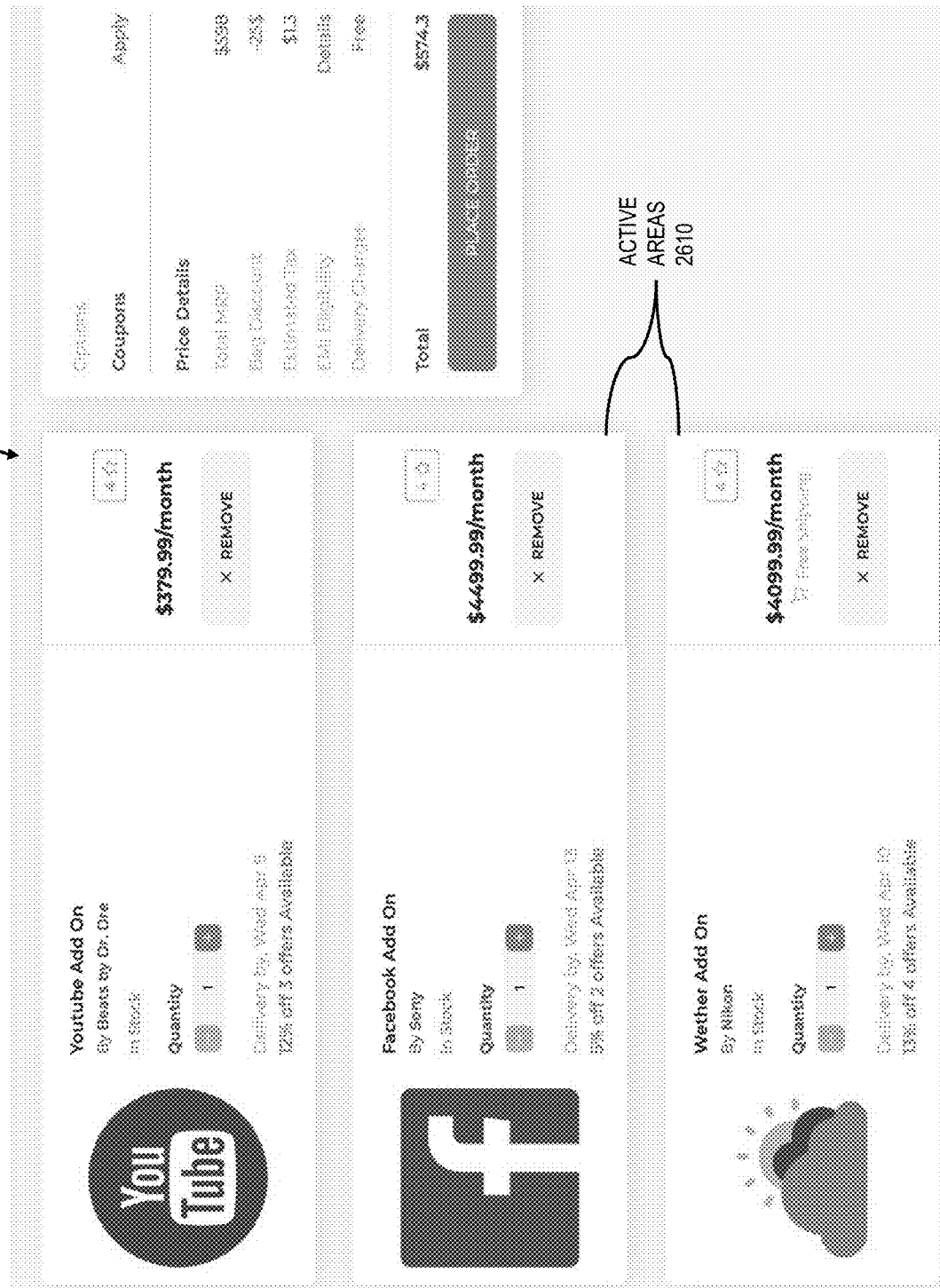
FIG. 026 is an image that illustrates an example of a graphical user interface with a plurality of active areas to include a subscription to content to be output in the loop of FIG. 001, according to an embodiment.

FIG. 026 is an image that illustrates an example of a graphical user interface 2600 with a plurality of active areas 2610 to include a subscription to content to be output in the loop 150 of FIG. 001, according to an embodiment. In one embodiment, the graphical user interface 2600 of FIG. 026 is provided so that a user can subscribe to an optional feature of the system, e.g. the sub-loop in block 10 of FIG. 001. In an embodiment, the graphical user interface 2600 is provided so that the user can select a subscription (e.g. the sub-loop of block 10 in FIG. 001) and provide payment information for purposes of having that feature in the loop 150 that is output on the display 103 at the business location of the user. In some embodiments, the sub-loop of block 10 is not optional and provided for all users. In this example embodiment, the graphical user interface 2600 of FIG. 026 is not needed.

Figure 27:
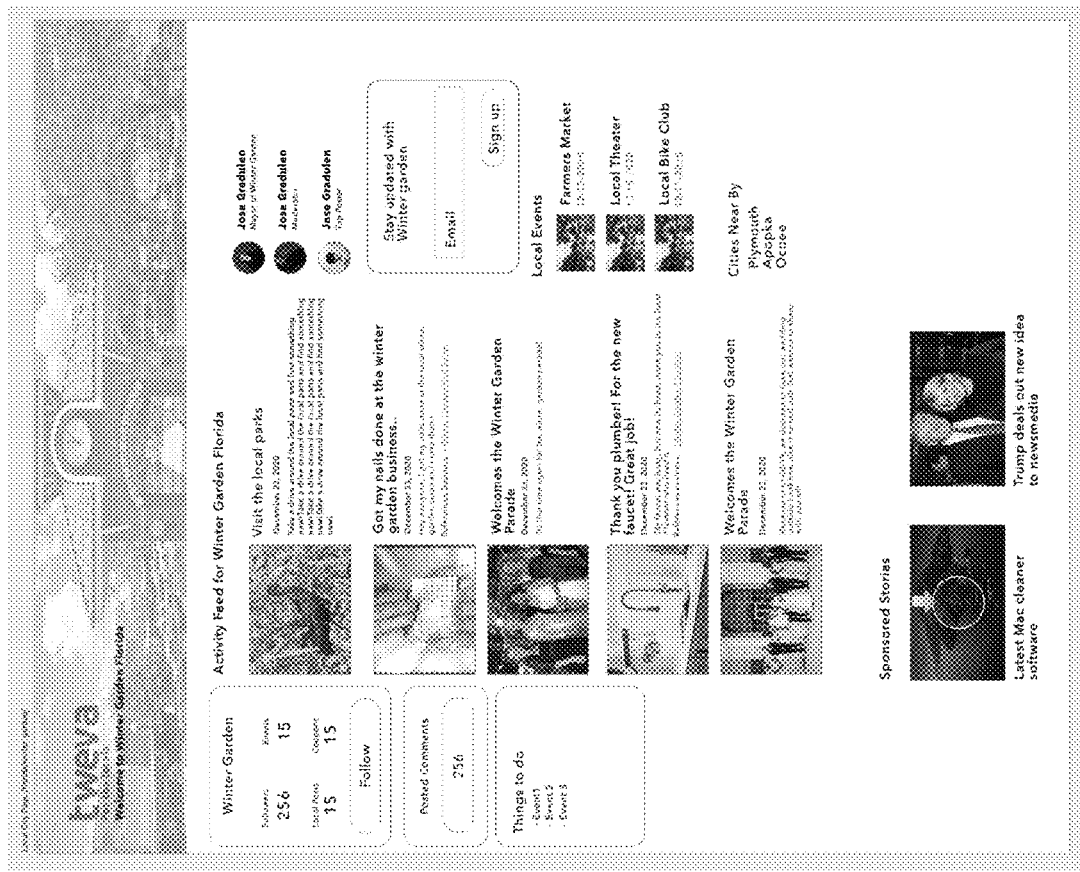
FIGS. 027 through 027.3 are images that illustrate an example of a website for a local area with posted data from the activity feed of FIG. 018 of that area, according to an embodiment.
Figure 29:

FIGS. 027 through 027.3 are images that illustrate an example of a website for a local area with posted data from the activity feed of FIG. 018 of that area, according to an embodiment. In an embodiment, FIG. 029 depicts a website for a local area (e.g. city of Winter Garden, Fla.) with posted data from the activity feed 7.1 of FIG. 017 for that area. In an example embodiment, the website of FIG. 027 displays locally generated content from the users who upload local information using the mobile device 106 (e.g. using a mobile app associated with the system) and/or using the display 103 (e.g. to the website) or any other means for uploading news information for that area to the activity feed. As previously discussed with respect to FIGS. 019 and 020, in some embodiments, when a user uploads content to the activity feed, the content is moderated (e.g. by a moderator) prior to appearing in the activity feed of FIG. 027. In an example embodiment, the content uploaded to the website of FIG. 027 includes one or more of RSS feeds, local weather, local advertisements to businesses (e.g. where the apparatus is installed), local advertisements to businesses (e.g. where the apparatus is not installed, such as a plumber in the local area) and local events for that area. In still other embodiments, further content can be uploaded to the website (e.g. politicians information of the area, such as a name/photo; top content posters name/photo; etc.).

In an embodiment, FIG. 027.1 depicts a website where a user can select one or more items of interest associated with the local area in FIG. 027. In one embodiment, the items of interest includes one or more of local events; member posts; local news and/or local sports. In this example embodiment, upon the user selecting one or more of the items of interest (e.g. by checking one or more boxes in FIG. 027.1 associated with the item) then content corresponding to these items is sent to the user (e.g. via email, push notifications, etc.).

In an embodiment, FIG. 027.2 depicts a website that is a detail page that shows one or more of user posts, stories, articles and news with local events and/or more. In an embodiment, FIG. 027.3 depicts a website of a local business detail page with one or more of business reviews and/or contact information for the business.

Figure 28:
Figure 030:
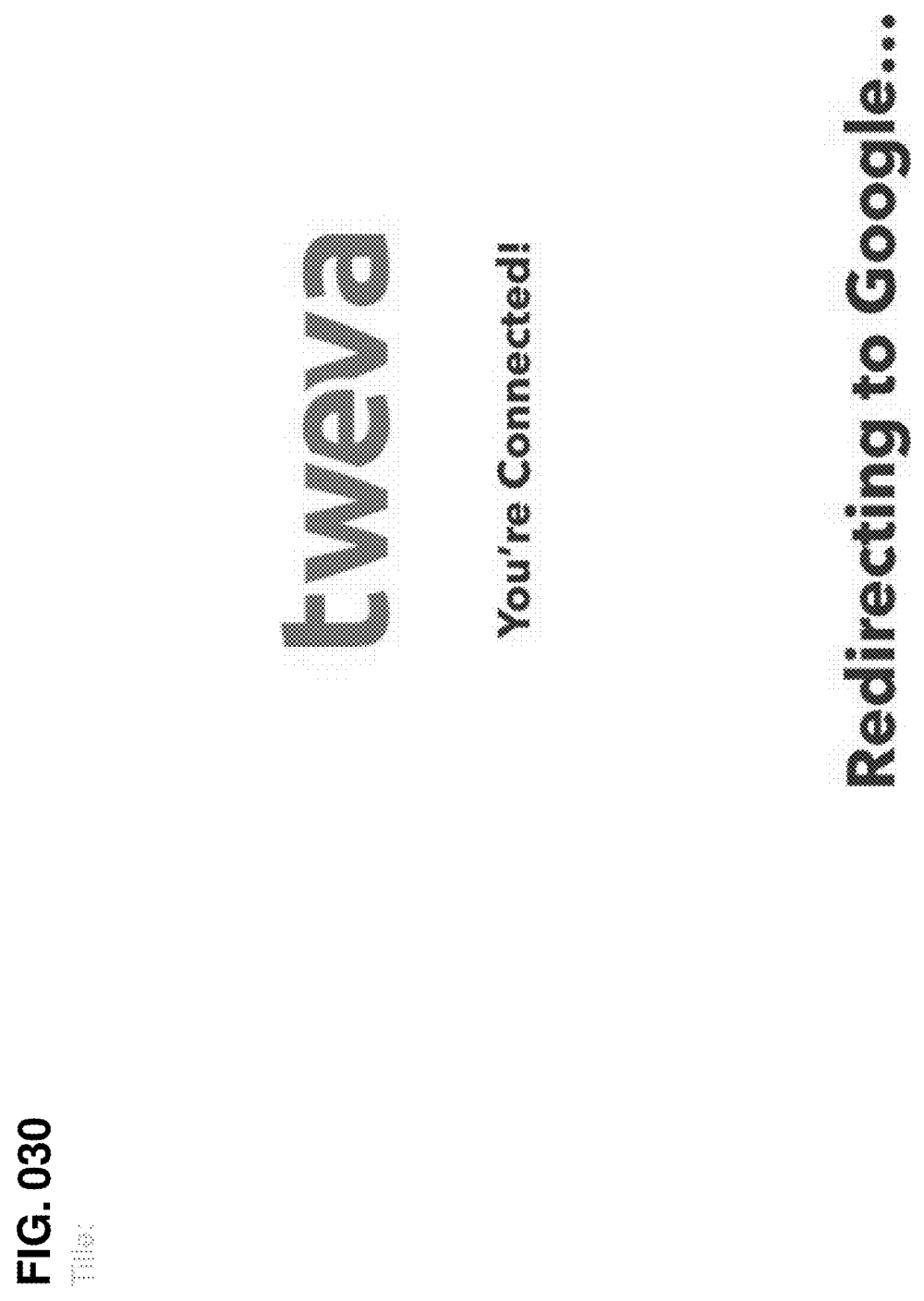

FIGS. 028 through 030 are images that illustrate an example of graphical user interfaces output on the display of FIG. 00 during initiation of the apparatus, according to an embodiment. In an example embodiment, with the graphical user interface of FIG. 028, these stickers will be placed on the door or near the door of a business (e.g., restaurant). In some embodiments, the QR code is unique to the business location. In an embodiment, the user scans and opens the landing page for the business. In another embodiment, if the app is installed it opens the app upon scanning the QR code. In some embodiments, scanning the QR code shows local offers, daily specials, etc. for that business. In other embodiments, the system tracks the users scans at each location so to store data on where the user shop (e.g. in user profile of the server 33.6). In still other embodiments, scanning the QR code adds users account info to marketing campaigns for the business (e.g. email campaign).

In an embodiment, with respect to the graphical user interface in FIG. 029, when users connect through the network (e.g. free Wi-fi provided by the apparatus 100 at the location) they can access free internet. In one embodiment, the user signs in with the mobile device 106 with identifying data (e.g., name, phone, email address, etc.). In one example embodiment, the system captures the MAC address (e.g., for tracking). In another example embodiment, the user can automatically connect at other locations without logging in (e.g., if they save info in their mobile device or laptop). In an example, if the customer is getting nails done at a nail salon, then goes across the street to eat, if both businesses participate in the system 200, then the user can be automatically connected to both businesses (e.g. free Wi-fi at each location) since the mobile device is enabled with the system 200 at both locations.

In an embodiment, FIG. 028 shows a label (e.g. sticker) that is displayed (e.g. stuck to the door) on the front of the business where the apparatus is registered and can be scanned to access information (e.g. business information, coupon codes, offers, etc.) to follow the business.

Figure 31:
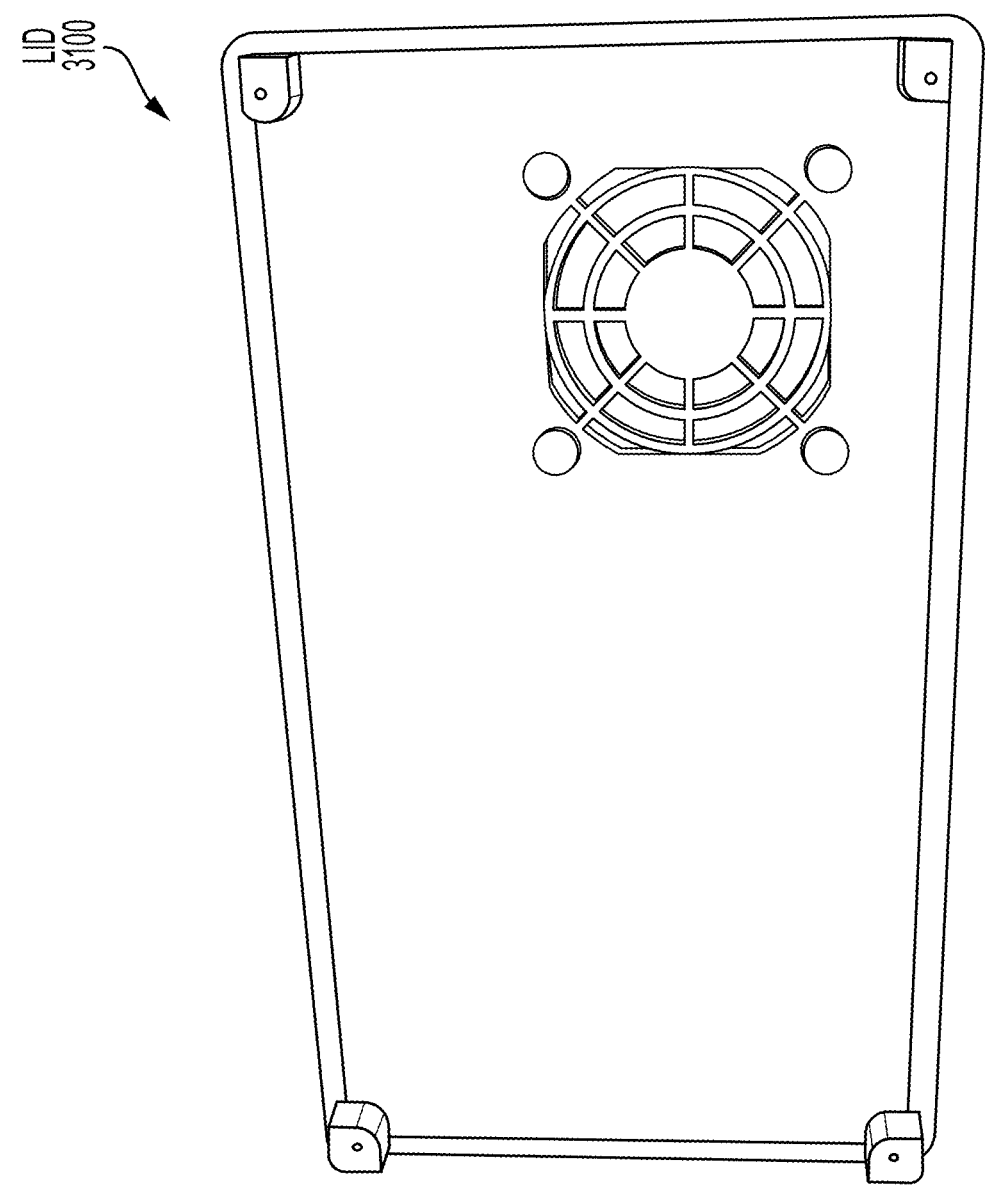
FIGS. 031 and 032 are images that illustrate an example of a box of the apparatus of FIG. 00, according to an embodiment.
Figure 32:
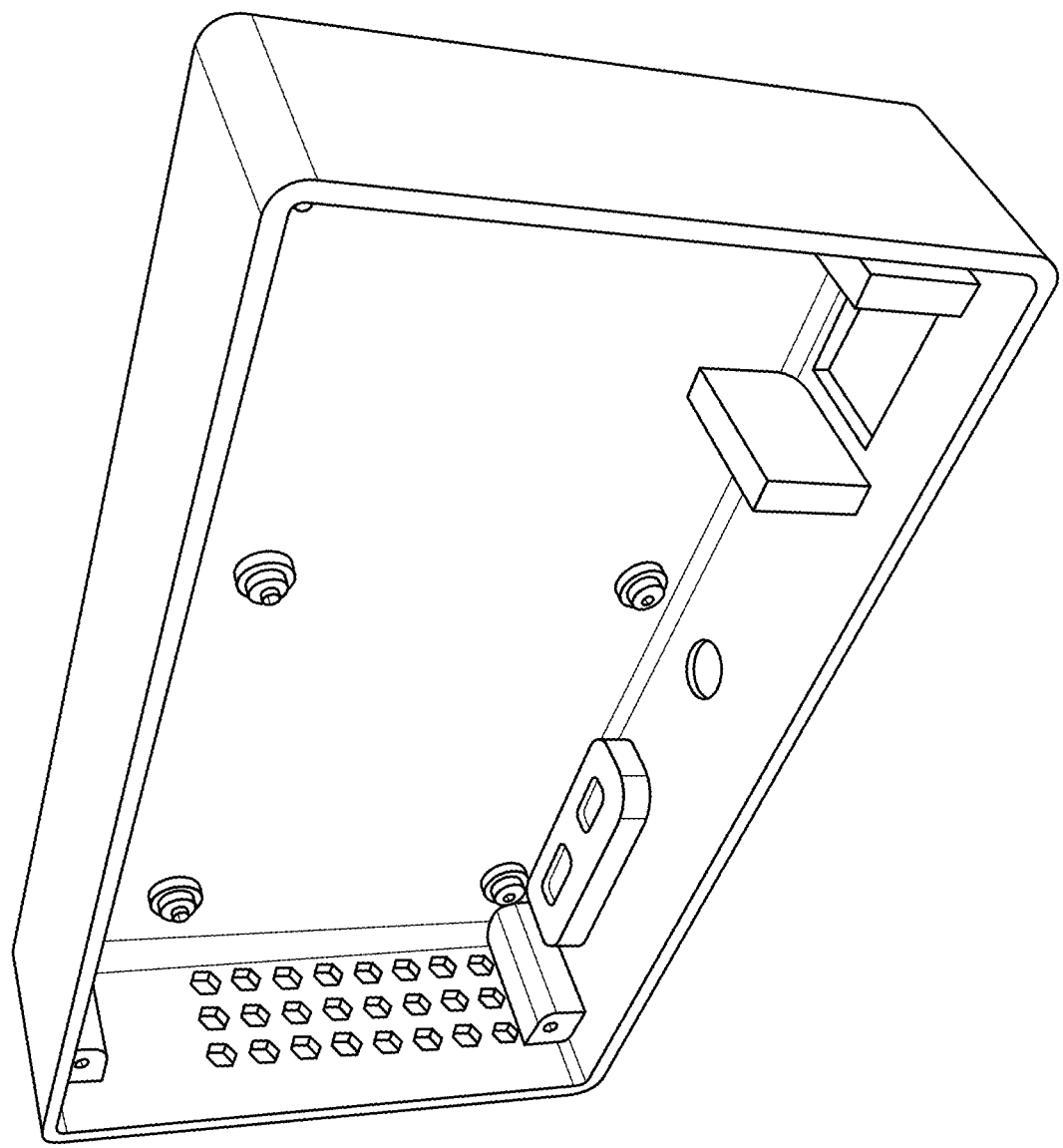

FIGS. 031 and 032 are images that illustrate an example of the box or media device 101 of the apparatus of FIG. 00, according to an embodiment. As shown in FIG. 031, in one embodiment, the box or media device 101 has a lid 3100. In one embodiment, the lid 3100 has a cut out for the name of the system 200 (e.g. Tweva). In another embodiment, the lid 3100 has a cut out to insert a color into the lid for a 2 color box. In an example embodiment, the lid 3100 also includes fan holes (e.g. 40 mm by 40 mm) to facilitate a fan within the box 101 (e.g. 12 Volt DC fan) and the lid 3100 also includes fan posts (e.g. four) to facilitate mounting the fan within the box 101.

As shown in FIG. 032, in one embodiment, the box 101 has square dimensions (e.g. about 3 inches by 5 inches). In another embodiment the box 101 defines fan holes. In yet another embodiment, the box 101 has an indented area to receive connectors.

2. HARDWARE OVERVIEW

FIG. 33 is a block diagram that illustrates a computer system 3300 upon which an embodiment of the invention may be implemented. Computer system 3300 includes a communication mechanism such as a bus 3310 for passing information between other internal and external components of the computer system 3300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit)). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 3300, or a portion thereof, constitutes a means for performing one or more steps of one or more methods described herein.

A sequence of binary digits constitutes digital data that is used to represent a number or code for a character. A bus 3310 includes many parallel conductors of information so that information is transferred quickly among devices coupled to the bus 3310. One or more processors 3302 for processing information are coupled with the bus 3310. A processor 3302 performs a set of operations on information. The set of operations include bringing information in from the bus 3310 and placing information on the bus 3310. The set of operations also typically include comparing two or more units of information, shifting positions of units of information, and combining two or more units of information, such as by addition or multiplication. A sequence of operations to be executed by the processor 3302 constitutes computer instructions.

Computer system 3300 also includes a memory 3304 coupled to bus 3310. The memory 3304, such as a random access memory (RAM) or other dynamic storage device, stores information including computer instructions. Dynamic memory allows information stored therein to be changed by the computer system 3300. RAM allows a unit of information stored at a location called a memory address to be stored and retrieved independently of information at neighboring addresses. The memory 3304 is also used by the processor 3302 to store temporary values during execution of computer instructions. The computer system 3300 also includes a read only memory (ROM) 3306 or other static storage device coupled to the bus 3310 for storing static information, including instructions, that is not changed by the computer system 3300. Also coupled to bus 3310 is a non-volatile (persistent) storage device 3308, such as a magnetic disk or optical disk, for storing information, including instructions, that persists even when the computer system 3300 is turned off or otherwise loses power.

Information, including instructions, is provided to the bus 3310 for use by the processor from an external input device 3312, such as a keyboard containing alphanumeric keys operated by a human user, or a sensor. A sensor detects conditions in its vicinity and transforms those detections into signals compatible with the signals used to represent information in computer system 3300. Other external devices coupled to bus 3310, used primarily for interacting with humans, include a display device 3314, such as a cathode ray tube (CRT) or a liquid crystal display (LCD), for presenting images, and a pointing device 3316, such as a mouse or a trackball or cursor direction keys, for controlling a position of a small cursor image presented on the display 3314 and issuing commands associated with graphical elements presented on the display 3314.

In the illustrated embodiment, special purpose hardware, such as an application specific integrated circuit (IC) 3320, is coupled to bus 3310. The special purpose hardware is configured to perform operations not performed by processor 3302 quickly enough for special purposes. Examples of application specific ICs include graphics accelerator cards for generating images for display 3314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 3300 also includes one or more instances of a communications interface 3370 coupled to bus 3310. Communication interface 3370 provides a two-way communication coupling to a variety of external devices that operate with their own processors, such as printers, scanners and external disks. In general, the coupling is with a network link 3378 that is connected to a local network 3380 to which a variety of external devices with their own processors are connected. For example, communication interface 3370 may be a parallel port or a serial port or a universal serial bus (USB) port on a personal computer. In some embodiments, communications interface 3370 is an integrated services digital network (ISDN) card or a digital subscriber line (DSL) card or a telephone modem that provides an information communication connection to a corresponding type of telephone line. In some embodiments, a communication interface 3370 is a cable modem that converts signals on bus 3310 into signals for a communication connection over a coaxial cable or into optical signals for a communication connection over a fiber optic cable. As another example, communications interface 3370 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 3370 sends and receives electrical, acoustic or electromagnetic signals, including infrared and optical signals, that carry information streams, such as digital data.

The term computer-readable medium is used herein to refer to any medium that participates in providing information to processor 3302, including instructions for execution. Such a medium may take many forms, including, but not limited to, non-volatile media, volatile media and transmission media. Non-volatile media include, for example, optical or magnetic disks, such as storage device 3308. Volatile media include, for example, dynamic memory 3304. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 3302, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 3302, except for carrier waves and other signals.

Logic encoded in one or more tangible media includes one or both of processor instructions on a computer-readable storage media and special purpose hardware, such as ASIC *3320.

Network link 3378 typically provides information communication through one or more networks to other devices that use or process the information. For example, network link 3378 may provide a connection through local network 3380 to a host computer 3382 or to equipment 3384 operated by an Internet Service Provider (ISP). ISP equipment 3384 in turn provides data communication services through the public, world-wide packet-switching communication network of networks now commonly referred to as the Internet 3390. A computer called a server 3392 connected to the Internet provides a service in response to information received over the Internet. For example, server 3392 provides information representing video data for presentation at display 3314.

The invention is related to the use of computer system 3300 for implementing the techniques described herein. According to one embodiment of the invention, those techniques are performed by computer system 3300 in response to processor 3302 executing one or more sequences of one or more instructions contained in memory 3304. Such instructions, also called software and program code, may be read into memory 3304 from another computer-readable medium such as storage device 3308. Execution of the sequences of instructions contained in memory 3304 causes processor 3302 to perform the method steps described herein. In alternative embodiments, hardware, such as application specific integrated circuit 3320, may be used in place of or in combination with software to implement the invention. Thus, embodiments of the invention are not limited to any specific combination of hardware and software.

The signals transmitted over network link 3378 and other networks through communications interface 3370, carry information to and from computer system 3300. Computer system 3300 can send and receive information, including program code, through the networks 3380, 3390 among others, through network link 3378 and communications interface 3370. In an example using the Internet 3390, a server 3392 transmits program code for a particular application, requested by a message sent from computer 3300, through Internet 3390, ISP equipment 3384, local network 3380 and communications interface 3370. The received code may be executed by processor 3302 as it is received, or may be stored in storage device 3308 or other non-volatile storage for later execution, or both. In this manner, computer system 3300 may obtain application program code in the form of a signal on a carrier wave.

Various forms of computer readable media may be involved in carrying one or more sequence of instructions or data or both to processor 3302 for execution. For example, instructions and data may initially be carried on a magnetic disk of a remote computer such as host 3382. The remote computer loads the instructions and data into its dynamic memory and sends the instructions and data over a telephone line using a modem. A modem local to the computer system 3300 receives the instructions and data on a telephone line and uses an infra-red transmitter to convert the instructions and data to a signal on an infra-red a carrier wave serving as the network link 3378. An infrared detector serving as communications interface 3370 receives the instructions and data carried in the infrared signal and places information representing the instructions and data onto bus 3310. Bus 3310 carries the information to memory 3304 from which processor 3302 retrieves and executes the instructions using some of the data sent with the instructions. The instructions and data received in memory 3304 may optionally be stored on storage device 3308, either before or after execution by the processor 3302.

Figure 34:
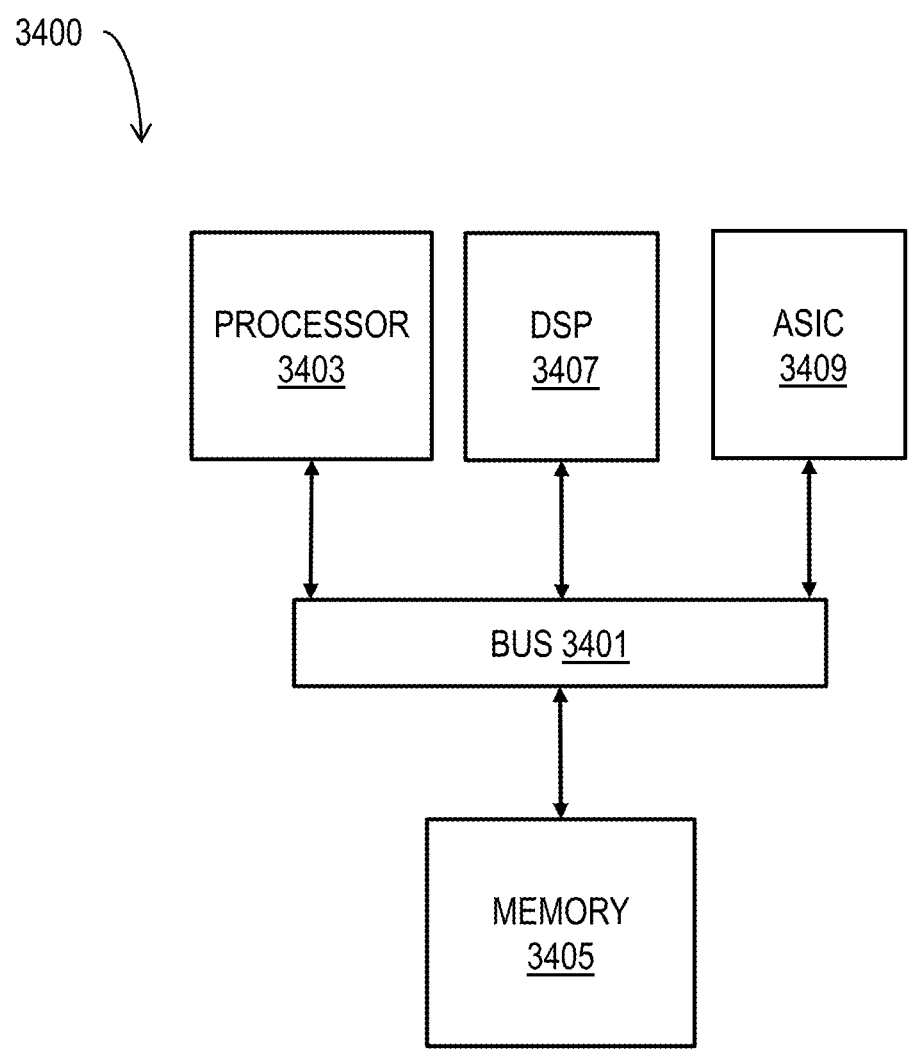
FIG. 34 illustrates a chip set upon which an embodiment of the invention may be implemented.
Figure 35:
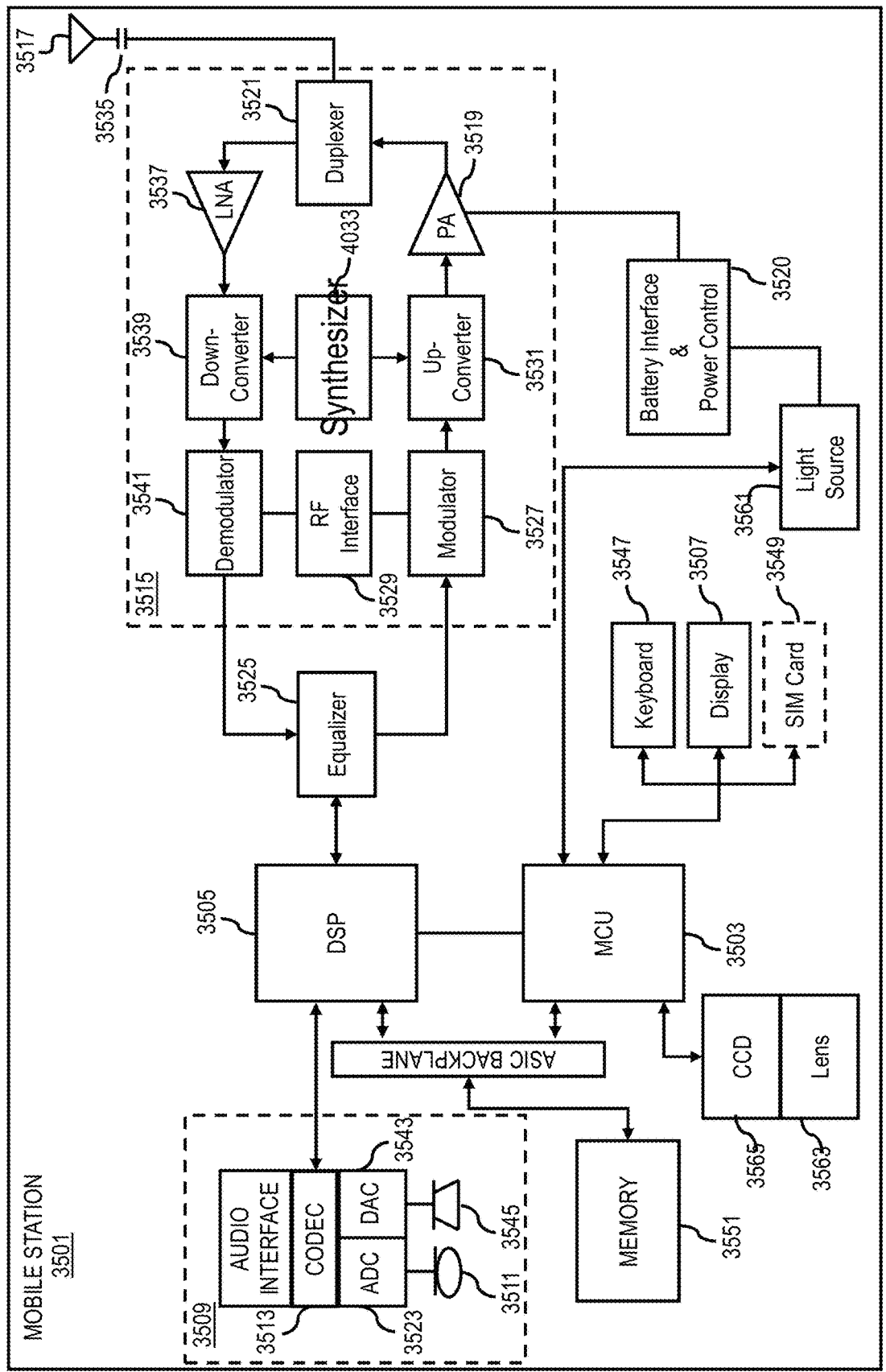
FIG. 35 illustrates a mobile terminal upon which an embodiment of the invention may be implemented.

FIG. 34 illustrates a chip set 3400 upon which an embodiment of the invention may be implemented. Chip set 3400 is programmed to perform one or more steps of a method described herein and includes, for instance, the processor and memory components described with respect to FIG. *33 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 3400, or a portion thereof, constitutes a means for performing one or more steps of a method described herein.

In one embodiment, the chip set 3400 includes a communication mechanism such as a bus 3401 for passing information among the components of the chip set 3400. A processor 3403 has connectivity to the bus 3401 to execute instructions and process information stored in, for example, a memory 3405. The processor 3403 may include one or more processing cores with each core configured to perform independently. A multi-core processor enables multiprocessing within a single physical package. Examples of a multi-core processor include two, four, eight, or greater numbers of processing cores. Alternatively or in addition, the processor 3403 may include one or more microprocessors configured in tandem via the bus 3401 to enable independent execution of instructions, pipelining, and multithreading. The processor 3403 may also be accompanied with one or more specialized components to perform certain processing functions and tasks such as one or more digital signal processors (DSP) 3407, or one or more application-specific integrated circuits (ASIC) 3409. A DSP 3407 typically is configured to process real-world signals (e.g., sound) in real time independently of the processor 3403. Similarly, an ASIC 3409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 3403 and accompanying components have connectivity to the memory 3405 via the bus 3401. The memory 3405 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 3405 also stores the data associated with or generated by the execution of one or more steps of the methods described herein.

FIG. 35 is a diagram of exemplary components of a mobile terminal 3500 (e.g., cell phone handset) for communications, which is capable of operating in the system of FIG. 2C, according to one embodiment. In some embodiments, mobile terminal 3501, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 3503, a Digital Signal Processor (DSP) 3505, and a receiver/transmitter unit including a microphone gain control unit and a speaker gain control unit. A main display unit 3507 provides a display to the user in support of various applications and mobile terminal functions that perform or support the steps as described herein. The display 3507 includes display circuitry configured to display at least a portion of a user interface of the mobile terminal (e.g., mobile telephone). Additionally, the display 3507 and display circuitry are configured to facilitate user control of at least some functions of the mobile terminal. An audio function circuitry 3509 includes a microphone 3511 and microphone amplifier that amplifies the speech signal output from the microphone 3511. The amplified speech signal output from the microphone 3511 is fed to a coder/decoder (CODEC) 3513.

A radio section 3515 amplifies power and converts frequency in order to communicate with a base station, which is included in a mobile communication system, via antenna 3517. The power amplifier (PA) 3519 and the transmitter/modulation circuitry are operationally responsive to the MCU 3503, with an output from the PA 3519 coupled to the duplexer 3521 or circulator or antenna switch, as known in the art. The PA 3519 also couples to a battery interface and power control unit 3520.

In use, a user of mobile terminal 3501 speaks into the microphone 3511 and his or her voice along with any detected background noise is converted into an analog voltage. The analog voltage is then converted into a digital signal through the Analog to Digital Converter (ADC) 3523. The control unit 3503 routes the digital signal into the DSP 3505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 3525 for compensation of any frequency-dependent impairments that occur during transmission though the air such as phase and amplitude distortion. After equalizing the bit stream, the modulator 3527 combines the signal with a RF signal generated in the RF interface 3529. The modulator 3527 generates a sine wave by way of frequency or phase modulation. In order to prepare the signal for transmission, an up-converter 3531 combines the sine wave output from the modulator 3527 with another sine wave generated by a synthesizer 3533 to achieve the desired frequency of transmission. The signal is then sent through a PA 3519 to increase the signal to an appropriate power level. In practical systems, the PA 3519 acts as a variable gain amplifier whose gain is controlled by the DSP 3505 from information received from a network base station. The signal is then filtered within the duplexer 3521 and optionally sent to an antenna coupler 3535 to match impedances to provide maximum power transfer. Finally, the signal is transmitted via antenna 3517 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 3501 are received via antenna 3517 and immediately amplified by a low noise amplifier (LNA) 3537. A down-converter 3539 lowers the carrier frequency while the demodulator 3541 strips away the RF leaving only a digital bit stream. The signal then goes through the equalizer 3525 and is processed by the DSP 3505. A Digital to Analog Converter (DAC) 3543 converts the signal and the resulting output is transmitted to the user through the speaker 3545, all under control of a Main Control Unit (MCU) 3503 which can be implemented as a Central Processing Unit (CPU) (not shown).

The MCU 3503 receives various signals including input signals from the keyboard 3547. The keyboard 3547 and/or the MCU 3503 in combination with other user input components (e.g., the microphone 3511) comprise a user interface circuitry for managing user input. The MCU 3503 runs a user interface software to facilitate user control of at least some functions of the mobile terminal 3501 as described herein. The MCU 3503 also delivers a display command and a switch command to the display 3507 and to the speech output switching controller, respectively. Further, the MCU 3503 exchanges information with the DSP 3505 and can access an optionally incorporated SIM card 3549 and a memory 3551. In addition, the MCU 3503 executes various control functions required of the terminal. The DSP 3505 may, depending upon the implementation, perform any of a variety of conventional digital processing functions on the voice signals. Additionally, DSP 3505 determines the background noise level of the local environment from the signals detected by microphone 3511 and sets the gain of microphone 3511 to a level selected to compensate for the natural tendency of the user of the mobile terminal 3501.

The CODEC 3513 includes the ADC 3523 and DAC 3543. The memory 3551 stores various data including call incoming tone data and is capable of storing other data including music data received via, e.g., the global Internet. The software module could reside in RAM memory, flash memory, registers, or any other form of writable storage medium known in the art. The memory device 3551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 3549 carries, for instance, important information, such as the cellular phone number, the carrier supplying service, subscription details, and security information. The SIM card 3549 serves primarily to identify the mobile terminal 3501 on a radio network. The card 3549 also contains a memory for storing a personal telephone number registry, text messages, and user specific mobile terminal settings.

In some embodiments, the mobile terminal 3501 includes a digital camera comprising an array of optical detectors, such as charge coupled device (CCD) array 3565. The output of the array is image data that is transferred to the MCU for further processing or storage in the memory 3551 or both. In the illustrated embodiment, the light impinges on the optical array through a lens 3563, such as a pin-hole lens or a material lens made of an optical grade glass or plastic material. In the illustrated embodiment, the mobile terminal 3501 includes a light source 3561, such as a LED to illuminate a subject for capture by the optical array, e.g., CCD 3565. The light source is powered by the battery interface and power control module 3520 and controlled by the MCU 3503 based on instructions stored or loaded into the MCU 3503.

3. ALTERNATIVES, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

What is claimed is:

1. A method comprising:
  receiving, on a processor, first data that indicates a characteristic of a loop including a plurality of slots;
  receiving, on the processor, second data that indicates content of a slide for each slot in the loop; and
  outputting, on a display, the loop including the content of the slide for each slot in the loop;
  wherein the display is positioned at a location of a first business and wherein the second data is based on receiving, at the processor, third data from a mobile device positioned within a range of the location, wherein the third data indicates a second business where the mobile device was previously positioned and wherein the second data is further based on a characteristic of the second business; and
  wherein the outputting step includes outputting the slide in a slot of the loop based on determining that the second business is nota competing business with the first business;
  wherein the outputting step of the slide based on the characteristic of the second business is based on the mobile device being positioned within the range of the location over a first time period;

wherein the method further comprising determining, with the processor, that the mobile device is not positioned within the range of the location over a second time period after the first time period; and removing, based on the determining step, the slide from the slot of the loop based on the characteristic of the second business such that the outputting of the slide based on the characteristic of the second business is not performed during the second time period.

2. The method according to claim 1, wherein the characteristic is at least one of a duration of the loop, a quantity of the plurality of slots, a start and finish time and a duration of each slot; and wherein the method further includes selecting, with an input device, the characteristic of the loop.

3. The method according to claim 1, wherein the third data is based on one of:

scanning, with the mobile device, content of a slide in a slot in the loop displayed on a second display at the second business; and connecting, with the mobile device, to a network provided by a processor at the second business.

4. The method according to claim 1, wherein the display is positioned at the location of the first business and wherein the second data is further based on a characteristic of the first business.

5. The method according to claim 4, wherein the second data indicates content for a media slide comprising an image associated with products or services offered by the first business.

6. The method according to claim 4, wherein the second data is further based on a review of the first business posted on a social media database;

wherein the method further includes receiving, on the processor, fourth data from an input device operated by the owner of the first business that indicates minimum criteria for the review of the first business; and wherein the outputting of the content of the slide indicating the review of the first business is based on comparing the review of the first business with the minimum criteria.

7. The method according to claim 4, wherein the second data is further based on data indicating prices of products or services offered by the first business.

8. The method according to claim 4, wherein the second data is further based on weather data of a geographic region corresponding to the location of the first business.

9. The method according to claim 4, wherein the second data is further based on data of a community event scheduled within a geographic region corresponding to the location of the first business.

10. The method according to claim 1, wherein the second data is provided by a social media database based on a category of interest selected with an input device.

11. The method according to claim 1, wherein the display includes a plurality of displays positioned at the location of the first business and wherein the method further comprises:

outputting, on a second display different from the plurality of displays, a graphical user interface including;

a first region with a plurality of display icons that respectively indicate the plurality of displays on which a respective loop is to be output, and a second region that indicates a plurality of second active areas that indicate the content of the plurality of slots in the respective loop to be output on the display whose display icon is activated in the first region;

wherein upon selecting a first display icon in the first region that corresponds to a first display of the plurality of displays, outputting first content of the plurality of slots in a first loop to be output on the first display in the plurality of second active areas of the second region; and wherein upon selecting a second display icon in the first region that corresponds to a second display of the plurality of displays, outputting second content of the plurality of slots in a second loop to be output on the second display in the plurality of second active areas of the second region.

12. The method according to claim 11, wherein one of the second active areas is highlighted such that the highlighted second active area corresponds to the content of the slide that is being displayed on the display in real time.

13. The method according to claim 11, wherein each second active area includes one or more icons such that activation of the one or more icons adjusts a value of a parameter of displaying the content in the second active area.

14. The method according to claim 1, wherein the display at the first business location is different from a display of the mobile device.

15. The method according to claim 1, further comprising:

transmitting, with the processor, the second data to a second mobile device of an owner of the first business prior to the outputting step;

receiving, on the processor, a signal from the second mobile device of the owner indicating an approval of the second data by the owner of the first business; and wherein the outputting step is performed after the signal is received.

16. The method according to claim 1, wherein the outputting step further comprises outputting, on a second display of the mobile device, the loop including the content of the slide for each slot in the loop; and wherein the outputting step further comprises outputting, on the second display of the mobile device, a plurality of active areas including a forward active area, a reverse active area and a pause active area;

wherein upon activation of the forward active area a next slide of a next slot in the loop is output on the second display;

wherein upon activation of the reverse active area a previous slide of a previous slot in the loop is output on the second display; and wherein upon activation of the pause active area a current slide in a current slot of the loop is output on the second display.

17. The method according to claim 1, further comprising:

outputting, in a second display different from the display at the location of the first business, a graphical user interface comprising;

a first region with content for one or more slides to be output in a slot of the loop, and a second region that indicates a first time range over which the loop is being output on the display, wherein one or more active areas are positioned within the second region that correspond to the respective one or more slides in the first region and wherein an area of each active area in the second region corresponds to a second time range within the first range where content of each respective slide in the first region is to be output in the slot of the loop;

wherein each of the one or more slides in the first region is movable from the first region to the second region and the area of the active area corresponding to each slide is adjustable in the second region to change the second time range for the respective slide.

18. The method according to claim 17, further comprising outputting icons within each second active area such that activation of the one or more icons adjusts the second time range within the first time range.

19. An apparatus comprising:
   at least one processor; and
   at least one display;
   at least one memory including one or more sequences of instructions,
   the at least one memory and the one or more sequences of instructions configured to, with the at least one processor, cause the apparatus to perform at least the following,
   receive first data that indicates a characteristic of a loop including a plurality of slots;
   receive second data that indicates content of a slide for each slot in the loop;
   output on the display the loop including the content of the slide for each slot in the loop;
   wherein the display is positioned at a location of a first business and wherein the second data is based on receiving, at the processor, third data from a mobile device positioned within a range of the location of the first business, wherein the third data indicates a second business where the mobile device was previously positioned and wherein the second data is further based on a characteristics of the second business; and
   wherein the output step includes an output of the slide in a slot of the loop based on a determination that the second business is not a competing business with the first business;
   wherein the output step of the slide based on the characteristic of the second business is based on the mobile device being within the range of the location over a first time period;
   wherein the at least one memory and the one or more sequences of instructions are further configured to;
   cause the apparatus to determine that the mobile device is not positioned within the range of the location over a second time period after the first time period and
   remove the slide from the slot of the loop based on the characteristic of the second business such that the output of the slide based on the characteristic of the second business is not performed during the second time period.

* * * * *